United States Patent
Takai et al.

(10) Patent No.: US 8,229,015 B2
(45) Date of Patent: Jul. 24, 2012

(54) WIRELESS TRANSMISSION SYSTEM, WIRELESS TRANSMITTING METHOD, AND WIRELESS STATION AND TRANSMITTING STATION USED THEREIN

(75) Inventors: Hitoshi Takai, Osaka (JP); Kenji Miyanaga, Osaka (JP); Hideki Nakahara, Hyogo (JP); Hidetoshi Yamasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 741 days.

(21) Appl. No.: 12/282,722

(22) PCT Filed: Mar. 16, 2007

(86) PCT No.: PCT/JP2007/055353
§ 371 (c)(1),
(2), (4) Date: Sep. 12, 2008

(87) PCT Pub. No.: WO2007/108409
PCT Pub. Date: Sep. 27, 2007

(65) Prior Publication Data
US 2009/0097584 A1    Apr. 16, 2009

(30) Foreign Application Priority Data
Mar. 17, 2006  (JP) .................................. 2006-075373

(51) Int. Cl.
*H04B 7/02* (2006.01)
*H04L 1/02* (2006.01)
(52) U.S. Cl. ......... 375/267; 375/299; 375/343; 375/347
(58) Field of Classification Search .................. 375/259, 375/267, 299, 304, 347
See application file for complete search history.

(56) References Cited

U.S. PATENT DOCUMENTS
4,856,025 A    8/1989  Takai
(Continued)

FOREIGN PATENT DOCUMENTS
EP    1 073 214    1/2001
(Continued)

OTHER PUBLICATIONS

International Search Report issued Jun. 5, 2007 in the International (PCT) Application of which the present application is the U.S. National Stage.
(Continued)

*Primary Examiner* — David Ometz
*Assistant Examiner* — Qutbuddin Ghulamali
(74) *Attorney, Agent, or Firm* — Wenderoth, Lind & Ponack, L.L.P.

(57) ABSTRACT

A wireless transmission system capable of exerting a maximum path diversity effect by using combinations formed by symbol waveforms. A transmission timing controlling section (23) determines a transmission start timing. A modulating section (21) modulates a signal by using one of a plurality of symbol waveform candidates and by utilizing a modulation scheme in which a phase transition of a symbol waveform represents a waveform being changed, and then transmits the modulated signal at a transmission start timing. A predetermined delay amount is set such that (i) the number of reception timings, each indicating a timing at which a receiving station (12) receives a signal, is a plural number and is less than or equal to a maximum number of effective branches for each symbol waveform, and (ii) each time difference between the reception timings is greater than or equal to a delay resolution and less than or equal to a maximum delay.

24 Claims, 63 Drawing Sheets

U.S. PATENT DOCUMENTS

| | | | |
|---|---|---|---|
| 5,347,535 A * | 9/1994 | Karasawa et al. | 370/342 |
| 5,394,435 A | 2/1995 | Weerackody | |
| 7,012,883 B2 * | 3/2006 | Jalali et al. | 370/208 |
| 2004/0086027 A1 * | 5/2004 | Shattil | 375/146 |
| 2004/0266338 A1 * | 12/2004 | Rowitch | 455/7 |

FOREIGN PATENT DOCUMENTS

| | | |
|---|---|---|
| GB | 1576347 A * | 4/1977 |
| JP | 62-214743 | 9/1987 |
| JP | 2506748 | 4/1996 |
| JP | 2764150 | 4/1998 |
| WO | 00/49730 | 8/2000 |

OTHER PUBLICATIONS

Takai, "BER Performance of Anti-Multipath Modulation Scheme PSK-VP and its Optimum Phase-Waveform", *IEEE Transactions on Vehicular Technology*, vol. 42, No. 4, pp. 625-640, Nov. 1993.

Hiroike et al., "Combined Effects of Phase Sweeping Transmitter Diversity and Channel Coding", *IEEE Transations of Vehicular Technology*, vol. 41, No. 2, pp. 170-176, May 1992.

* cited by examiner

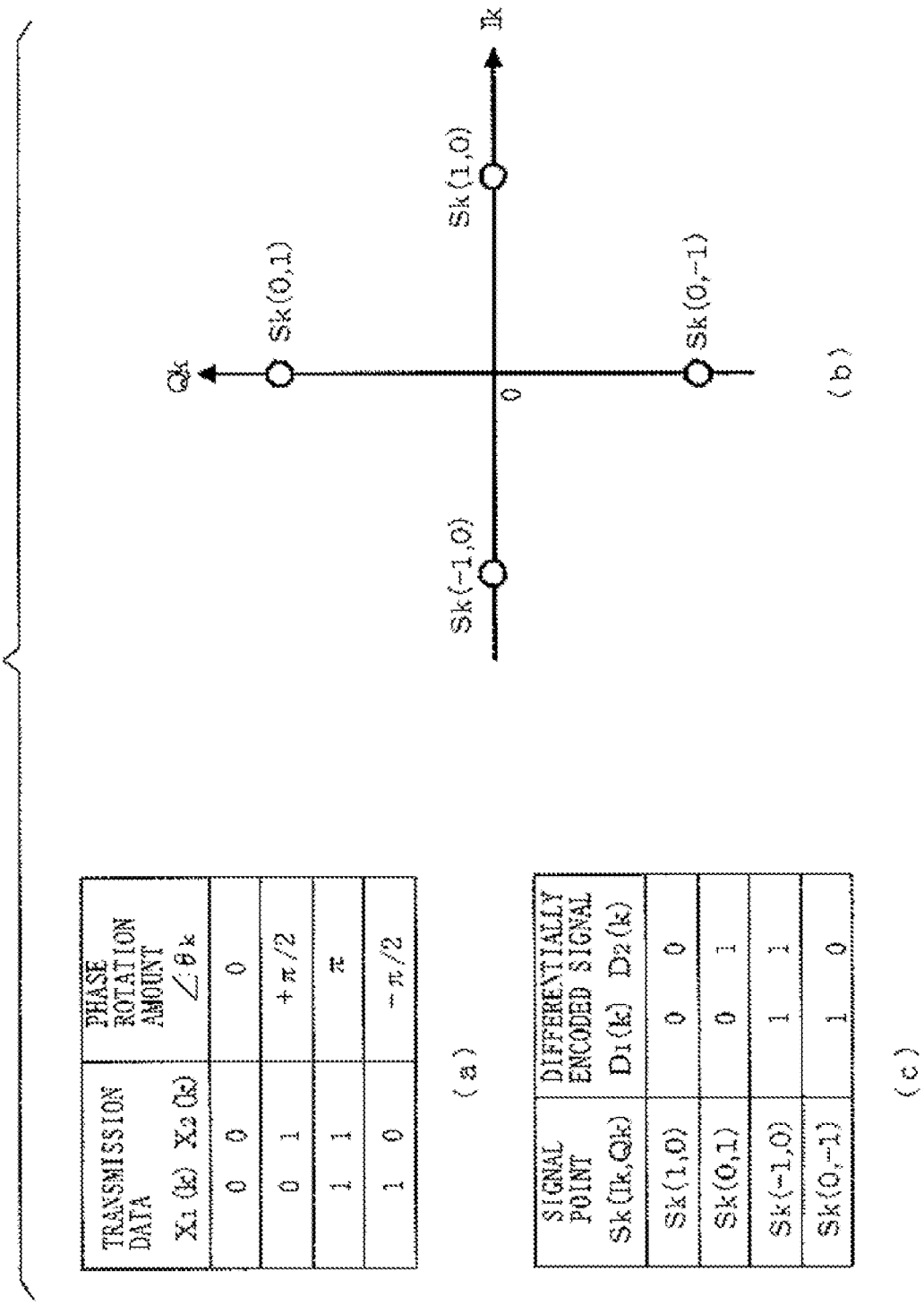
F I G. 4

F I G. 7
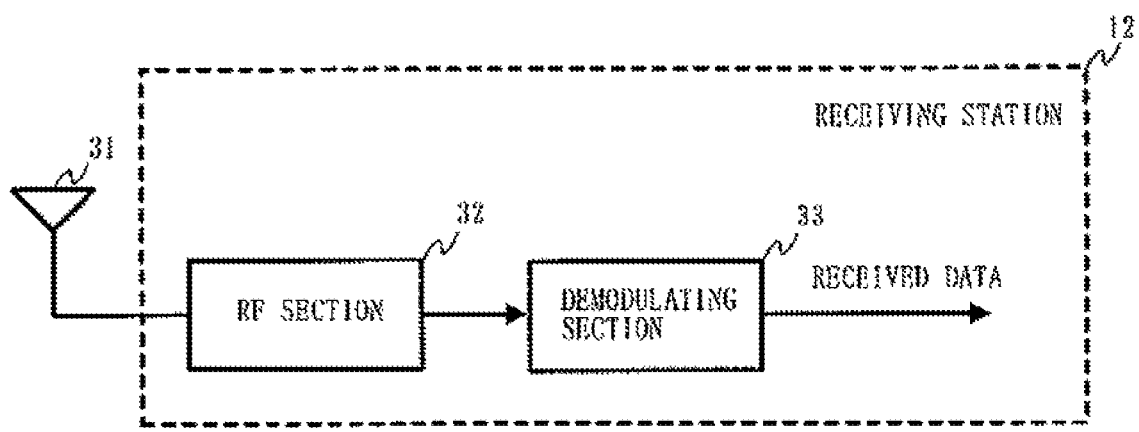

F I G. 1 1
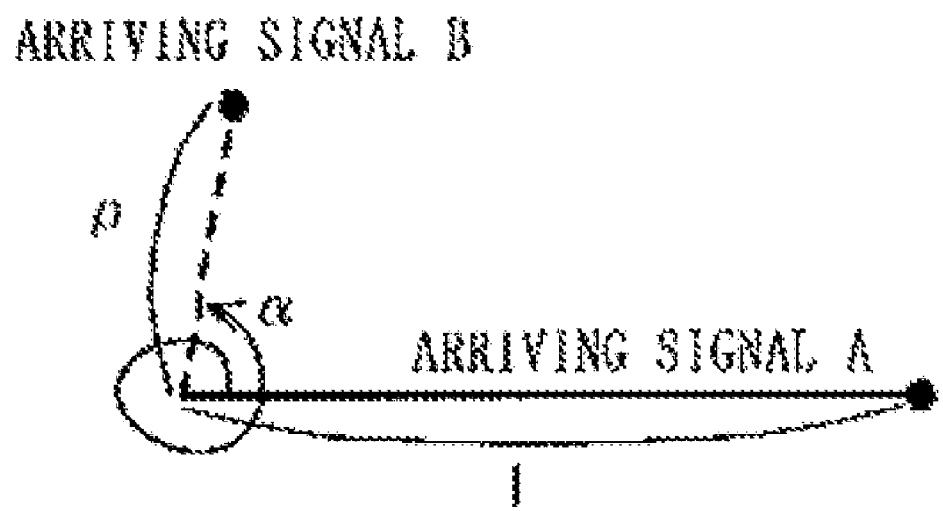

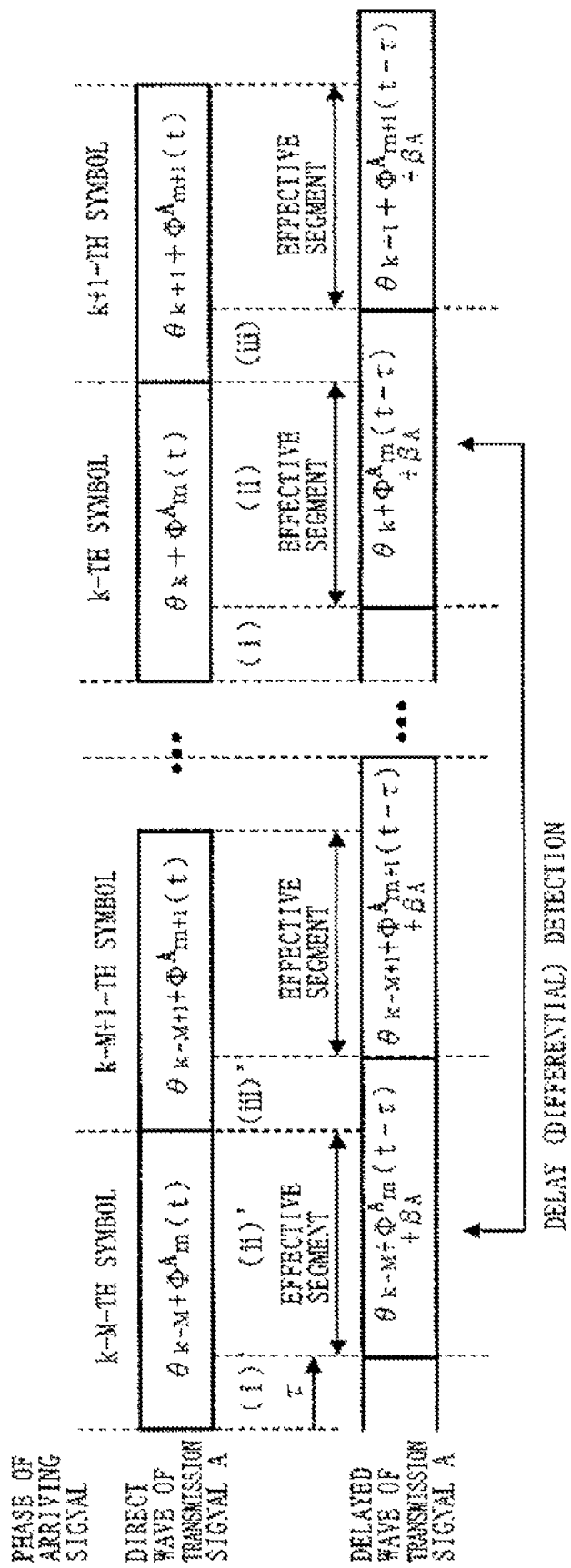

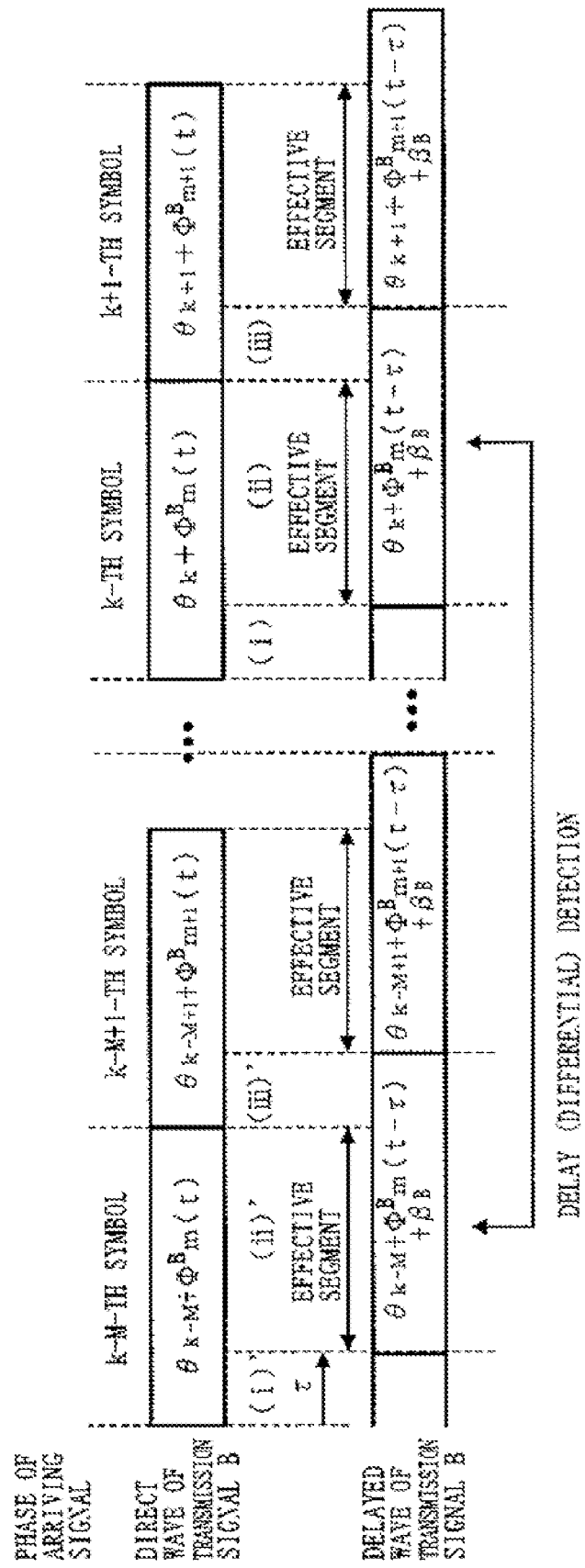

F I G. 19A
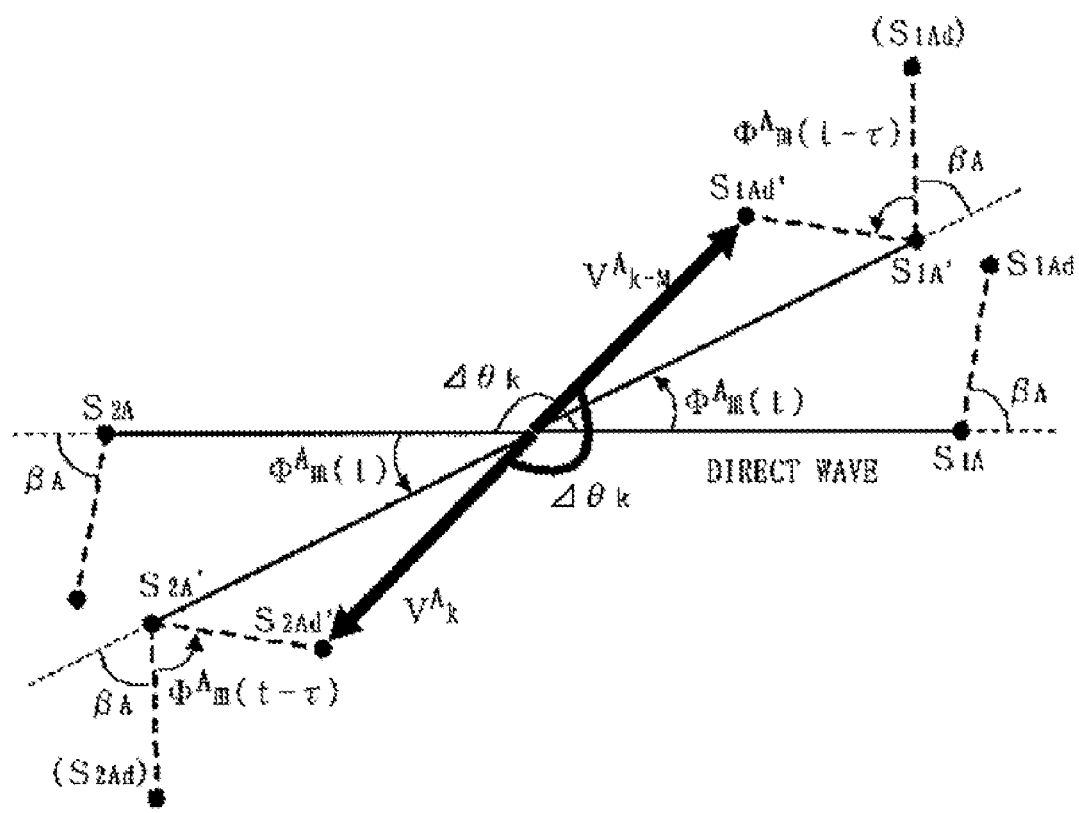

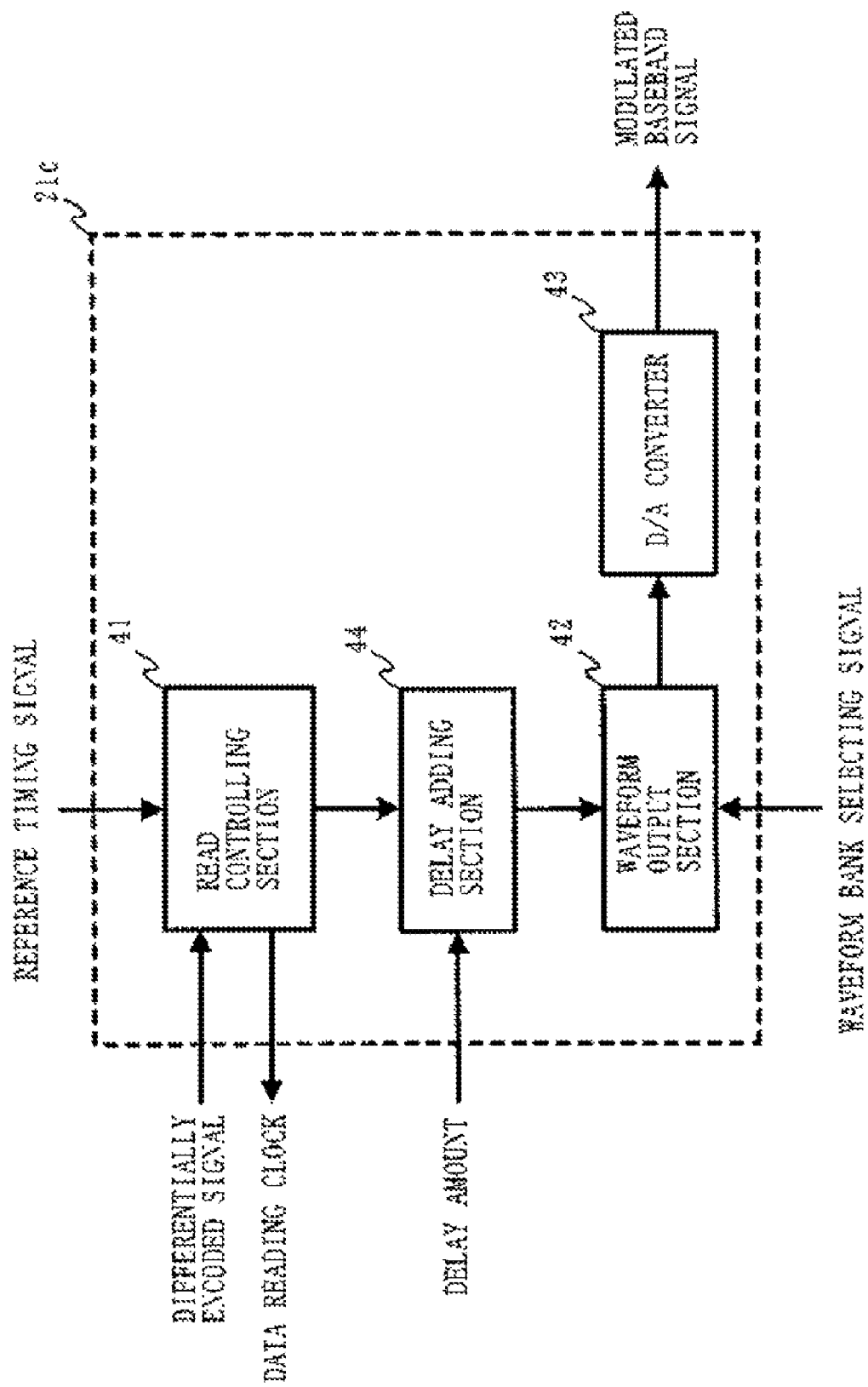

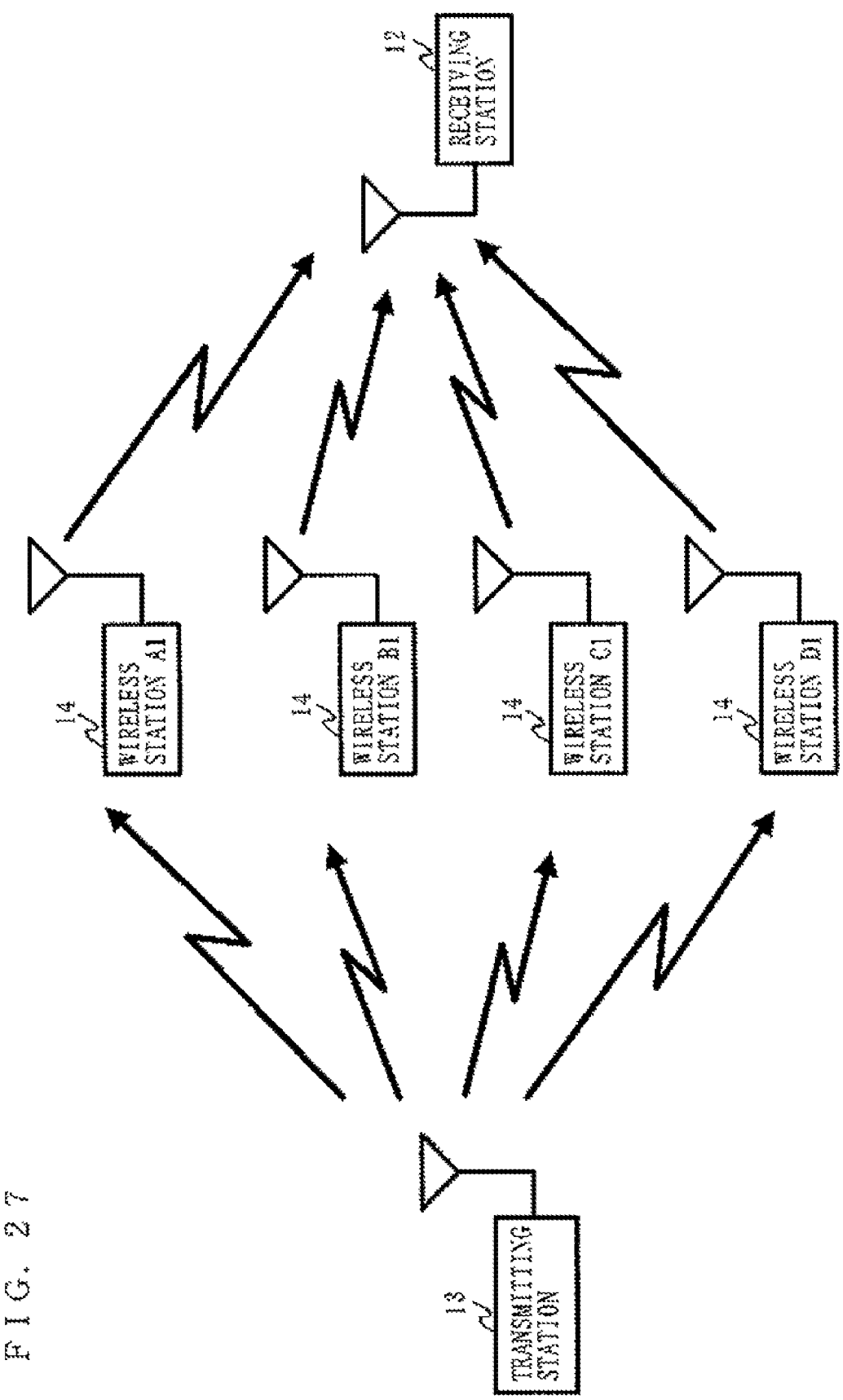

F I G. 2 8

| PR | UW | INFORMATION DATA |

F I G. 3 4
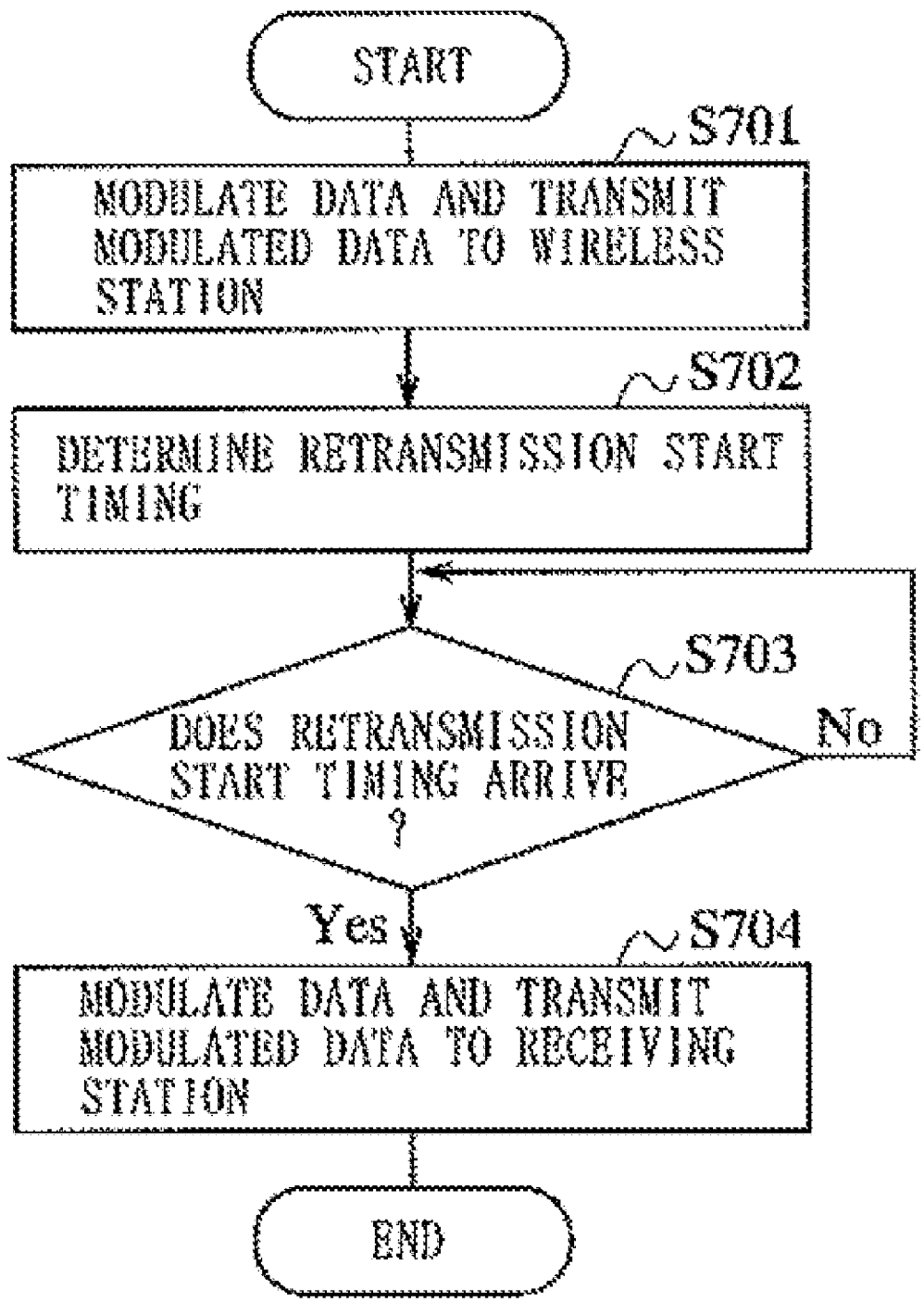

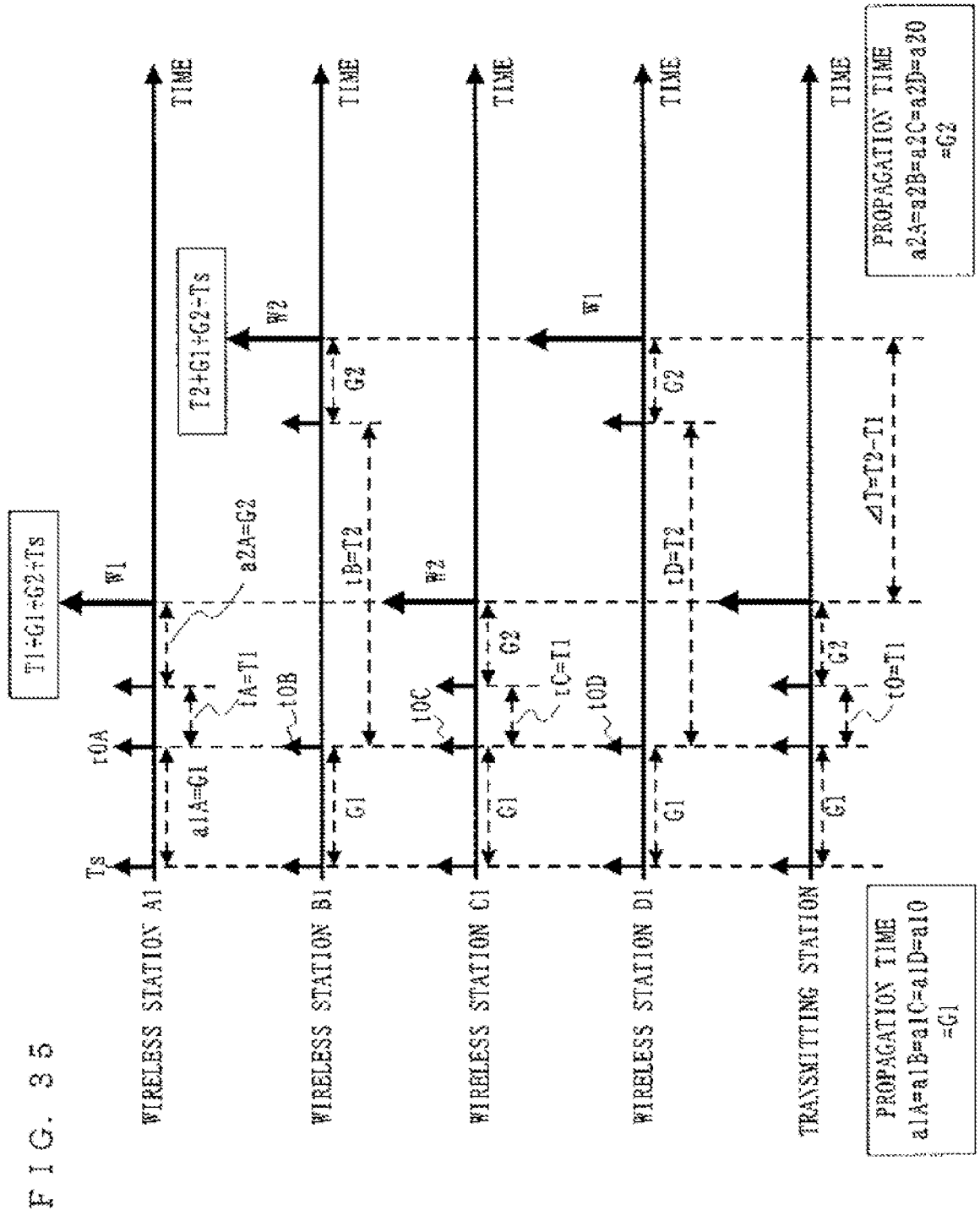

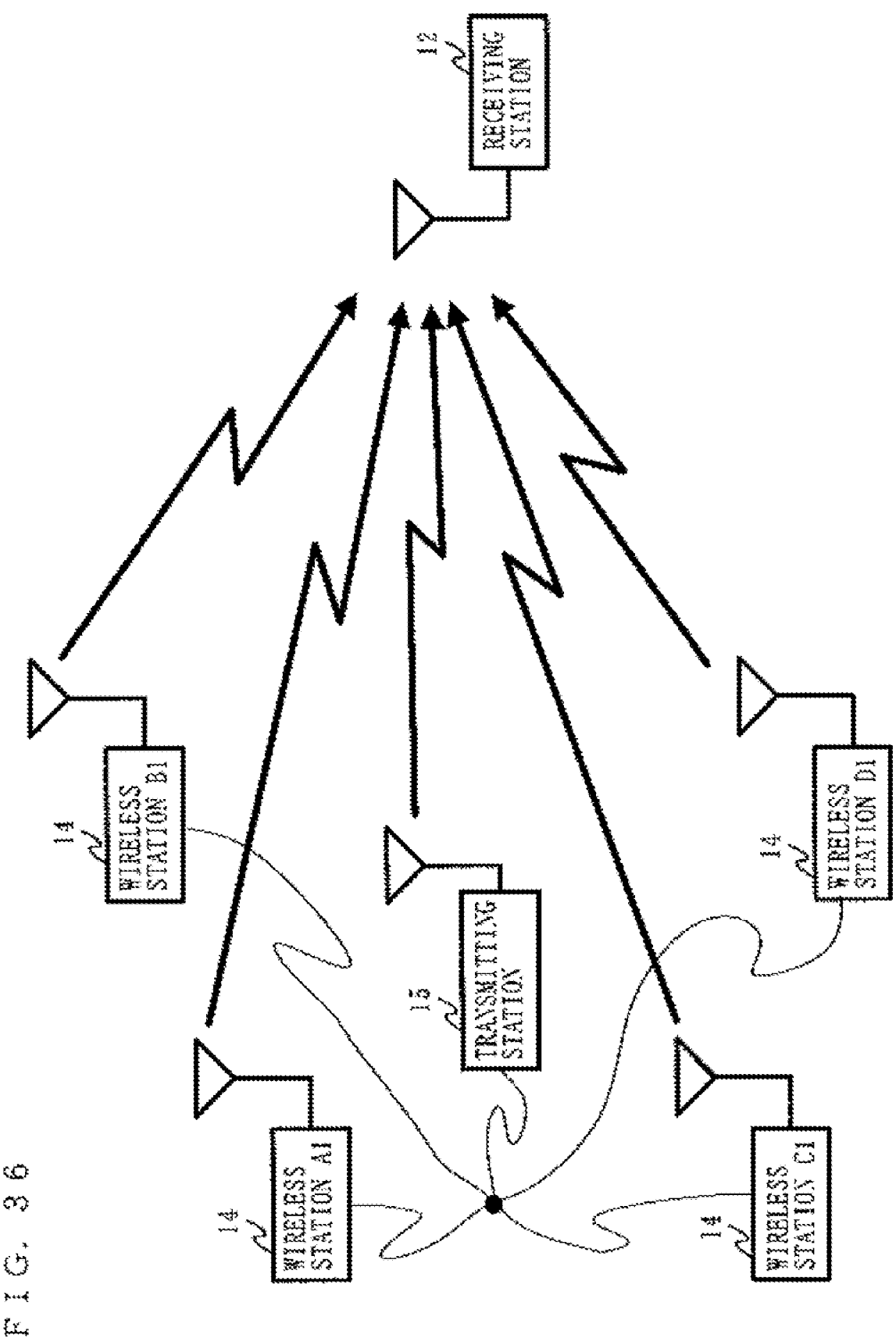

F I G. 4 4
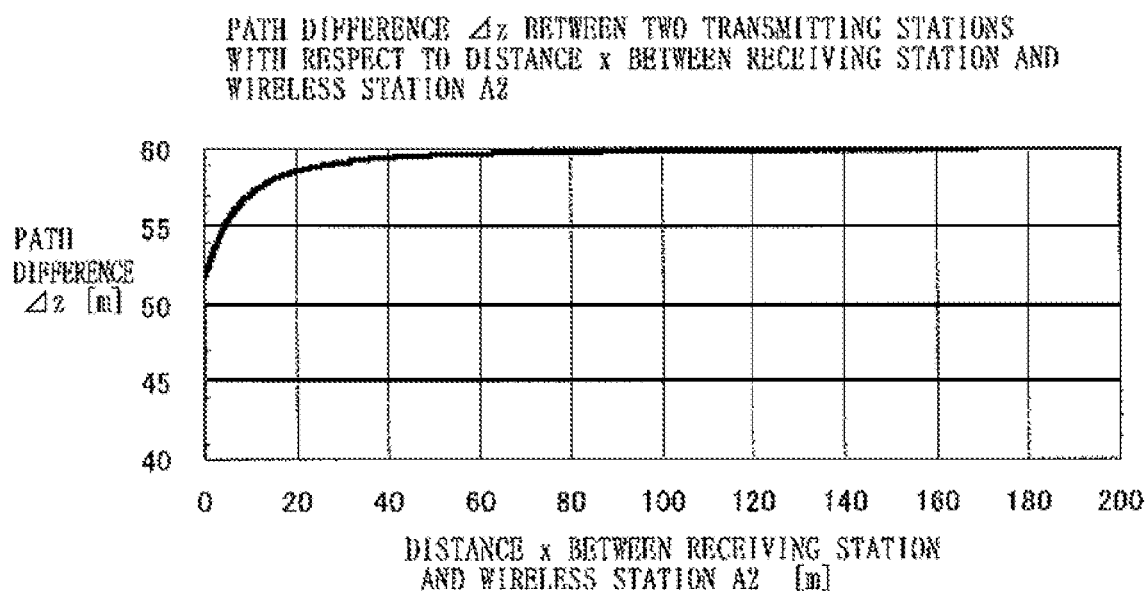

FIG. 50

| ARRANGEMENT PATTERN | | WIRELESS STATION A | WIRELESS STATION B | WIRELESS STATION C | WIRELESS STATION D | WIRELESS STATION E | WIRELESS STATION F | WIRELESS STATION G | WIRELESS STATION H | | |
|---|---|---|---|---|---|---|---|---|---|---|---|
| 1 | SYMBOL WAVEFORM | W1 | W1 | W1 | W1 | W1 | W1 | W1 | W1 | ... | ONLY ONE TYPE OF SYMBOL WAVEFORM. FOR ARRIVING TIMING, T1 AND T2 ARE REPEATEDLY ARRANGED. |
|   | ARRIVING TIMING | T1 | T2 | T1 | T2 | T1 | T2 | T1 | T2 | ... | |
| 2 | SYMBOL WAVEFORM | W2 | W2 | W2 | W2 | W2 | W2 | W2 | W2 | ... | ONLY ONE TYPE OF SYMBOL WAVEFORM. FOR ARRIVING TIMING, T1 AND T2 ARE REPEATEDLY ARRANGED. |
|   | ARRIVING TIMING | T1 | T2 | T1 | T2 | T1 | T2 | T1 | T2 | ... | |
| 3 | SYMBOL WAVEFORM | W1 | W2 | W1 | W2 | W1 | W2 | W1 | W2 | ... | FOR SYMBOL WAVEFORM, W1 AND W2 ARE REPEATEDLY ARRANGED. ONLY ONE TYPE OF ARRIVING TIMING. |
|   | ARRIVING TIMING | T1 | T1 | T1 | T1 | T1 | T1 | T1 | T1 | ... | |
| 4 | SYMBOL WAVEFORM | W1 | W2 | W1 | W2 | W1 | W2 | W1 | W2 | ... | FOR SYMBOL WAVEFORM, W1 AND W2 ARE REPEATEDLY ARRANGED. ONLY ONE TYPE OF ARRIVING TIMING. |
|   | ARRIVING TIMING | T2 | T2 | T2 | T2 | T2 | T2 | T2 | T2 | ... | |
| 5 | SYMBOL WAVEFORM | W1 | W2 | W1 | W2 | W1 | W2 | W1 | W2 | ... | TWO TYPES OF COMBINATIONS ARE REPEATEDLY ARRANGED. |
|   | ARRIVING TIMING | T1 | T2 | T1 | T2 | T1 | T2 | T1 | T2 | ... | |
| 6 | SYMBOL WAVEFORM | W1 | W2 | W1 | W2 | W1 | W2 | W1 | W2 | ... | TWO TYPES OF COMBINATIONS ARE REPEATEDLY ARRANGED. |
|   | ARRIVING TIMING | T2 | T1 | T2 | T1 | T2 | T1 | T2 | T1 | ... | |
| 7 | SYMBOL WAVEFORM | W1 | W2 | W2 | W1 | W2 | W2 | W1 | W2 | ... | THREE TYPES OF COMBINATIONS ARE REPEATEDLY ARRANGED (EXCLUDING COMBINATION OF W1 AND T1) |
|   | ARRIVING TIMING | T2 | T1 | T2 | T2 | T1 | T2 | T2 | T1 | ... | |
| 8 | SYMBOL WAVEFORM | W1 | W2 | W2 | W1 | W2 | W2 | W1 | W2 | ... | THREE TYPES OF COMBINATIONS ARE REPEATEDLY ARRANGED (EXCLUDING COMBINATION OF W1 AND T2) |
|   | ARRIVING TIMING | T1 | T2 | T1 | T1 | T2 | T1 | T1 | T2 | ... | |
| 9 | SYMBOL WAVEFORM | W1 | W1 | W2 | W1 | W1 | W2 | W1 | W1 | ... | THREE TYPES OF COMBINATIONS ARE REPEATEDLY ARRANGED (EXCLUDING COMBINATION OF W2 AND T1) |
|   | ARRIVING TIMING | T1 | T2 | T2 | T1 | T2 | T2 | T1 | T2 | ... | |
| 10 | SYMBOL WAVEFORM | W1 | W1 | W2 | W1 | W1 | W2 | W1 | W1 | ... | THREE TYPES OF COMBINATIONS ARE REPEATEDLY ARRANGED (EXCLUDING COMBINATION OF W2 AND T2) |
|   | ARRIVING TIMING | T2 | T1 | T1 | T2 | T1 | T1 | T2 | T1 | ... | |
| 11 | SYMBOL WAVEFORM | W1 | W1 | W2 | W2 | W1 | W1 | W2 | W2 | ... | FOUR TYPES OF COMBINATIONS ARE REPEATEDLY ARRANGED |
|   | ARRIVING TIMING | T1 | T2 | T1 | T2 | T1 | T2 | T1 | T2 | ... | |
| 12 | SYMBOL WAVEFORM | W1 | W1 | W2 | W2 | W1 | W1 | W2 | W2 | ... | FOUR TYPES OF COMBINATIONS ARE REPEATEDLY ARRANGED |
|   | ARRIVING TIMING | T1 | T2 | T2 | T1 | T1 | T2 | T2 | T1 | ... | |
| 13 | SYMBOL WAVEFORM | W1 | W1 | W2 | W2 | W1 | W1 | W2 | W2 | ... | FOUR TYPES OF COMBINATIONS ARE REPEATEDLY ARRANGED |
|   | ARRIVING TIMING | T2 | T1 | T1 | T2 | T2 | T1 | T1 | T2 | ... | |
| 14 | SYMBOL WAVEFORM | W1 | W1 | W2 | W2 | W1 | W1 | W2 | W2 | ... | FOUR TYPES OF COMBINATIONS ARE REPEATEDLY ARRANGED |
|   | ARRIVING TIMING | T2 | T1 | T2 | T1 | T2 | T1 | T2 | T1 | ... | |
| 15 | SYMBOL WAVEFORM | W1 | W2 | W1 | W2 | W1 | W2 | W1 | W2 | ... | FOUR TYPES OF COMBINATIONS ARE REPEATEDLY ARRANGED |
|   | ARRIVING TIMING | T1 | T1 | T2 | T2 | T1 | T1 | T2 | T2 | ... | |
| 16 | SYMBOL WAVEFORM | W1 | W2 | W1 | W2 | W1 | W2 | W1 | W2 | ... | FOUR TYPES OF COMBINATIONS ARE REPEATEDLY ARRANGED |
|   | ARRIVING TIMING | T1 | T2 | T2 | T1 | T1 | T2 | T2 | T1 | ... | |

FIG. 56  PRIOR ART
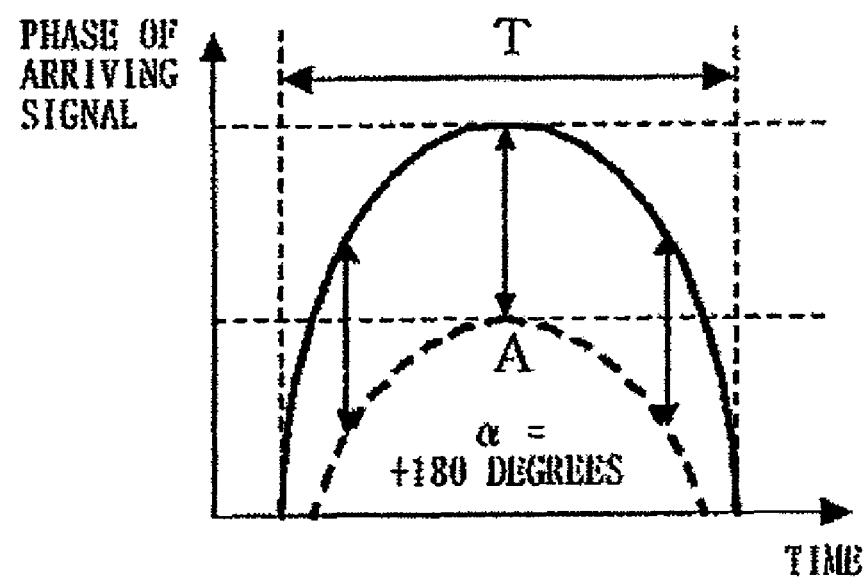
(a) PHASE RELATIONSHIP BETWEEN ARRIVING SIGNALS
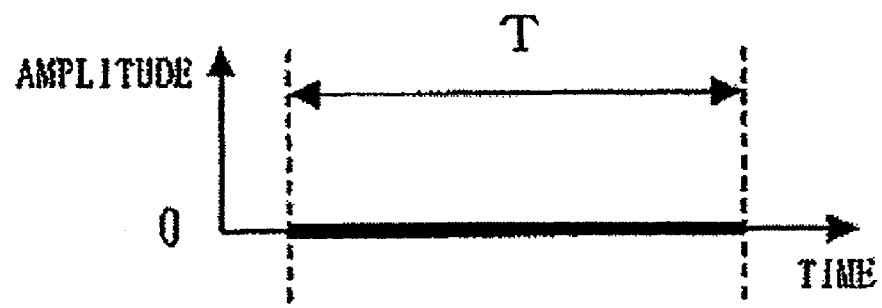
(b) AMPLITUDE OF RECEIVED WAVE IN CASE OF REVERSED PHASE

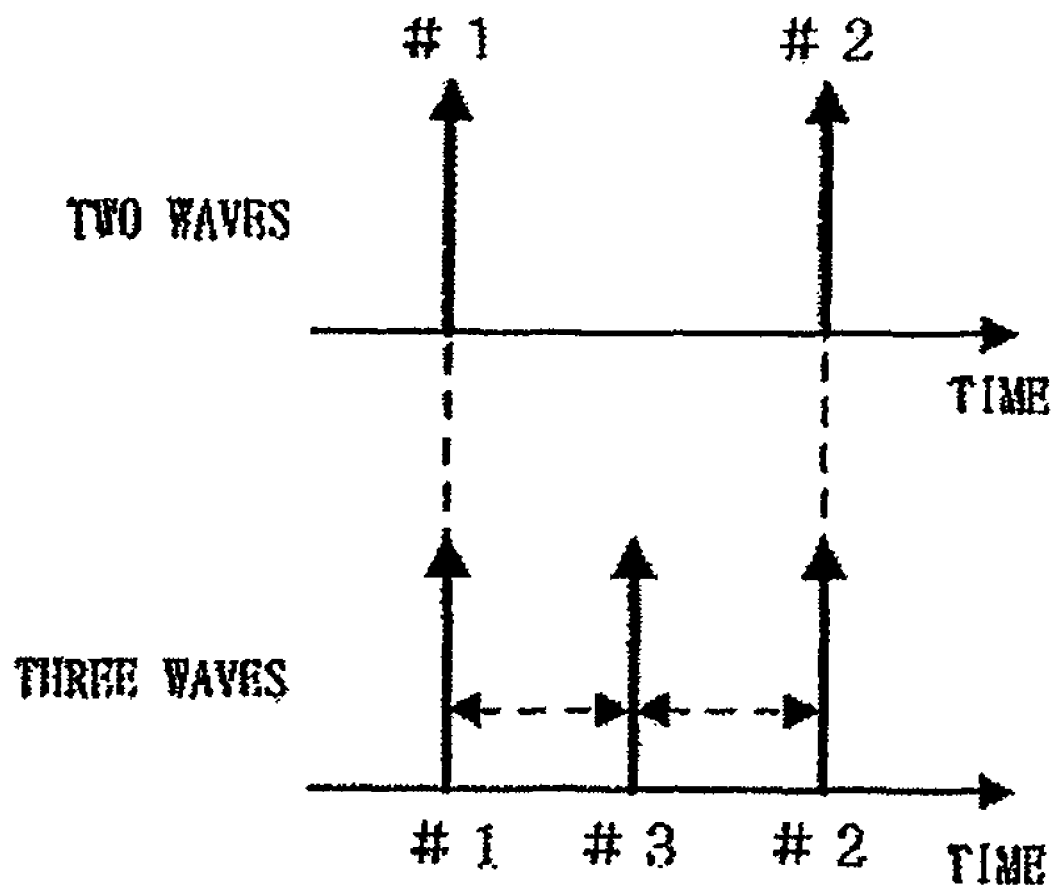

WIRELESS TRANSMISSION SYSTEM, WIRELESS TRANSMITTING METHOD, AND WIRELESS STATION AND TRANSMITTING STATION USED THEREIN

BACKGROUND OF THE INVENTION (1) Field of Invention

The present invention relates to a wireless transmission system and a wireless transmission method in which a plurality of wireless transmission devices transmit and receive signals utilizing a transmission scheme with an anti-multipath property, and relates to a wireless station and a transmitting station used therein.

(2) Description of the Related Art

In the field, of wireless communications, there is a technique utilizing a multipath-resistant modulation/demodulation scheme, in which a signal, is transmitted simultaneously to a plurality of transmitting stations so as to deliberately create a plurality of signal paths, and a plurality of arriving waves are combined together on a receiving side, thus obtaining an effect produced by path diversity (or also referred to as transmission diversity) and thereby improving a transmission characteristic.

For example, the multipath-resistant modulation/demodulation scheme includes those in which improvements are made to modulation schemes, such as a spread spectrum scheme, an OFDM (Orthogonal Frequency Division Multiplexing) scheme in which information is transmitted while being distributed among a great number of sub-carriers arranged over a wide frequency range, an anti-multipath modulation scheme in which an anti-multipath property is exerted by providing a phase or amplitude redundancy in transmitted symbols, a PSK-VP (Phase Shift Keying with Varied Phase) scheme (non-patent document 1) in which a convex phase redundancy is provided, or a PSK-RZ (Return to Zero Phase Shift Keying) scheme in which an amplitude redundancy is provided (non-patent document 2), and those that use an ordinary modulation scheme but use an equalizer on the receiving side to exert an anti-multipath property.

For example, the spread spectrum scheme includes a DSSS (Direct Sequence Spread Spectrum) scheme in which an original signal is multiplied by a spread signal having a wider band than that of the original signal, a FHSS (Frequency Hopping Spread Spectrum) scheme in which a frequency is hopped over a wide band, and a THSS (Time Hopping Spread Spectrum) scheme in which a signal is spread with a wide band impulse.

In order to exert an active path diversity effect utilizing such a modulation/demodulation scheme with an anti-multipath property, there are conditions as follows with respect to an upper and lower limit of an arrival time difference between signals. Herein, the minimum and maximum, arrival time difference, with which a path diversity effect can be exerted, will be referred to as a delay resolution and a maximum delay, respectively. The delay resolution and the maximum delay may be determined based on the principle of the modulation/demodulation scheme used, or based on the parameters or limitations on implementation of the modulation/demodulation scheme.

For example, with the DSSS scheme, the delay resolution corresponds to a 1-chip length of a spread code while the maximum delay corresponds to an amount of time less than the spread code length. Therefore, when communicating with the DSSS scheme, it is possible, on the receiving side, to separate a received signal into delayed wave components and combine them together (RAKE reception) to obtain a path diversity effect as long as the arrival time difference is greater than or equal to the 1-chip length and less than the spread code length.

With the OFDM scheme, the delayed wave components are absorbed at, a guard interval set for the signal, whereby the maximum delay corresponds to a length of the guard interval. Inter-symbol interference does not occur if the arrival time difference between delayed waves is within the guard interval. Furthermore, since an error collection operation is performed over a plurality of sub-carriers, information can be reproduced even if some subcarriers have errors therein due to a multipath distortion. The delay resolution corresponds to a value around the inverse of the frequency bandwidth. Thus, with the OFDM scheme, it is possible to obtain the path diversity effect based on an effect, of the guard interval and a frequency diversity effect provided by scattering pieces of information over a wide frequency band and collecting the pieces together.

With the PSK-VP scheme or the PSK-RZ scheme, which is the anti-multipath modulation scheme, the delay resolution is greater than or equal to a value that is one-severalth of the symbol length while the maximum delay is an amount of time corresponding to less than one symbol length. Furthermore, even when a signal is transmitted utilising an ordinary single carrier scheme such as the PSK scheme or the QAM scheme, and the signal is then demodulated by using an equalizer with a tapped delay line on the receiving side, the delay resolution corresponds to a symbol length and the maximum delay corresponds to a temporal length determined by the number of taps.

An example of a wireless transmission system which uses such a modulation/demodulation scheme with an anti-multipath property so as to deliberately produce the path diversity effect, and improves the transmission characteristic will now be described.

Patent document 1 discloses a conventional wireless transmission system which performs communication utilising a modulation/demodulation scheme with an anti-multipath property. FIG. 51 is a block diagram of the wireless transmission system disclosed in patent document 1. FIG. 51 only shows a downstream path in which a signal is transmitted from a base station 310 to a mobile station 330. In FIG. 51, the base station 310 forms a communication area (wireless zone) 300 and communicates with the mobile station 330 within the area utilizing a CDMA (Code Division Multiple Access) scheme.

In the base station 310, a signal, outputted from a wireless unit 311 is transmitted to a relay unit 320 and the mobile station 330 via a transmitting antenna 312. In the relay unit 320, a signal S1 received by a receiving antenna 322 is delayed by a delay unit 324 so as to be inputted to a combiner 323. Also, a signal S2 received by an antenna 321 is directly inputted, to the combiner 323. The combiner 323 combines the signal S1 and the signal 82. A signal combined by the combiner 323 is amplified by the amplifier 325 so as to be transmitted to the mobile station 330 via a transmitting antenna 326.

The mobile station 330 is a RAKE receiver and receives three signals: a signal delayed by the relay unit, a signal not delayed by the relay unit, and a signal transmitted from the transmitting station. In the relay unit 320, since the delay unit 324 gives the signal S1 a delay greater than or equal to a code time period (chip length) of a spread code sequence, whereby a delay greater than or equal to the 1-chip length is generated among a plurality of signals. Then, the signals are received on the receiving side in the RAKE reception, thereby obtaining the path diversity effect and thus improving the transmission characteristic. The wireless transmission system deliberately provides an additional transmission path/delayed wave as described above, aiming at increasing the path diversity effect and improving the transmission characteristic.

Furthermore, in a modulation scheme, used in a transmission method disclosed in patent document 2, which is focused on a symbol waveform (phase waveform during a symbol), a phase of the symbol waveform synchronized with a symbol period T has a convex phase transition, and a detection output is obtained by performing delay (differential) detection, thereby eliminating a state where the detection output disappears due to a multipath. Furthermore, with an effect produced by combining the multipath, even the transmission characteristic can be improved. This improved effect is fundamentally exerted when a delay amount τ of a delayed wave is within a predetermined range ($0 < \tau \leq T$).

FIG. 52 is a schematic diagram illustrating a phase transition of the symbol waveform disclosed in patent document 2. In the phase transition shown in FIG. 52, a transition width within a time length T (a symbol length) corresponding to one symbol is set up to a maximum phase transition amount $\phi_{MAX}$, and a phase is changed in a parabolic shape based on a function shown by the following formula (1).

$$\phi(t) = (4\phi_{MAX}/T^2) \cdot t \cdot (T-t); (0 < t < T) \quad (1)$$

FIG. 53 is a diagram illustrating a structure of a transmission signal generating circuit 700 disclosed in patent document 2. As shown in FIG. 53, the transmission signal generating circuit 700 includes a differential encoding circuit 701, a waveform generating circuit 702, an orthogonal modulator 704 and an oscillator 703. The transmission signal generating circuit 700 causes the differential encoding circuit 701 to differentially encode transmission data, the waveform generation circuit 702 to modulate the differentially encoded data by means of a symbol waveform having a convex phase redundancy, and the orthogonal modulator 704 to convert the modulated data into a signal having a carrier wave frequency band.

Next, a phase relationship between arriving signals obtained when using a symbol waveform having such a convex phase redundant waveform will be described.

FIG. 54 is a schematic diagram illustrating a phase relationship between two arriving signals A and B obtained when using the symbol waveform having the convex phase redundancy. In FIG. 54, it is assumed that the phase difference α is 180 degrees. In this case, even when there is a delay between the arriving signals, phases of the respective arriving signals are shifted in a convex manner. Therefore, within an effective segment (a segment in which correct received data can be obtained), while there is a segment in which the arriving signals may cancel each other out and a received wave may disappear (a point b of FIG. 54), there is also another segment in which the arriving signals do not cancel each other out and the received wave remains (a point a or c of FIG. 54). The arriving signals A and B are processed by means of a combination of delay (differential) detection and a low-pass filter, thereby making it possible to obtain an effective detection output. As a result, the transmission characteristic can be improved by obtaining a path diversity effect.

FIG. 55 is a schematic diagram illustrating a structure of a conventional wireless transmission system which uses the transmission diversity based on a modulation scheme disclosed in patent document 2. As shown in FIG. 55, a delay unit 901 is provided among the transmission signal generating circuit 700, a first antenna 904 and a second antenna 905, thereby interposing a delay between signals to be transmitted from the first antenna 904 and the second antenna 905. In this case, a delay amount interposed between the signals to foe transmitted is set such that the path diversity effect is well obtained. Thus, the transmission characteristic can be improved.

[patent document 1] Patent Application No. 2764150
[patent document 2] Patent Application No. 2506748
[non-patent document 1] H, Takai, "BER Performance of Anti-Multipath Modulation Scheme PSK-VP and its Optimum Phase-Wave form", IEEE, Trans. Veh. Technol., Vol. VT-42, November 1993, p 625-640
[non-patent document 2] S. Ariyavisitakul, S. Yoshida, F. Ikegami, K. Tanaka, T, Takeuchi, "A Power-efficient linear digital modulator and its application to an anti-multipath modulation PSK-RZ scheme", Proceedings of IEEE Vehicular Technology Conference, June 1987, p 66-71

BRIEF SUMMARY OF THE INVENTION

In the aforementioned multipath-resistant modulation/demodulation scheme, there may be a case where a maximum number of branches being effective (hereinafter, referred to as a maximum number of effective branches) is limited to a small number, for independent branches that contribute to the path diversity effect. While the maximum number of effective branches that contribute to the path diversity effect is less than or equal to a value obtained by dividing the maximum delay by the delay resolution, this becomes a very small value when the maximum delay is close to the delay resolution.

For example, it is assumed that the maximum number of effective branches is two. In this case, when two waves arrive with a delay equal to the delay resolution therebetween and the third wave further arrives between the two waves, the third wave will be superimposed on both of the two waves and remain in both waves even after the path separation at a receiver, thereby increasing the inter-branch correlation in the path diversity and thus causing deterioration. As described above, when the maximum delay is close to the delay resolution and the maximum number of effective branches that contribute to the path diversity effect is limited to a small number, the problem is not solved simply by adding a path with a delay. Any prior art including patent document 1 and 2 fails to disclose a method of solving this problem.

Hereinafter, a case where the maximum delay is close to the delay resolution and the maximum number of effective branches that, contribute to the path diversity effect, is a small number will be further described in detail with respect to various modulation/demodulation schemes.

With the DSSS scheme, where the maximum delay corresponds to a value that is less than a spread code length, if the spread code length is short and comes close to a spreading chip length corresponding to the delay resolution, the maximum number of effective branches will be a small number. For example, when the spread code length is a 4-chip length and the spreading factor is four, i.e., one symbol is spread, with a 4—chip spread code, the delay resolution is equal to the 1-chip length and the maximum delay is the 3-chip length, whereby the number of branches is approximately four at best. With the FHSS scheme, the delay resolution corresponds to a spread bandwidth, and the maximum delay is determined by a hop sequence length. Therefore, if the spread bandwidth is narrow and the hop sequence length is short, the maximum number of effective branches is limited, to a small number.

Furthermore, with the THSS scheme, the delay resolution corresponds to a pulse width and the maximum delay is determined by a pulse sequence length. Therefore, if the pulse width is wide and the pulse sequence length is short, the number of branches is limited to a small number. Similarly, with the OFDM scheme, the delay resolution corresponds to a frequency bandwidth over which subcarriers are distributed, and the maximum delay is determined by a guard interval length. Therefore, when the frequency bandwidth is narrow and a guard interval is short, the maximum number of effective branches is limited to a small number. With the PSK-VP scheme or the PSK-RZ scheme, where the maximum delay cannot in principle exceed the symbol length, the delay resolution is close to the maximum delay in the first place.

Where an equalizer is used, the delay resolution is determined by the symbol length and the maximum delay is determined by a tap length of an equalizer filter. Therefore, a case similar to those described above occurs if the temporal length of the filter tap is shorter than the symbol length. Note that with an equalizer, where the number of taps significantly influences the circuit scale, the maximum delay is in many cases limited due to the circuit scale limitation.

On the other hand, according to the transmission method, in which the modulation scheme, disclosed in patent document 2, having the phase transition synchronous with the symbol is adopted for the transmission diversity without interposing any delay, in a case where the delay dispersion in the propagation path can be ignored, even if levels of the arriving waves transmitted from a plurality of transmission antennas are secured, the two arriving signals cancel each other out when a phase relationship between the two arriving signals is reversed. Thus, the path diversity effect cannot be exerted.

FIG. 56 is a schematic diagram illustrating a case where a phase relationship between the arriving signals is reversed in the modulation scheme disclosed in patent document 2. As shown in FIG. 56, even if a phase transition of each of the arriving signals has a convex shape, the detection output disappears when there is no delay between the two arriving signals and a phase relationship between the two arriving signals is reversed. Thus, an improved effect cannot, be exerted.

FIG. 57 is a schematic diagram illustrating a relationship between a bit error rate and the delay amount t in the transmission scheme disclosed in patent document 2. In FIG. 57, the horizontal axis represents the delay amount between arriving signals in a two-wave model and the vertical axis represents the bit error rate. As described with reference to FIG. 56, when the delay amount t between the two arriving waves is small, the improved effect cannot, be exerted if a phase relationship between the arriving waves is reversed, thereby deteriorating an error rate. The bit error rate is improved as the delay amount $\tau$ is relatively increased, and the effective segment becomes shorter as the delay amount $\tau$ becomes equal to the symbol length T. Then, the effective segment finally disappears and the bit error rate starts to deteriorate again.

This will now be described in detail with respect to the PSK-VP scheme based on the results of a characteristic evaluation.

FIG. 58 is a diagram illustrating the bit error rate characteristics relative to the arrival time difference between two waves in a 2-wave Rician model of a quadrature PSK-VP scheme (hereinafter, referred to as a QPSK-VP scheme). The horizontal axis represents the arrival time difference normalized with the symbol length T, and the vertical axis represents the bit error rate. Note that a transmission path is a two-wave Rician fading environment where Eb/No=25 dB. FIG. 53 indicates that when the arrival time difference is within a range from 0.3-symbol length to 0.7-symbol length, the path diversity provides an active improvement, realizing desirable bit error rates less than or equal to 1E-5. Thus, the delay resolution and the maximum delay with which an active improvement due to the path diversity can be obtained are approximately 0.3-symbol length and 0.7-symbol length, respectively.

Patent document 2 discloses the method in which the transmission diversity is realized by deliberately interposing a predetermined delay between the transmission signals (FIG. 55). Taking into consideration a path difference between the propagation paths, and assuming that delay dispersion is added to each of the propagation paths, the delay amount interposed by the delay unit 901 is set, as shown by $\tau_s$ in FIG. 57, to be a value corresponding to a center of the bottom of an error rate characteristic curve (a desirable error rate segment). Considering a resistance to the delay dispersion (delay resistance) occurred in each of the propagation paths, however, when the conventional transmission diversity is used, there is a problem in that a relatively large delay $\tau_s$ must be previously interposed between the transmission signals at the transmission side against an amount of delay resistance, indicated by the "desirable error rate segment", which is a capacity obtained when using the conventional, modulation scheme, and thus the amount of delay resistance is substantially decreased.

Under limitations on the amount of delay resistance as described above, FIG. 59 is a diagram illustrating the bit error rate characteristics for two received waves (two reception timings) and for three received waves (three reception timings) in the QPSK-VP scheme, and FIG. 60 shows a temporal relationship between the two waves and the three waves used in FIG. 59. Note that each received wave is a Rician fading wave, and the three-wave model is a transmission path model where the third wave is inserted at a temporal position in the middle between the two waves. As shown in FIG. 59, the bit error rate deteriorates when the third wave is inserted between the first two waves, as compared with a case where the number of waves to be received is two. This makes it clear that the third wave in the three-wave model is not separated from the other two waves, thereby giving the same interference or increasing the correlation, thus resulting in deterioration. That is, it is effective if the number of transmission waves having a delay therebetween is two or less, as shown in FIG. 55. However, with the third transmission wave additionally provided, the transmission characteristic rather deteriorates.

As described above, if the delay resolution, with which delayed wave components are separated from each other, is significantly close to the maximum delay, the maximum number of effective branches that contribute to the path diversity effect is limited to a small number. Thus, the transmission characteristic deteriorates if carelessly adding a path having a delay.

Therefore, an object of the present invention is to provide a wireless transmission system and a wireless transmission method capable of increasing the maximum number of effective branches that contribute to the path diversity effect, and exerting a maximum path diversity effect even if the maximum number of effective branches is limited to a small number, and to provide a wireless station and a transmitting station used therein.

The present invention is directed to a wireless transmission system which constitutes a path diversity by a plurality of wireless stations, a receiving station and multipath transmission paths formed between the receiving station and each of the respective wireless stations, and which causes each of the wireless stations to transmit a signal to the receiving station, and also directed to a wireless station and a transmitting station as well as a method, all of which are used in the wireless transmission system. To achieve the above objects, the present invention has the following structures.

Each of the wireless stations includes: a waveform selection controlling section for selecting one symbol waveform from among a plurality of candidates of symbol waveforms different from each other; a modulating section for generating a transmission signal based on the transmission data by using the symbol waveform selected by the waveform selection controlling section; a transmission timing controlling section for determining, as a transmission start timing of starting transmission of the transmission signal, a timing delayed from a reference timing, which is a reference used for transmitting the transmission signal, by a predetermined delay amount; and a transmitting section for transmitting the transmission signal at the transmission start timing determined by the transmission timing controlling section. The receiving station includes a receiving section for receiving the transmission signal transmitted from the transmitting section. The predetermined delay amount is set such that a number of reception timings, each indicating a timing at which the receiving section receives the transmission signal, is set for each of the symbol waveforms different from each other, so as to be a plural number and to be less than or equal to a predetermined number, and such that each time difference between the reception timings is greater than or equal to a predetermined delay resolution, and such that a difference between a maximum value and a minimum value of each of the reception timings is less than or equal to a predetermined maximum delay. Desirably, the receiving station obtains a detection signal by performing delay (differential) detection.

Preferably, each of the predetermined delay resolution and the predetermined maximum delay is set to be a value with which a plurality of delayed waves are received by using the path diversity. Furthermore, the reference timing retained by each of the wireless stations is a same timing which is previously determined.

The wireless transmission system may further comprise a transmitting station for transmitting a signal, to be transmitted to the receiving station, to each of the wireless stations. In this case, each of the wireless stations may further include a timing detecting section for receiving the signal transmitted from the transmitting station and detecting each of the reception timings, and the transmission timing controlling section may determine, as the reference timing, a timing detected by the timing detecting section, and the transmitting section may transmit the signal received by the timing detecting section to the receiving station. The timing detecting section preferably detects a unique word included in the signal.

Alternatively, the wireless transmission system may further comprise a transmitting station for transmitting a signal, to be transmitted to the receiving station, to each of the wireless stations, and the transmitting station may include: a transmission timing controlling section for determining the transmission start timing of transmitting a signal to each of the wireless stations and further determining, as a retransmission start timing of transmitting a signal to the receiving station, a timing delayed from the reference timing by the predetermined delay amount; and a transmitting section for transmitting a signal to each of the wireless stations at the transmission start timing and further transmitting a signal to the receiving station at the retransmission start timing. In this ease, each of the wireless stations may further include a timing detecting section for receiving the signal transmitted from the transmitting station and detecting each of the reception timings, and the transmission timing controlling section may determine, as the reference timing, a timing detected by the timing detecting section, and the transmitting section may perform relay transmission of the signal received by the timing detecting section to the receiving station.

Still alternatively, the wireless transmission system may further comprise a transmitting station for transmitting a signal, to be transmitted to the receiving station, to each of the wireless stations, and the transmitting station may further include: a delay amount/symbol waveform determining section for selecting one delay amount to be given to the signal transmitted from each of the wireless stations from among a plurality of candidate values and also selecting one symbol waveform to be used by each of the wireless stations for generating the transmission signal from among the plurality of candidates of the symbol waveforms; delay amount/symbol waveform adding sections, each for adding the delay amount, and the symbol waveform selected by the delay amount/symbol waveform determining section to the signal, and a transmitting section for transmitting, to each of the wireless stations, the signal to which the delay amount and the symbol waveform are added by each of the delay amount/symbol waveform adding sections. In this case, each of the wireless stations may further include a delay amount/symbol waveform extracting section for receiving the signal transmitted from the transmitting station and extracting the delay amount and the symbol waveform added to the signal, and the transmission timing controlling section may determine, as the transmission start timing, a timing delayed from the reference timing by the delay amount extracted by the delay amount/symbol waveform extracting section, and the modulating section may generate the transmission signal based on the transmission data by using the symbol waveform extracted by the delay amount/symbol waveform extracting section.

Preferably, the plurality of wireless stations are arranged such that communication areas of the respective wireless stations adjacent to and spaced less than a predetermined distance from each other, partially overlap one another, and the delay amount/symbol waveform determining section adjusts the delay amount such that the receiving station receives signals transmitted from the wireless stations adjacent to each other at different timings, and the receiving station receives, at the same timing, signals transmitted from the wireless stations for which the same delay amount is set. Furthermore, it is desirable that the plurality of wireless stations are arranged in a linear manner. Still furthermore, it is also desirable that a plurality of sets of the wireless stations are provided, each set including at least two wireless stations arranged in a linear manner, and the plurality of sets of the wireless stations are arranged in parallel with each other.

Furthermore, each of the wireless stations may further include a delay amount setting section for selecting the predetermined delay amount from among a plurality of candidate values or detecting the delay amount from among the plurality of candidate values on a random basis. Still furthermore, the waveform selection controlling section may select, for each of the wireless stations, the one symbol waveform from among the plurality of candidates thereof on a random basis.

Preferably, each of the wireless stations generates the transmission signal, in which the symbol waveforms of any two symbols separated from each other by a predetermined number of symbols are identical to each other regardless of the transmission data and in which a phase difference between the any two symbols is determined based on the transmission data. Each of the wireless stations generates the transmission signal when the predetermined number of symbols is set to be 1, and uses, as the phase difference, any angle obtained by equally dividing $2\pi$ by a number corresponding to a power of 2.

Furthermore, each of the wireless stations preferably includes: in the candidates of the symbol waveforms having a predetermined number of types, at least a first symbol waveform having a phase transition in which a phase increases in a chronological direction and a second-order differential coefficient calculated from a chronological change of the phase is not always zero during one symbol period, and a second symbol waveform having a phase transition in which a phase decreases in the chronological direction and the second-order differential coefficient calculated from the chronological change of the phase is not always sere during the one symbol period; or at least a first symbol waveform and a second symbol waveform, each having a phase transition in which an amount of a chronological change of a phase decreases before a predetermined point during one symbol period and increases after the predetermined point during the one symbol period; or at least a first symbol waveform and a second symbol waveform, each having a phase transition in which an amount of a chronological change of a phase increases before a predetermined point during one symbol period and decreases after the predetermined point during the one symbol period; or at least a first symbol waveform and a second symbol waveform, each having a phase transition in which an amount of a chronological change of a phase decreases during an entirety of one symbol period; or at least a first symbol waveform having a phase transition in which a phase increases and then decreases in a chronological direction and a second-order differential coefficient calculated from a chronological change of the phase is not always zero during one symbol period, and a second symbol waveform having a phase transition in which a phase decreases and then increases in the chronological direction and the second-order differential coefficient calculated from the chronological change of the phase is not always zero during the one symbol period; or at least a first symbol waveform and a second symbol waveform, each having a phase transition in which an amount of a chronological change of a phase decreases before a predetermined point, during one symbol period and increases after the predetermined point during the one symbol period; or at least a first symbol waveform and a second symbol waveform, having phase transitions in which phases before the center of the one symbol period and the phases after the center of the one symbol period are changed in a symmetrical manner.

according to the present invention, even in the case where the number of branches which can obtain the path diversity effect is limited to a small number, the maximum path diversity effect can be exerted by using combinations, each containing a transmission timing and a symbol waveform, both are selected from among a plurality of transmission timings and a plurality of symbol waveforms, respectively. Therefore, it becomes possible to improve the transmission characteristic of the wireless transmission system.

BRIEF DESCRIPTION OF TEE DRAWINGS

FIG. 4 is a diagram illustrating an exemplary differential encoding rule and a signal space diagram in the wireless transmission system according to the first embodiment of the present invention.

FIG. 7 is a block diagram illustrating an exemplary detailed structure of a receiving station 12.

FIG. 11 is a diagram illustrating the phase relationship, represented by vectors, between the arriving signal A and the arriving signal B.

FIG. 16A is a schematic diagram illustrating phases of a direct wave and delayed wave of a transmission signal A, which change on a symbol-by-symbol basis.

FIG. 16B is a schematic diagram illustrating phases of a direct wave and delayed wave of a transmission signal B, which change on a symbol-by-symbol basis.

FIG. 19A is a schematic diagram illustrating the phase transition, represented by vectors, between the direct wave and delayed wave of the transmission signal A.

FIG. 26 is a block diagram illustrating another exemplary detailed structure of the modulating section 21c.

FIG. 27 is a diagram illustrating a structure of the wireless transmission system according to a second embodiment of the present invention.

FIG. 28 is a diagram illustrating a configuration of a frame used in a signal transmitted from a transmitting station 13 and then from a wireless station 14.

FIG. 34 is a flowchart illustrating an operation of the transmitting station 15.

FIG. 35 is a diagram illustrating timings at which the transmitting station 15 and the wireless stations A1 to D1 transmit signals.

FIG. 36 is a diagram illustrating another structure of the wireless transmission, system according to a third embodiment of the present, invention.

FIG. 44 is a diagram illustrating a relationship between a path length difference Δz and the distance x between the reserving station 12 and the wireless station.

FIG. 50 is a diagram illustrating of an example of assigning an arriving timing and a symbol waveform to each wireless station.

FIG. 56 is a schematic diagram illustrating a case where a phase relationship between the arriving signals is reversed in a conventional modulation system.

FIG. 60 is a diagram illustrating a temporal relationship between the two waves and the three waves used in FIG. 59

Figure 1:
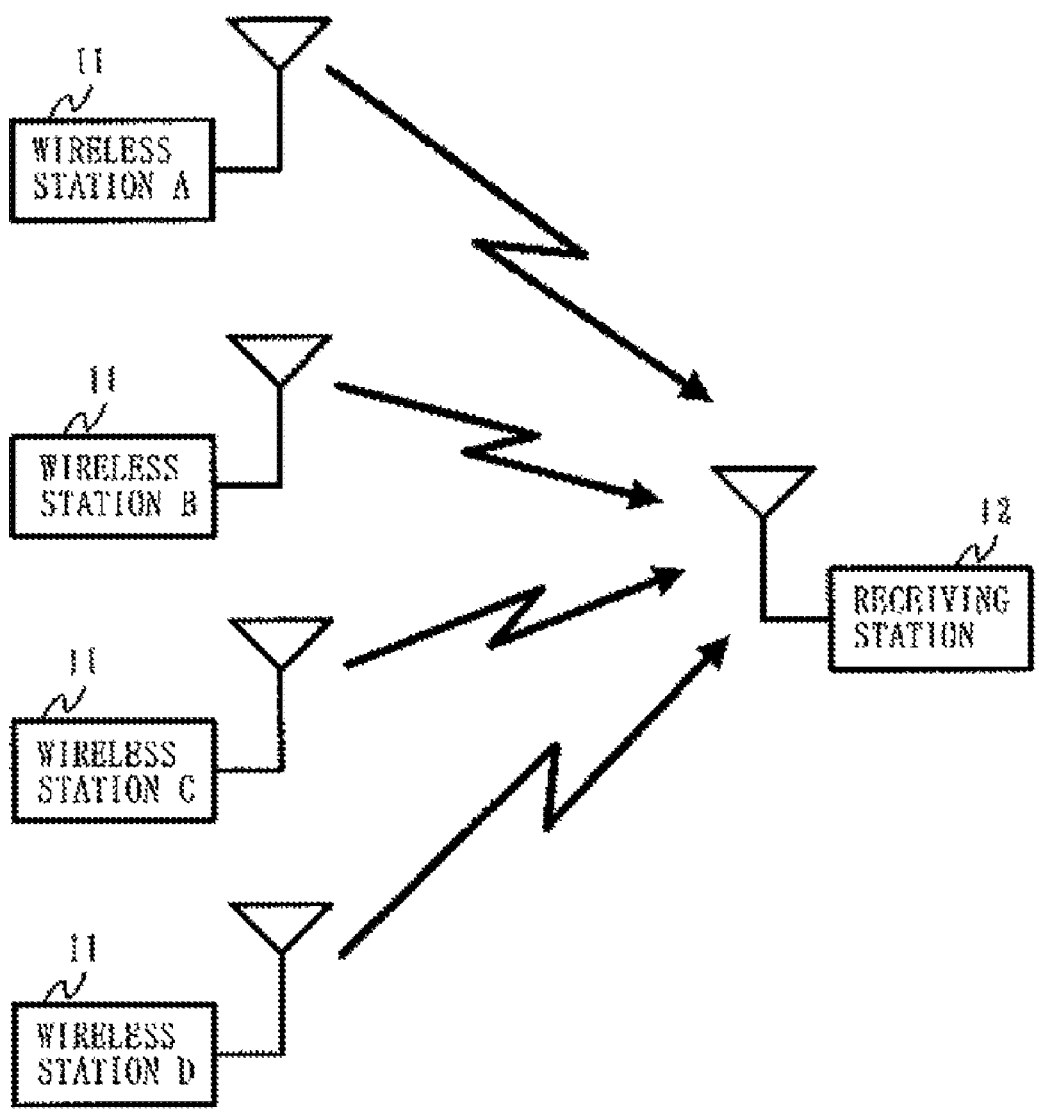
FIG. 1 is a diagram illustrating a structure of a wireless transmission system according to a first embodiment of the present invention.

DESCRIPTION OF THE REFERENCE CHARACTERS 11, 14, 17, 20 wireless station
12 receiving station
13, 15, 16 transmitting station
21, 21c, 132 modulating section
22 data retaining section
23, 151 transmission timing controlling section
24, 32, 153 RF section
25, 31 antenna
26 waveform, selection controlling section
27 UW detecting section
28 delay amount setting section
29, 33 demodulating section
30 waveform setting section
41 read controlling section
42 waveform storing section
43, 1808, 1809 D/A converter
44 delay adding section
129 delay amount/symbol waveform extracting section
161 delay amount/symbol waveform determining section
162A to 162D delay amount/symbol waveform adding section
1601 delay unit
1602, 1603 multiplier
1604, 1605 phase shifter
1606, 1607, 1810, 1811 low-pass filter
1801 oscillator
1802 L divider
1803, 1804 counter
1805, 1806 shift register

DETAILED DESCRIPTION OF THE INVENTION

First Embodiment

FIG. 1 is a diagram illustrating a structure of a wireless transmission system according to a first embodiment, of the present invention. The wireless transmission system shown in FIG. 1 comprises a plurality of wireless stations 11 and a receiving station 12. Each of the wireless stations 11 is wirelessly connected to the receiving station 12, FIG. 1 shows an example where the number of wireless stations 11 is four. However, the number of wireless stations may be set to any number. Hereinafter, when it is necessary to distinguish among these four wireless stations 11, the wireless stations are referred to as wireless stations A to D. On the other hand, when it is unnecessary to distinguish among the four wireless stations 11, the wireless stations are generically referred to as the wireless station(s) 11.

Each wireless station 11 retains transmission data to be transmitted to the receiving station 12 and a reference timing signal indicating a timing used as a reference for transmitting the transmission data (hereinafter, referred to as a reference timing). The transmission data and the reference timing signal retained by the wireless station 11 are common among all wireless stations 11.

Furthermore, the wireless stations A to D retain delay amounts tA to tD, respectively. Each of the delay amounts tA to tD corresponds to any of delay amount candidate values (T1 or T2, for example). In addition, each of the wireless stations A to D generates a transmission signal based on any of symbol waveform candidates (W1 or W2, for example) so as to transmit data, giving each of the corresponding delay amounts tA to tD to the reference timing indicated by the reference timing signal.

The receiving station 12 receives four signals transmitted respectively from the wireless stations A to D.

Figure 2:
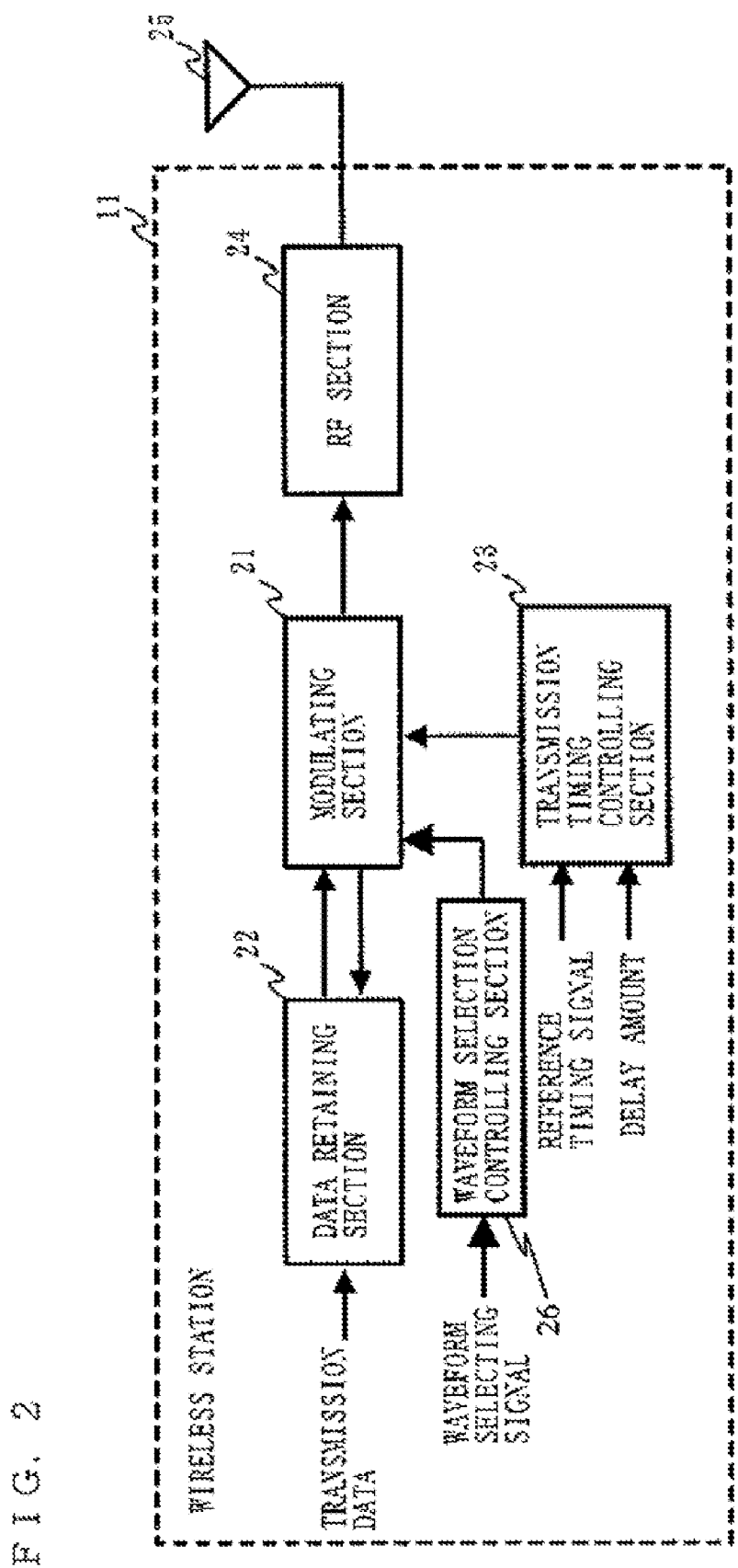
FIG. 2 is a block diagram illustrating an exemplary detailed structure of a wireless station 11.
Figure 3:
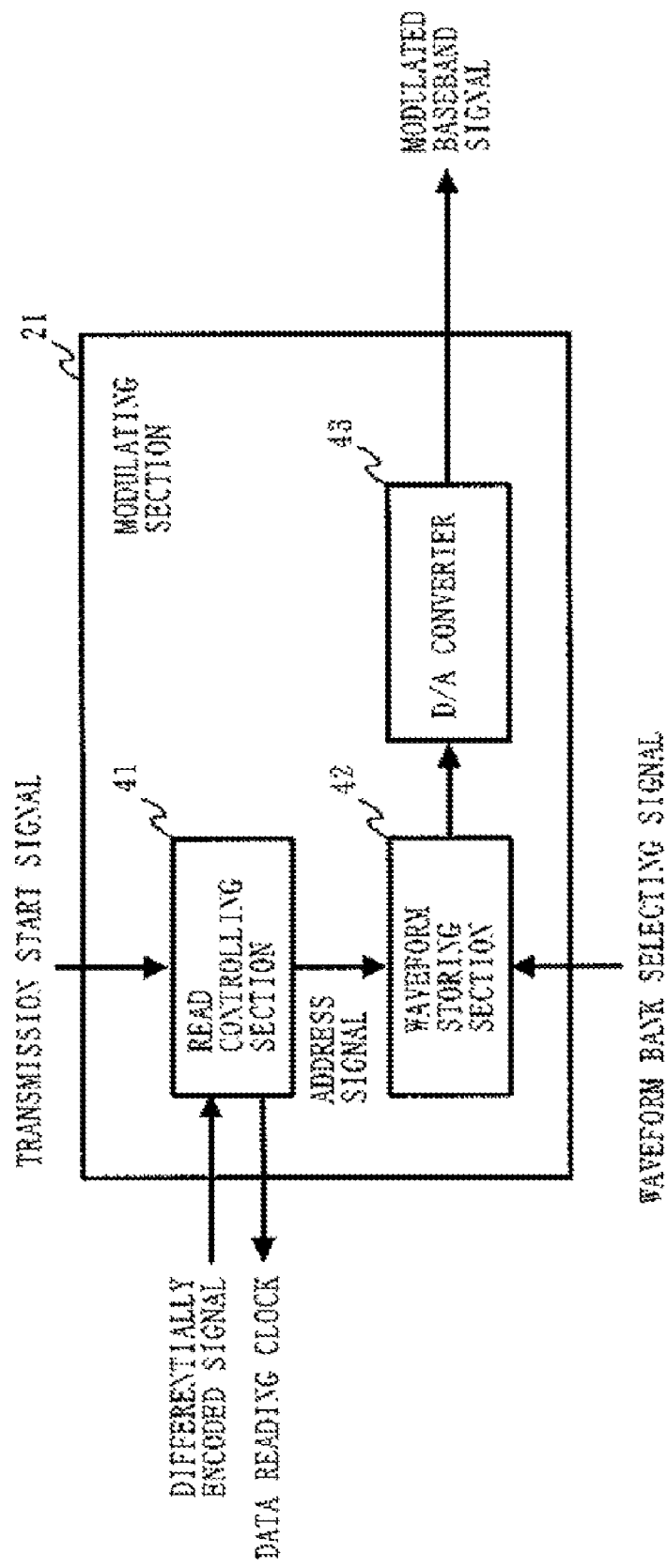
FIG. 3 is a block diagram illustrating an exemplary detailed structure of a modulating section 21.

FIG. 2 is a block diagram illustrating an exemplary detailed structure of the wireless station 11 shown in FIG. 1. FIG. 3 is a block diagram illustrating an exemplary detailed structure of a modulating section 21 shown in FIG. 2. The wireless station 11 includes the modulating section 21, a data retaining section 22, a transmission timing controlling section 23, an RF section 24, an antenna 25, and a waveform selection controlling section 26. The modulating section 21 has a read controlling section 41, a waveform storing section 42, and a D/A conversion section 43. The RF section 24 and the antenna 25 form a transmitting section.

The transmission timing controlling section 23 controls a transmission timing of a signal to be transmitted to the receiving station 12 based on a reference timing signal and a predetermined delay amount. Specifically, the transmission timing controlling section 23 determines, as a transmission start timing, a timing delayed from the reference timing, which is indicated by the reference timing signal, by a delay amount. Then, when the transmission start timing arrives, the transmission timing controlling section 23 generates a transmission start signal for designating a transmission start, and then passes the generated signal to the modulating section 21. Upon receiving the transmission start signal, the modulating section 21 issues a request for transmission data to the data retaining section 22, and then performs a predetermined modulation on the transmission data having been acquired in response to the request. In response to the request from the modulating section 21, the data retaining section 22 reads previously-retained transmission data, and then passes the read data to the modulating section 21. The RF section 24 converts the signal modulated by the modulating section 21 into a signal having an RF frequency band, and then transmits the signal whose frequency has been converted, from the antenna 25. The waveform selection controlling section 26 generates a waveform bank selecting signal which is used for a corresponding symbol waveform to be read from a waveform table, and then passes the generated signal to the modulating section 21.

The read controlling section 41 is formed by a counter which operates with a base clock, and generates, based on a counter value obtained when receiving the transmission start signal, a data reading clock for reading the transmission data and an address signal for reading data of a symbol waveform from a waveform memory. The data reading clock is outputted to the data retaining section 22, and the address signal is outputted to the waveform storing section 42. The data retaining section 22 passes, to the read controlling section 41, the differentially encoded transmission data synchronizing with the data reading clock. The waveform storing section 42 reads, from the wave form memory, symbol waveform data corresponding to the transmission data based on the address signal. The D/A conversion section 43 converts the digital data having been read by the waveform storing section 42 into an analog signal so as to be outputted as a modulated baseband signal.

Thus, a timing of outputting the modulated baseband signal varies in units of base clock counts in accordance with a timing at which the transmission start signal is received. Furthermore, usually in the base clock, a frequency several times to several dozen times as high as a symbol frequency (an inverse of a symbol length) is used. Therefore, a timing of outputting a modulated baseband signal can be adjusted in units of one-severalth to one-several-tenths of the symbol length.

Figure 5:
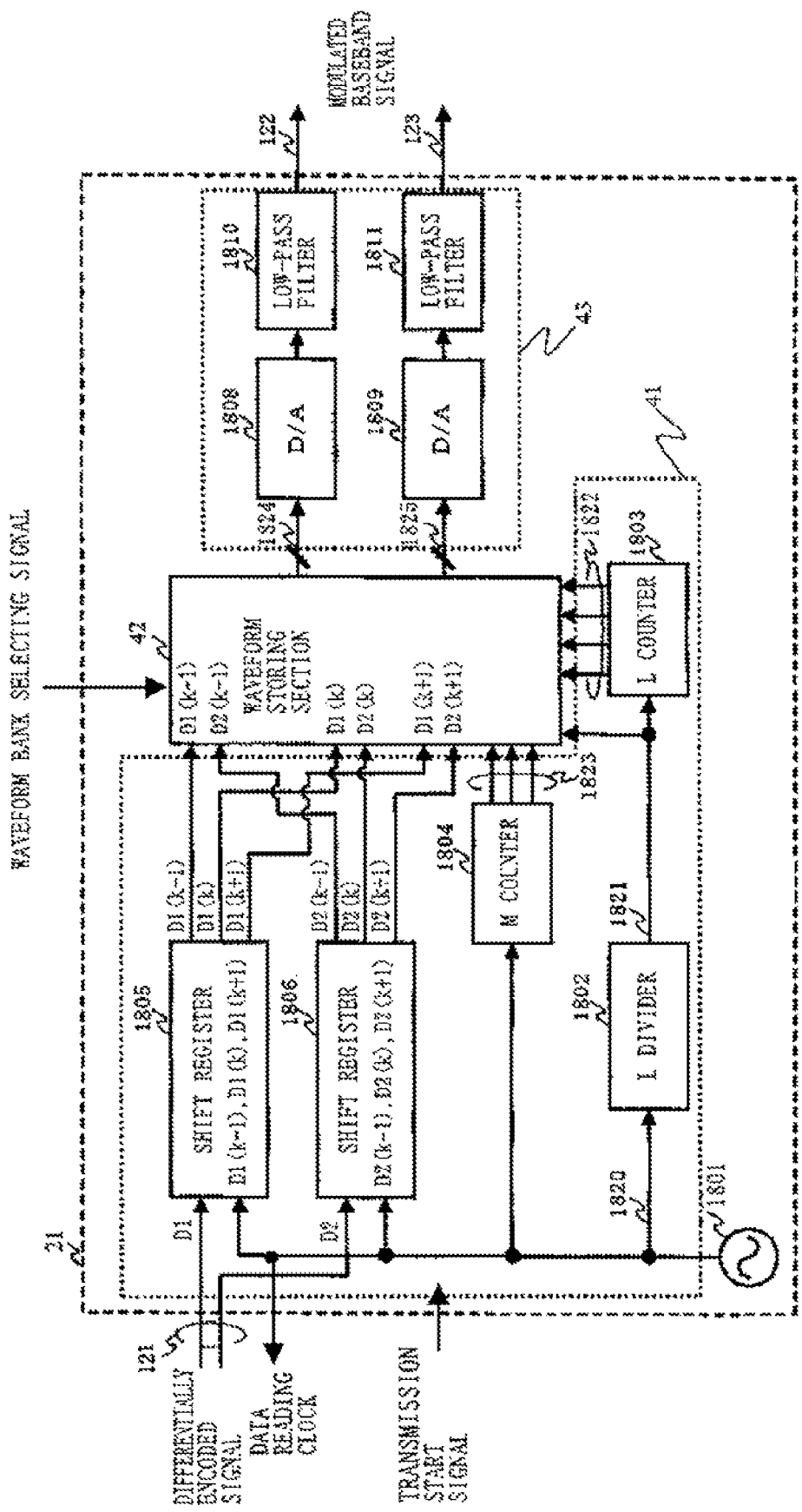
FIG. 5 is a diagram illustrating an exemplary internal structure of each block of the modulating section 21.

With reference to FIG. 4 and FIG. 5, a transmission signal used by the wireless transmission system of the present invention, a method of generating the same transmission signal, and an exemplary detailed configuration thereof will be described in more detail. FIG. 4 is a diagram illustrating an exemplary differential encoding rule and a signal space diagram in the wireless transmission system according to the first, embodiment of the present invention. FIG. 5 is a diagram illustrating an exemplary internal structure of each block of the modulating section 21 shown in FIG. 3. The modulating section 21, in which a predetermined, symbol waveform is stored, outputs baseband modulated signals 122 and 123 in accordance with a differentially encoded signal.

In the data retaining section 22, a serial parallel conversion is performed on transmission data, which, is inputted thereto, so as to convert its input bit sequence into a sequence represented using symbols, and a differential encoding is performed on the transmission data, thereby obtaining an in-phase axis signal I and quadrature axis signal Q (a differentially encoded signal 121) of each symbol. In general, the differential encoding can be performed using the number of phases equal to a power of 2. Furthermore, each of the phases may be further shifted clockwise or counterclockwise by a predetermined amount, (i.e., the phases may be symmetrically arranged with each other for each adjacent symbol), and a Differential Amplitude Phase Shift Keying (DAPSK), which further loads information in an amplitude direction in accordance with the transmission data, may be used. Hereinafter, the present invention will be described by taking as an example a case where a differential encoding is performed using four phases (which are not symmetrically arranged with each other). Specifically, in this case, the in-phase axis signal $I_k$ and quadrature axis signal $Q_k$ of a k-th symbol (k is an integer greater than or equal to 0) are calculated in accordance with the following formula (2) by using the in-phase axis signal $I_{k-M}$ and quadrature axis signal of a $Q_{k-M}$ oa a K-M-th symbol (M is an integer greater than or equal to 1) which indicates a symbol preceding the k-th symbol by M symbols. Note that $\Delta\theta_k$ represents a phase rotation amount.

$$\begin{cases} I_k = I_{k-M} \cdot \cos\Delta\theta_k - Q_{k-M} \cdot \sin\Delta\theta_k \\ Q_k = I_{k-M} \cdot \sin\Delta\theta_k - Q_{k-M} \cdot \cos\Delta\theta_k \end{cases} \quad (2)$$

In accordance with (a) of FIG. 4, phase rotation amounts $\Delta\theta_k$ of continuous two pieces of data (represented using symbols) $X_1(k)$ and $X_2(k)$ having two bits, which are included in the transmission data are determined. Next, a signal diagram of a signal point $S_k(I_k, Q_k)$ of the k-th symbol is determined by the formula (2) only if an initial value $S_0$ ($I_0$, $Q_0$) is determined. This can be shown as (b) of FIG. 4. Then, based on signal points $S_k(1,0)$, $S_k(0,1)$, $S_k(-1,0)$ and $S_k(0,-1)$, which are shown in (b) of FIG. 4, a differentially encoded signal ($D_1(k)$, $D_2(k)$) is obtained in accordance with (c) of FIG. 4.

In FIG. 5, the modulating section 21 includes a base clock oscillator 1801, an L divider 1802, an L counter 1803, an M counter 1804, the read controlling section 41 formed by shift registers 1805 and 1806, the waveform storing section 42, and the D/A conversion section 43 formed by D/A converters 1808 and 1809 and low-pass filters 1810 and 1811.

Figure 6:
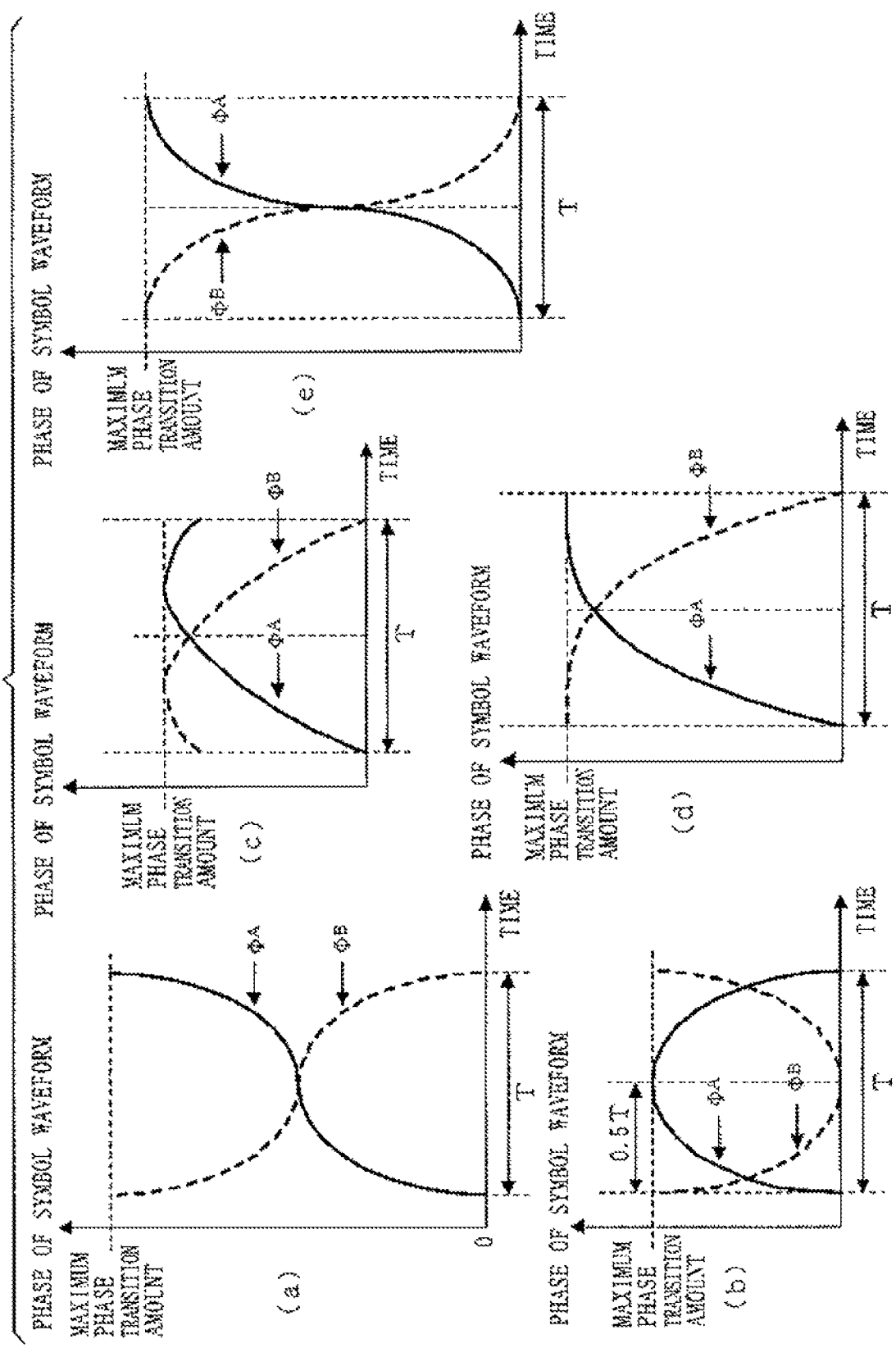
FIG. 6 is a schematic diagram illustrating exemplary phase transitions, each comprised of symbol waveforms generated by the modulating section 21.

FIG. 6 shows various examples of phase transitions, each comprised of symbol waveforms from, which the baseband modulated signals 122 to 123 generated by the modulating section 21 are to be made. A condition required for the symbol waveforms is that a second-order differential coefficient calculated from an amount of change is not always "0" during a symbol. Then, if the symbol waveforms used by a modulation/demodulating section of each, of the wireless stations different from each other are, for example, a combination, as shown in (a) of FIG. 6, in which a first symbol waveform has a phase transition shown by a solid line and a second symbol waveform has a phase transition shown by a dotted line, a unique diversity effect to be described later will be obtained. Note that (a) to (e) of FIG. 6 are merely examples of the phase transitions. The phase transitions may be different if the aforementioned condition is satisfied. Furthermore, the phase transition of the first symbol waveform and the phase transition of the second symbol waveform do not have to be symmetrical with each other. The phase transitions of the first, and second symbol waveforms may be all types of combinations of solid and dotted lines, or any combination of solid lines only or dotted lines only, which are all shown in (a) to (e) of FIG. 6.

Furthermore, a maximum of M types of symbol waveforms can be periodically used for a transmission signal transmitted from a single wireless station. The same type of symbol waveform may be repeatedly included in the M types of symbol waveforms. In the case of M=1, one type of symbol waveform is used. Note that in order to obtain the unique diversity effect to be described later, during a symbol, symbol, waveforms corresponding to the same transmission data transmitted from different wireless stations have to be different from each other. When different symbol waveforms are used among a plurality of wireless stations, there may be a case where the symbol waveforms are denoted as W1, W2 . . . . However, in the case where M=1, only one type of symbol waveform is used, and therefore the used symbol waveform represents its symbol waveform only. On the other hand, in the case where M>1, if M types of symbol waveform series, with which M types of symbol waveforms are replaced, are denoted as W1, W2 . . . , a similar operation effect can be obtained. Thus, symbol waveforms used among the plurality of wireless stations are hereinafter denoted as W1, W2 . . . in the sense that each symbol waveform also includes its waveform series.

During a symbol corresponding to a symbol length T ($0 \leq t \leq T$), when a combination of the waveforms as shown in (a) of FIG. 6 is selected, a phase transition $\Phi^A_m(t)$ of an m-th ($1 \leq m \leq M$) symbol waveform of the baseband modulated signal generated by the modulating section 21 of a first wireless station, and a phase transition $\Phi^B_m(t)$ of the m-th symbol waveform of the baseband modulated signal generated by the modulating section 21 of a second wireless station different from the first, wireless station are represented by the following formulas (3) and (4), for example.

$$\Phi^A_m(t) = \begin{cases} (2\phi_{MAX}/T^2) \cdot t \cdot (T-1); & (0 < t \leq T/2) \\ -(2\phi_{MAX}/T^2) \cdot t \cdot (T-t) + \phi_{MAX}; & (T/2 < t < T) \end{cases} \quad (3)$$

$$\Phi^B_m(t) = \begin{cases} -(2\phi_{MAX}/T^2) \cdot t \cdot (T-t) + \phi_{MAX}; & (0 < t \leq T/2) \\ (2\phi_{MAX}/T^2) \cdot t \cdot (T-1); & (T/2 < t < T) \end{cases} \quad (4)$$

When a phase of a signal point, shown in (b) of FIG. 4, of a q-th symbol (q is an integer) is denoted by $\theta_q$, a phase $\theta(t)$ representing transmission data which has been differentially encoded is represented by the following formula (5) using a step function U(t).

$$\theta(t) = \sum_{q=-\infty}^{\infty} \theta_q \cdot \{U(t - qT) - U(t - (q-1)T)\} \quad (5)$$

where $U(t) \equiv \begin{cases} 1; & (t \geq 0) \\ 0; & (t < 0) \end{cases}$

When the phase transition $\Phi^A_m(t)$ is defined only within 0<t<T, and is 0 within sections other than 0<t<T, a phase transition $\Psi^A(t)$ of the baseband modulated signal is represented by the following formula (6), $$\psi^A(t) = \sum_{p=-\infty}^{\infty} \sum_{m=1}^{M} \Phi^A_m(t - (pM + m - 1)T) + \theta(t) \quad (6)$$

where $\Phi^A_m(t) \equiv 0; (t \leq 0, t \geq T)$

Thus, based on the phase transition $\Psi^A(t)$ of the baseband modulated signal, an in-phase modulated signal $Y^A_I(t)$ and a quadrature modulated signal $Y^A_Q(t)$ are represented by the following formula (7).

$$\begin{cases} Y^A_I(t) = \cos\psi^A(t) \\ Y^A_Q(t) = \sin\psi^A(t) \end{cases} \quad (7)$$

Basically, quadrature modulation is performed on a carrier wave by these signals, thereby obtaining an RF-band modulated signal. Since the RF-band modulated signal thus obtained is a wideband signal, the band of the signal may be limited by using a band limiting filter. In this case, when an impulse response of the band limiting filter is denoted by h(t), the in-phase modulated signal $Y^A_I(t)$ and quadrature modulated signal $Y^A_Q(t)$ obtained after the bands thereof are limited are represented by not the aforementioned formula (7) but the following formula (8).

$$\begin{cases} Y_I^A(t) = \int_{-t_0}^{+t_0} \cos\psi^A(t-\tau) \cdot h(\tau)\,d\tau \\ Y_Q^A(t) = \int_{-t_0}^{+t_0} \sin\psi^A(t-\tau) \cdot h(\tau)\,d\tau \end{cases} \quad (8)$$

Similarly, based on the phase transition $\Phi^B{}_m(t)$ of the symbol waveform shown in (a) of FIG. 6, a phase transition $\Psi^B(t)$ of the baseband modulated signal generated by the modulating section 21 of the second wireless station is also represented by the following formula (9).

$$\psi^B(t) = \sum_{p=-\infty}^{\infty} \sum_{m=1}^{M} \Phi_m^B(t-(pM+m-1)T) + \theta(t) \quad (9)$$

where $\Phi_m^B(t) \equiv 0; (t \le 0, t \ge T)$

The in-phase modulated signal $Y^A{}_I(t)$ and the quadrature modulated signal $Y^A{}_Q(t)$ are represented by the following formula (10).

$$\begin{cases} Y_I^B(t) = \int_{-t_0}^{+t_0} \cos\psi^B(t-\tau) \cdot h(\tau)\,d\tau \\ Y_Q^B(t) = \int_{-t_0}^{+t_0} \sin\psi^B(t-\tau) \cdot h(\tau)\,d\tau \end{cases} \quad (10)$$

Note that an integration range $-t_0$ to $t_0$ of each of the aforementioned formulas (8) and (10) indicates a range of the spread of the impulse response h(t). Further, the band limiting filter may be a low-pass filter, and various characteristics (cosine roll-off, root Nyquist, Gauss, etc.) and parameters (cut-off rate, roll-off rate, etc.) can be used. In the present embodiment, the impulse response h(t) of a cosine roll-off filter having a cut-off angular frequency and a roll-off coefficient γ, for example, is represented by the following formula (11).

$$h(t) = \frac{(\omega_0/\pi) \cdot (\sin\omega_0 t / \omega_0 t)\cos\gamma\omega_0 t}{1 - (2\gamma\omega_0 t/\pi)^2} \quad (11)$$

The waveform storing section 42 stores the in-phase modulated signal $Y^A{}_I(t)$ and the quadrature modulated signal $Y^A{}_Q(t)$ in accordance with the aforementioned formula (8). In the modulating section 21 shown in FIG. 5, the range $-t_0$ to $t_0$ of the spread of the impulse response h(t) corresponds symbols including a current symbol and symbols immediately preceding and following the current symbol, for example. In this case, in the waveform storing section 42, all patterns of transmission data are calculated for the current symbol and the symbols immediately preceding and following the current symbol, and elements of the modulated signals of each of the symbols are stored. The inputted differentially encoded signal 121 is delayed by the shift registers 1805 and 1806, so as to be inputted to the waveform storing section 42 as signals from a k−1-th symbol to a k+1-th symbol, which are selected from the elements of the modulated signals centering on the k-th symbol.

The base clock oscillator 1801 oscillates a clock signal having a symbol frequency Fs, and the clock signal is inputted to each of the shift registers 1805 and 1806 as an operation clock. The M counter 1804 operates at the symbol frequency Fs, and inputs M different waveform selection signals 1823 to the waveform storing section 42. Thus, the waveform storing section 42 can select a plurality of different symbol waveforms for each period corresponding to U symbols. The waveform storing section 42 is a memory storing a waveform table including the elements of the modulated signals of each symbol, and the elements of the modulated signals of each symbol stored therein have L samples. By using a clock having a frequency L·Fs outputted from the L divider as a read clock and counter signals 1822 as a read address, a signal point of each symbol is sequentially read. The modulated signals of two axes are converted, by the D/A converters 1808 and 1809, respectively, into signals represented by analog values. Then, aliasing components of the signals thus obtained are removed by the low-pass filters 1810 and 1811 so as to be outputted as the baseband modulated signals 122 and 123, respectively. Although the modulating section 21 of the second wireless station stores waveforms different from those stored in that of the first wireless station, a structure and operation of the modulating section 21 of the second wireless station are completely the same as that of the first wireless station.

As represented by the aforementioned formula (7), when the band of the signal is not limited, it is unnecessary to have the shift registers 1805 and 1806. In this case, the differentially encoded signal 121 is directly inputted to the waveform storing section 42. Further, when a signal is differentially encoded so as to be delayed by one symbol (M=1), or when one type of symbol waveform is used, the M counter 1804 is unnecessary.

FIG. 7 is a block diagram illustrating an exemplary detailed structure of the receiving station 12 shown in FIG. 1. In FIG. 7, the receiving station 12 includes an antenna 31, an RF section 32, and a demodulating section 33. The RF section 32 and the antenna 31 form a receiving section. The RF section 32 converts a received signal, having an RF band, received by the antenna 31 into a received baseband signal. The demodulating section 33 demodulates the received baseband signal having been converted by the RF section 32 so as to obtain reception data.

Figure 8:
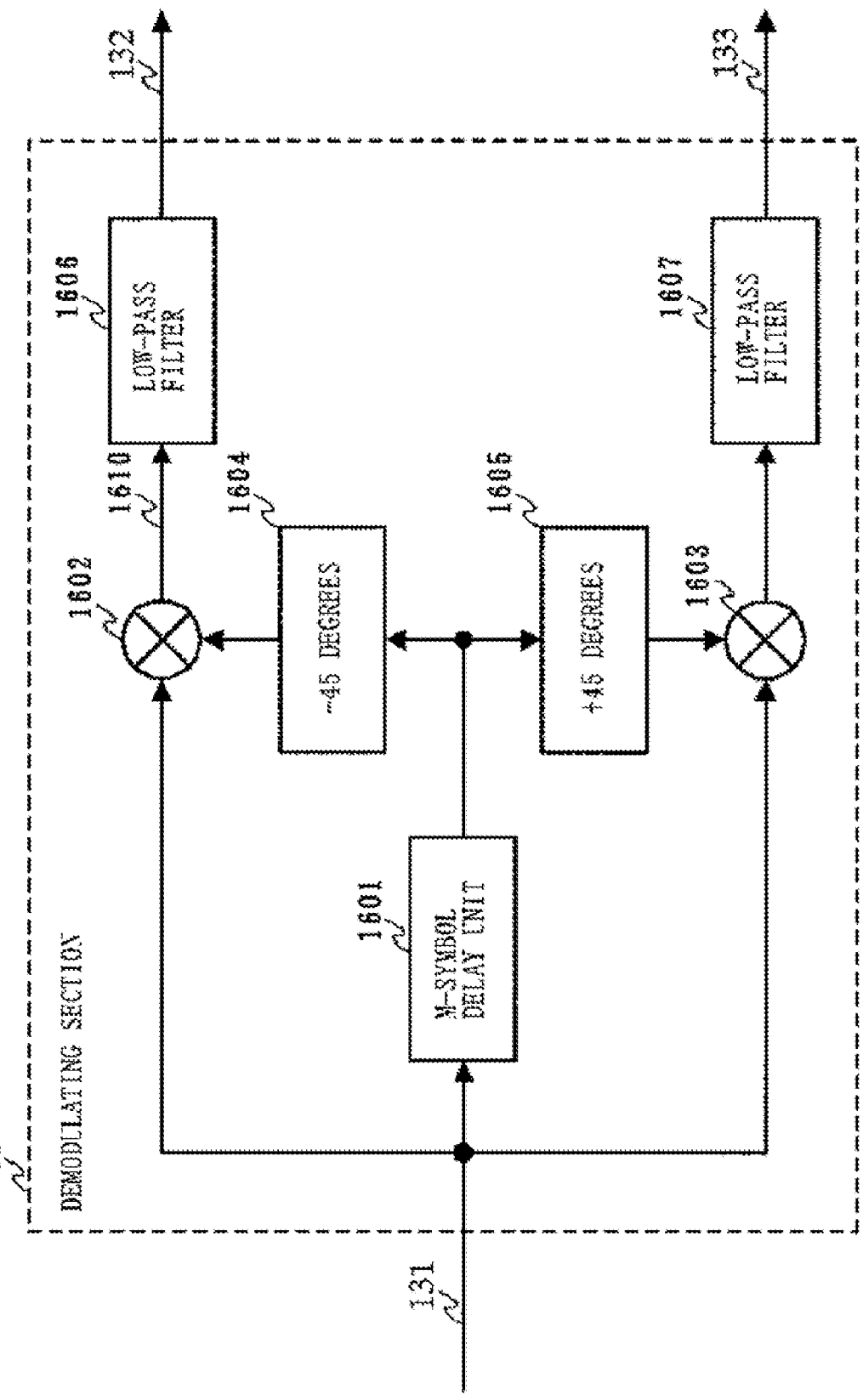
FIG. 8 is a block diagram illustrating an exemplary detailed structure of a demodulating section 33.

FIG. 8 is a diagram illustrating a detailed structure of the demodulating section 33 shown in FIG. 7. The demodulating section 33 has an M-symbol delay unit 1601, multipliers 1602 and 1603, a minus 45-degree phase shifter 1604, a plus 45-degree phase shifter 1605, and low-pass filters 1606 and 1607. The M-symbol delay unit 1601 delays the reception signal by an M-symbol length. The low-pass filters 1606 and 1607 ere operable not only to remove a frequency component twice as high as that of a carrier wave generated by each of the multipliers 1602 and 1603, but also to combine a plurality of detection outputs together, which is to be described later. In FIG. 8, the demodulating section 33 processes the reception signal 131 whose frequency has been converted by the RF section 32 preceding the demodulating section 33 into a baseband frequency. However, the demodulating section 33 may process the RF-band reception signal directly inputted thereto.

Next, the principle in which a unique diversity effect is exerted by the transmission method used in the transmission system having the aforementioned structure according to the first embodiment will be described in detail. In this case, it is assumed that each of the two wireless stations A and B, shown in FIG. 1, generates a transmission signal based on a first symbol waveform W1 (or a symbol waveform series having a length of M) and a second symbol waveform W2 (or a symbol waveform series having a length of M) and the receiving station 12 receives the transmission signal.

Firstly, a case where delay dispersion in a propagation path can be ignored will be described. Specifically, in the aforementioned case, although a multipath (multipath propagation) is caused in each propagation path through which a signal is transmitted from each of the wireless stations A and B, a delay between multipath waves relative to the symbol length can be ignored. This applies to the case where an arriving signal A transmitted from the wireless station A and an arriving signal B transmitted from the wireless station B are individually subjected to Rayleigh variation, and is called a flat fading in which a propagation path frequency characteristic within a transmission band is uniform. Furthermore, a phase difference or is a parameter which is dependent on distance relationships between the wireless station A and the receiving station 12 and between the wireless station B and the receiving station 12.

Figure 9:
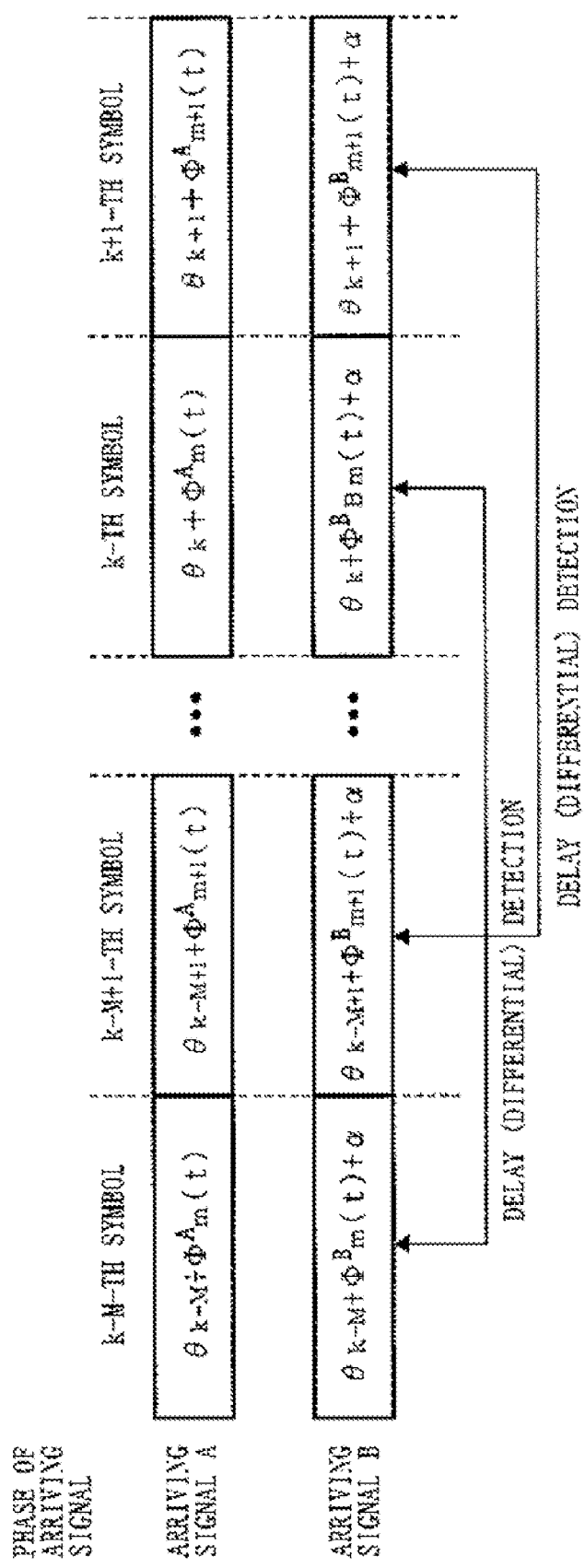
FIG. 9 is a schematic diagram illustrating phases of arriving signals A and B received by the receiving station 12, which change on a symbol-by-symbol basis.

FIG. 9 is a schematic diagram illustrating phases of the arriving signals A and B received by the receiving station 12, which change on a symbol-by-symbol basis, FIG. 9 shows phases of a k–M-th symbol, a k–M+1-th symbol, a k-th symbol, and a k+1-th symbol. Note that a signal point varied in accordance with the transmission data, a phase transition of an m-th symbol waveform of the transmission signal A (arriving signal A) transmitted from the wireless station A and a phase transition of an m-th symbol waveform of the transmission signal B (arriving signal B) transmitted from the wireless station B are denoted by $\theta_k$, $\Phi^A_A(t)$ and $\Phi^B_m(t)$, respectively.

As the phase of the arriving signal A, during the k-th symbol, the phase transition $\Phi^A_m(t)$ of the symbol waveform is added to the phase $\theta_k$, an initial point, which is constant during the symbol. Similarly, as the phase of the arriving signal B, during the k-th symbol, the phase transition $\Phi^B_m(t)$ of the symbol waveform is added to a combined phase, as an initial point, obtained by adding the phase relationship a between the arriving signals to the phase $\theta_k$ of the signal point of the k-th symbol. During the k–M-th symbol, which is a symbol preceding the k-th symbol by M symbols, the phase transition $\Phi^A_m(t)$ or $\Phi^B_m(t)$ of the symbol waveform similar to that of the k-th symbol is added to a phase an initial point, of the signal point. Then, the demodulating section 33 performs delay (differential) detection for the k-th symbol and the k–M-th symbol.

Figure 10:
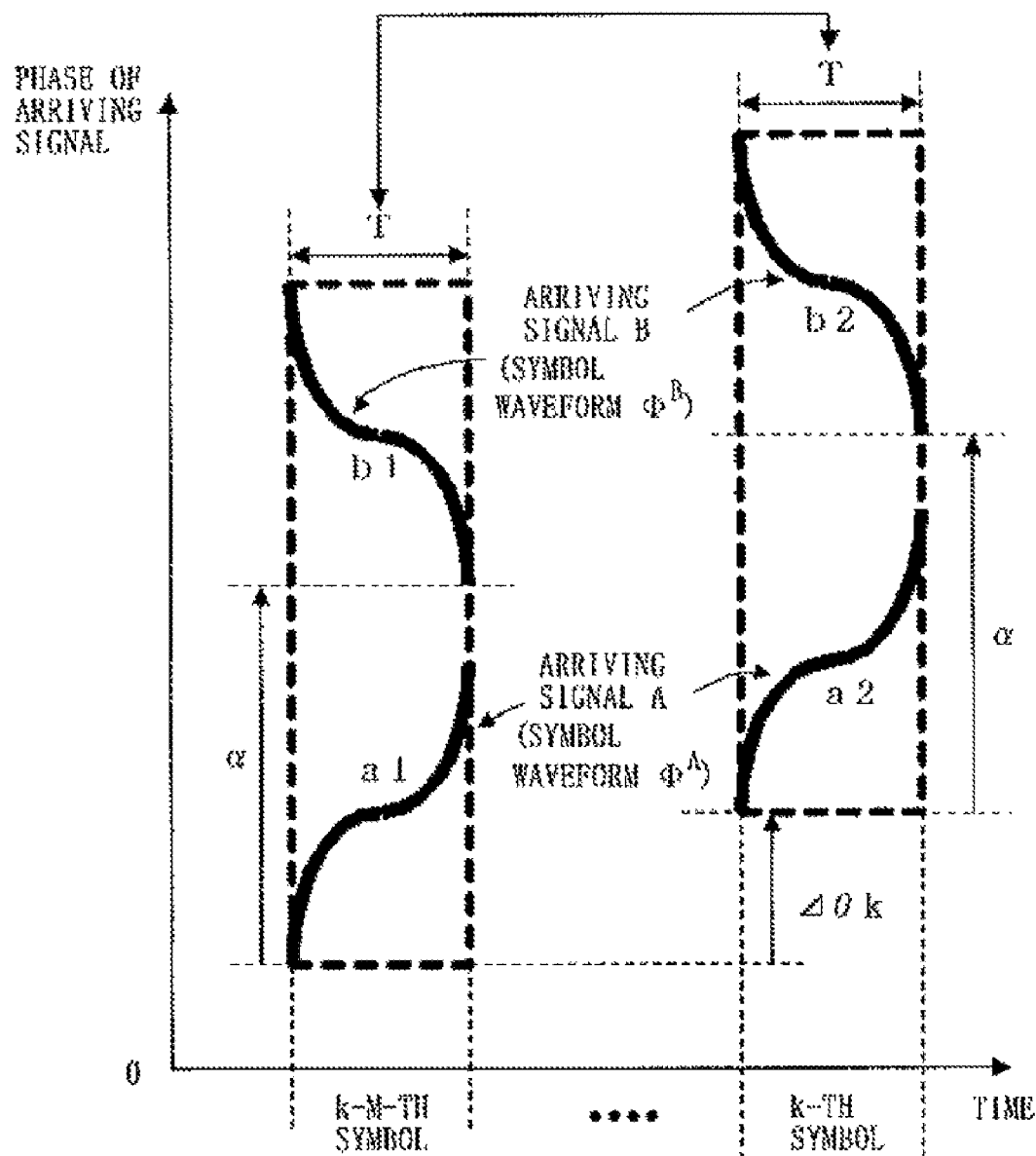
FIG. 10 is a schematic phase transition diagram illustrating a phase relationship between the arriving signal A and the arriving signal B and a phase relationship between different symbols.

FIG. 10 is a schematic phase transition diagram illustrating a phase relationship between the arriving signal A and the arriving signal B and a phase relationship between different symbols. Note that in this example, it is assumed that the phases of the symbol waveforms of the transmission signal A (arriving signal A) and the transmission signal B (arriving signal. B) change as shown in (a) of FIG. 6.

In FIG. 10, the phase of the arriving signal A changes during the k–M-th symbol as shown by a phase transition a1, and the phase of the arriving signal B changes during the k–M-th symbol, as shown by a phase transition b1, from a phase point shifted from an initial point of the phase transition a1 by the phase difference α. Then, during the k-th symbol, the phase of the arriving signal A changes, as shown by a phase transition a2, from a phase point shifted from the initial point of the phase transition a1 of the k–M-th symbol by a phase $\Delta\theta_k$ caused by the differential encoding, and the phase of the arriving signal B changes, as shown by a phase transition b2, from a phase point shifted from an initial point of the phase transition a2 by the phase difference α. Therefore, by shifting the phases of the k–M-th symbol by the phase $\Delta\theta_k$ caused by the differential encoding, the phase transitions a1 and b1 of the k–M-th symbol become the phase transitions a2 and b2 of the k-th symbol. Thus, the delay (deferential) detection is performed for the k–M-th symbol based on the k-th symbol, thereby obtaining the phase caused by the differential encoding. As a result, the data can be demodulated.

Furthermore, the phase relationship between the arriving signal A and the arriving signal B will be described with reference to a vector diagram.

As shown in FIG. 11, it is assumed that a signal level of the arriving signal A, a signal level of the arriving signal B and the phase difference between the arriving signals are denoted by 1, ρ and α, respectively.

Figure 12:
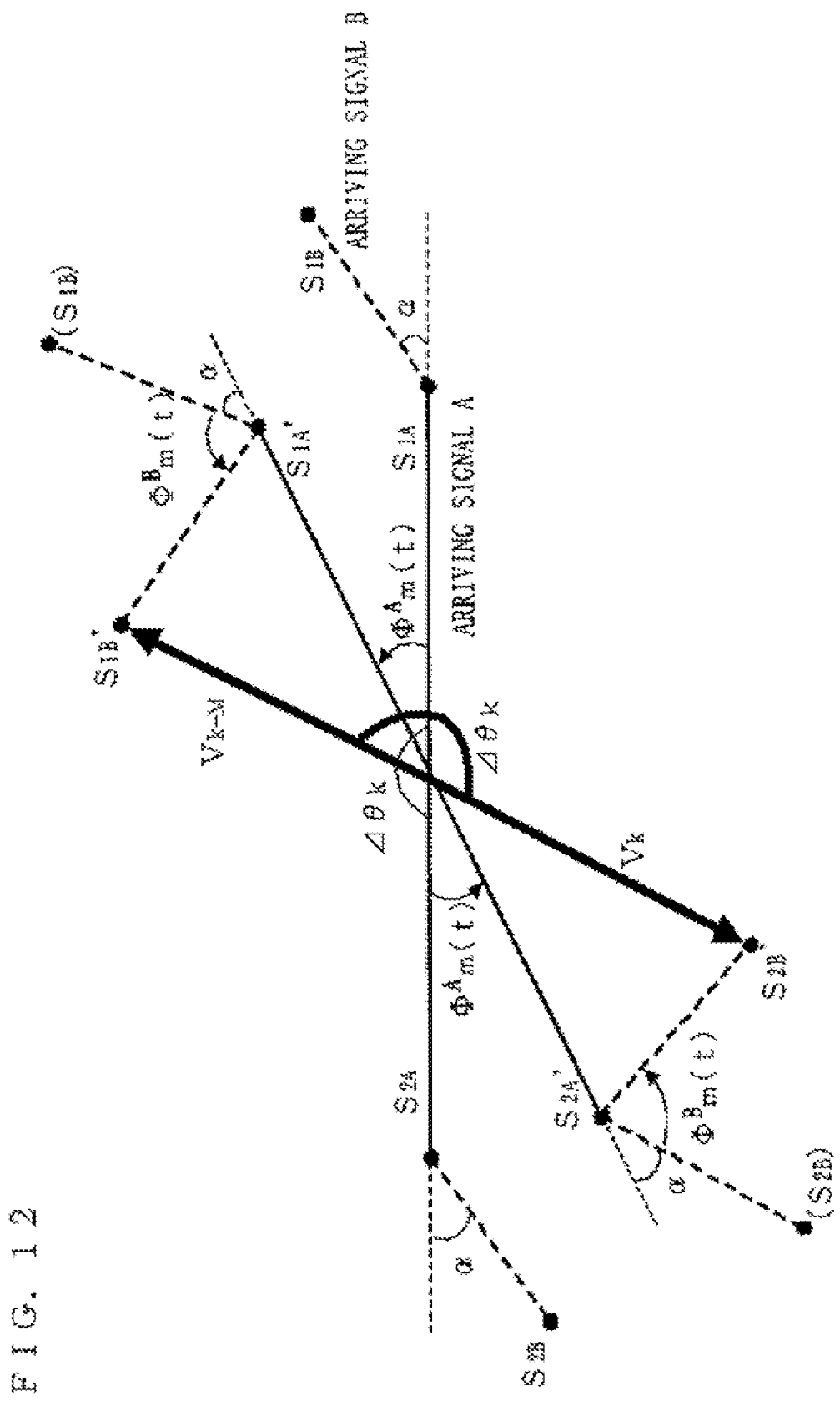
FIG. 12 is a diagram illustrating phase transitions, each being represented by vectors, of the arriving signal A and the arriving signal B.

In this case, as shown in FIG. 12, during the k–M-th symbol, a vector $S_{1B}$ representing the arriving signal B is different from a vector $S_{1A}$ representing the arriving signal A by the phase difference α. The phase of the arriving signal A changes in accordance with $\phi^A_m(t)$ from the vector $S_{1A}$ as time elapses, and it is assumed that the arriving signal A is represented by a vector $S_{1A}'$ at an arbitrary time t. The phase of the arriving signal B changes in accordance with $\Phi^B_m(t)$ from the vector $S_{1B}$ as time elapses, and it is assumed that the arriving signal B is represented by a vector $S_{1B}'$ at the time t. In this case, a vector representing a received wave at the time t is denoted by $V_{k-M}$.

Similarly, during the k-th symbol, a vector $S_{2A}$ representing the arriving signal A is different from the vector $S_{1A}$ by $\Delta\theta_k$ (in a case where the phase difference $\Delta\theta_k$ between symbols for which the delay (differential) detection is performed is π), and a vector $S_{2A}$ representing the arriving signal B is different from the vector $S_{2A}$ representing the arriving signal A by α. The phase of the arriving signal A changes in accordance with $\Phi^A_m(t)$ from the vector $S_{2A}$ as time elapses, and it is assumed that the arriving signal A is represented by a vector $S_{2A}'$ at the arbitrary time t. The phase of the arriving signal B changes in accordance with $\Phi^B_m(t)$ from the vector $S_{2B}$ as time elapses, and it is assumed that the arriving signal B is represented by a vector $S_{2B}'$ at the arbitrary time t. In this case, a vector representing a received wave at the time t is denoted by $V_k$.

As described above, the phase of the arriving signal A and the phase of the arriving signal B change in a similar manner during each of the k–M-th symbol and the k-th symbol. Thus, a phase difference between the two received waves represented by the vectors $V_k$ and $V_{k-M}$ is always $\Delta\theta_k$ at the arbitrary time t.

Next, a phase transition of a symbol waveform from which a detection output is to be effectively obtained will be described.

Based on FIG. 12, when signal points of the k–M-th symbol and the k-th symbol are denoted by $S_{k-M}$ and $S_k$, respectively, the vectors $V_{k-M}(t)$ and $V_k(t)$ representing the received waves at the arbitrary time t are represented by the following formula (12), $$\begin{cases} V_{k-M}(t) = S_{k-M} \cdot \left\{ e^{j\Phi^A_m(t)} + \rho \cdot e^{j(\Phi^B_m(t)+\alpha)} \right\} \\ V_k(t) = S_k \cdot \left\{ e^{j\Phi^A_m(t)} + \rho \cdot e^{j(\Phi^B_m(t)+\alpha)} \right\} \end{cases} \quad (12)$$

Therefore, a detection output $D_k(t)$ obtained by performing the delay (differential) detection is represented by the following formula (13). Note that * indicates a complex conjugate, $$D_K(t) = V_k(t) \cdot V_{k-M}^*(t) \quad (13)$$

Here, when $\Phi^A_m(t)=u$ and $\Phi^B_m(t)+\alpha=v$ are satisfied, the aforementioned formula (12) is represented by the following formula (14).

$$D_k(t) = S_k \cdot S^*_{k-M} \cdot \{\exp(j \cdot u) + \rho \cdot \exp(j \cdot v)\} \cdot \qquad (14)$$
$$\{\exp(j \cdot u) + \rho \cdot \exp(j \cdot v)\}^*$$
$$= |S_k|^2 \cdot \exp(j \cdot \Delta\theta_k) \cdot \{\cos(u) + j \cdot \sin(u) +$$
$$\rho \cdot \cos(v) + j \cdot \rho \cdot \sin(v)\} \cdot$$
$$\{\cos(u) + j \cdot \sin(u) + \rho \cdot \cos(v) + j \cdot \rho \cdot \sin(v)\}^*$$
$$= |S_k|^2 \cdot \exp(j \cdot \Delta\theta_k) \cdot \{1 + \rho^2 + 2\rho \cdot \cos(u - v)\}$$

Therefore, $D_k(t)$ is represented by the following formula (15), $$D_k(t)=|S_k|^2 \cdot \exp(j\cdot\Delta\theta_k)\cdot\{1+\rho^2+2\rho\cdot\cos(\Phi^A_m(t)-\Phi^B_m(t)-\alpha)\}^* \qquad (15)$$

In the formula (15), terms including $\{1+\rho^2+2\rho\cdot\cos(\Phi^A_m(t)-\Phi^B_m(t)-\alpha)\}$ and $|S_k|^2$ never become negative, and a term including $\exp(j\cdot\Delta\theta_k)$ indicates a detection signal corresponding to the phase $\Delta\theta_k$ for the transmission data, thereby making it possible to always obtain a correct detection output. The formula (15) becomes zero when a third term becomes zero. However, this is limited to a moment when $\rho=1$ is satisfied and a terra of cos becomes $-1$. As long as the phase difference $\Phi^A_m(t)-\Phi^B_m(t)$ between the two symbol waveforms varies in a time interval $0<t<T$, the third term never constantly becomes zero though the third term momentarily becomes zero when $\rho$ and $\alpha$ are arbitrary values, and therefore the detection output obtained by combining the arriving signal A with the arriving signal B never completely disappears, thereby making it possible to obtain a diversity effect. As a change amount increases, a plurality of effective detection outputs are obtained in the time interval $0<t<T$ during a symbol, and a higher path diversity effect can be obtained. Preferably, if the change amount is greater than or equal to $2\pi$, the term including $\cos(\Phi^A_m(t)-\Phi^B_m(t)-\alpha)$ always becomes 1, and t at which a maximum detection output is obtained exists in the time interval $0<t<T$.

Therefore, if transitional directions of the phases of the symbol waveforms (or the symbol waveforms respectively corresponding to symbol waveform series, each having a length of MI) stored in the modulating section 21 of each of the wireless station A and the wireless station S included in the wireless transmission system according to the present embodiment are reversed from each other within the same time segment, as the phase transitions $\Phi^A$ and $\Phi^B$ shown in (a) of FIG. 6, a high diversity effect can be obtained on the receiving side.

Next, how a detection signal is changed depending on the phase relationship between the arriving signal A and the arriving signal B received by the receiving station 12 will be described.

Figure 13:
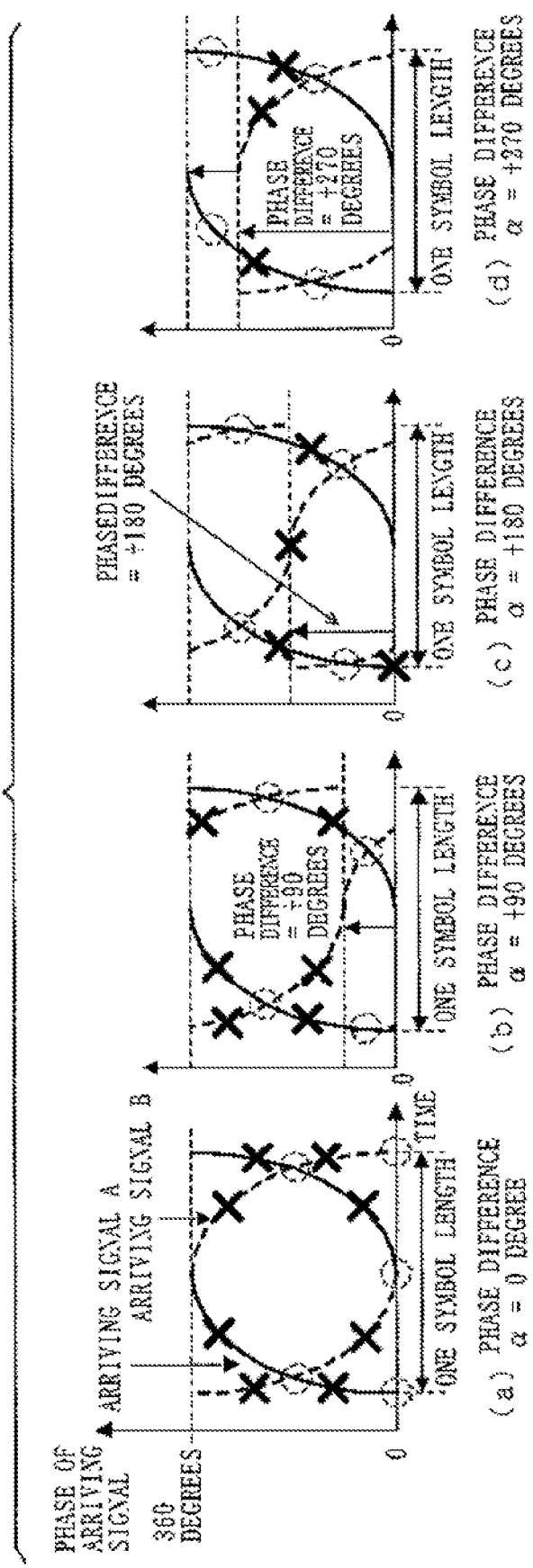
FIG. 13 is a schematic diagram illustrating the phase relationship, obtained when delay dispersion in a propagation path can be ignored, between the arriving signals A and B received by the receiving station 12.

FIG. 13 is a schematic diagram illustrating the phase relationship, obtained when the delay dispersion in the propagation path can be ignored, between the arriving signals A and B received by the receiving station 12. (a) to (d) of FIG. 13 represent, the phase relationships between the symbol waveforms of the arriving signals A and B obtained when $\alpha$ is 0 degree, when $\alpha$ is 90 degrees, when $\alpha$ is 180 degrees and when $\alpha$ is 230 degrees, respectively. In FIG. 13, the vertical axis represents the phases of the k-th symbol, as shown in FIG. 10, within a range of 0 to 360 degrees based on the initial point, of the phase transition a2 of the arriving signal A, which is represented by 0 degree, when $\phi_{MAX}=720$ degrees is satisfied in the aforementioned formulas (3) and (4). Further, a reversed phase point at which the arriving signal A and the arriving signal B have opposite phases is represented by a mark x, and an in-phase point at which the arriving signal A and the arriving signal E are in phase with each other is represented by a mark O.

Figure 14:
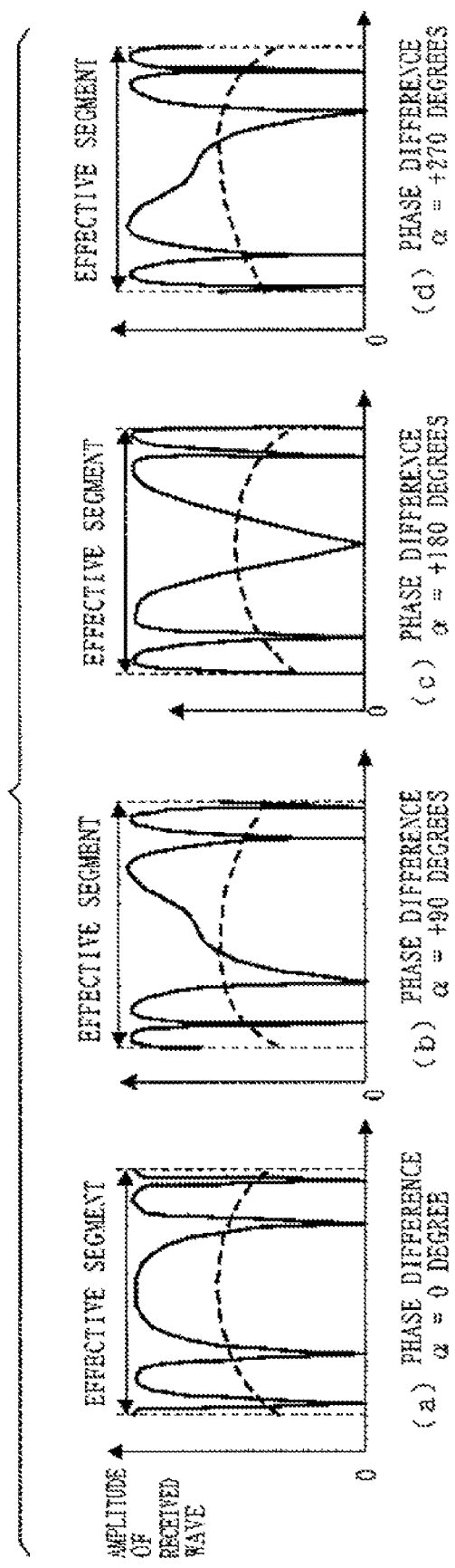
FIG. 14 shows a detection output, generated by the arriving signals A and B shown in FIG. 13, after being passed through low-pass filters 1810 and 1811.

As shown in (a) of FIG. 13, when there is no delay in the propagation path, the reversed phase points, at which the arriving signal A and the arriving signal B cancel each other out and an amplitude of the received wave obtained by combining two vectors representing the arriving signals A and B becomes zero, correspond to an extremely brief moment during one symbol, regardless of the value of $\alpha$. Therefore, the delay (differential) detection is performed on the arriving signals A and B so as to obtain detection amplitudes having shapes substantially similar to each other, each detection amplitude being proportional to the square of the received wave. These detection amplitudes are shown by curves indicated by solid lines in FIG. 14. As shown by the solid lines in FIG. 14, it becomes possible to obtain an effective detection output, whose polarity (FIG. 14 shows the case where the polarity is positive) is always correct with respect to the transmission data. Furthermore, dotted lines in FIG. 14 indicate detection outputs after being passed, through the low-pass filters 1810 and 1811. By using the low-pass filters 1310 and 1811 to allow a detection output to pass therethrough, even if the detection output momentarily becomes zero and disappears, it becomes possible to obtain another detection output formed by combining effective outputs which are obtained at a plurality of time points during the symbol. Thus, the diversity effect can be exerted.

Next, a case where the delay dispersion in the propagation path cannot be ignored will be described.

Figure 15:
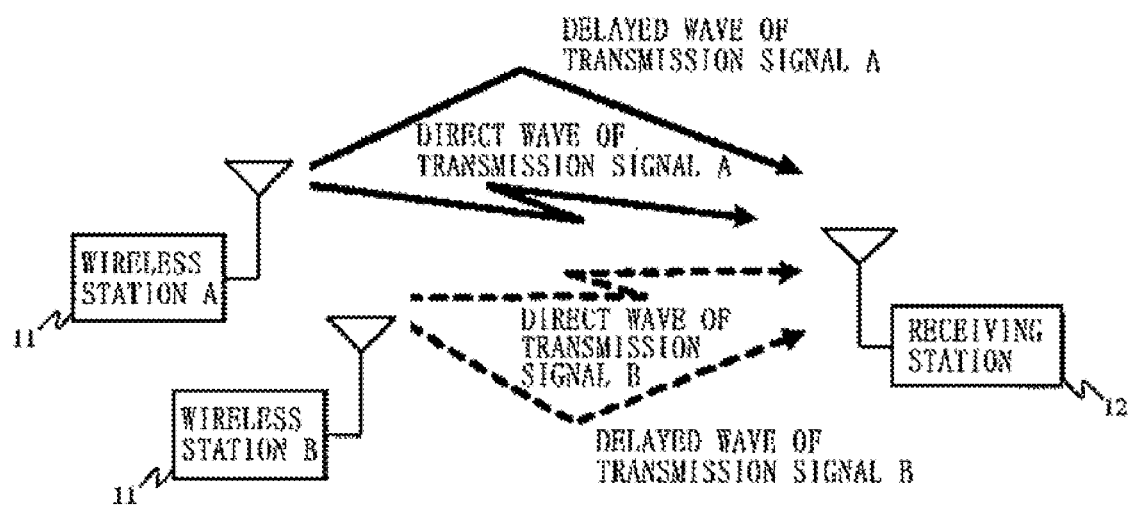
FIG. 15 is a conceptual diagram illustrating a model in which two wireless stations A and B each transmits two arriving waves.

For the sake of brevity, a two-arriving-wave model, as shown in FIG. 15, in which the two wireless stations A and B are provided and an arriving signal is transmitted by two waves from each of the wireless stations, will be described in the following descriptions. A case where a direct wave and delayed wave of the transmission signal A are received and a ease where a direct wave and delayed wave of the transmission signal B are received will foe firstly described, and then a case where all four arriving waves are received will be described.

FIG. 16A is a schematic diagram illustrating phases of the direct wave and delayed wave of the transmission signal A, which change on a symbol-by-symbol basis. Note that a phase difference between reception points of carrier waves which are the direct wave and the delayed wave is denoted by $\beta_A$. As a phase of the delayed wave, during the k-th symbol, a phase transition $\Phi^A_m(t-\tau)$, of a symbol waveform of the transmission signal. A, which is delayed with respect, to the direct, wave by $\tau$, is added to a combined phase, as an initial point, obtained by adding the phase difference $\beta_A$ between the signals to a phase $\theta_k$ of a signal point varied in accordance with the transmission data. Similarly, as the phase of the delayed wave, during the k–M-th symbol, the phase transition $\Phi^A_m(t-\tau)$, of the symbol waveform of the transmission signal A, which is similar to that of the k-th symbol, is added to a phase $\theta_{k-M}$, an initial point, of the signal point.

Therefore, when the delay (differential) detection is performed for the k-th symbol and the k–M-th symbol, an effective segment in which a correct polarity and correct demodulated data can be obtained is a segment (ii) of the k-th symbol or a segment (ii) of the k–M-th symbol. Segments (i) and (iii) immediately preceding and following the segment (ii) and segments (i)' and (iii)' immediately preceding and following the segment (ii)' are segments to which different signals of adjacent symbols are transmitted in a mixed manner, thereby causing an interference between the symbols. Thus, the correct, demodulated data is not necessarily obtained in the aforementioned segments.

FIG. 16B is a schematic diagram illustrating phases of the direct wave and delayed wave of the transmission signal B, which change on a symbol-by-symbol basis. The same principle is true of the phase of the transmission signal B only when $\beta_A$ and $\Phi^A{}_m(t-\tau)$ in the above descriptions are replaced with $\beta_B$ denoting a phase difference between reception points of carrier waves which are the direct wave and the delayed wave and $\Phi^B{}_m(t-\tau)$ denoting a phase transition of a symbol waveform of the transmission signal B which is delayed with respect to the direct wave by $\tau$, respectively. Note that in the present embodiment, a delay difference between the direct wave and delayed wave of the transmission signal A and a delay difference between the direct wave and delayed wave of the transmission signal B are both $\tau$. However, even if the delay difference between the direct wave and delayed wave of the transmission signal A and the delay difference between the direct wave and delayed wave of the transmission signal B are different from each other, the same improved effect can be obtained.

Figure 17:
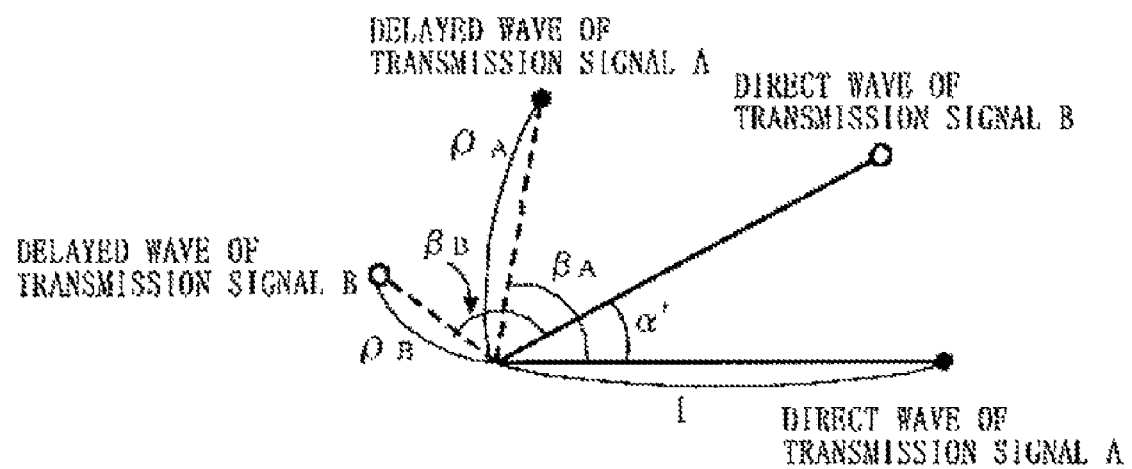
FIG. 17 is a diagram illustrating a phase relationship between reception points of the carrier waves which are the direct wave and the delayed wave of each of the transmission signals A and B.

FIG. 17 is a diagram illustrating a phase relationship between, the reception points of the carrier waves which are the direct wave and the delayed wave of each of the transmission signals A and B. In addition to $\tau_A$ and $\beta_B$, a phase difference between a carrier wave of the direct wave of the transmission signal A and a carrier wave of the direct wave of the transmission signal B is denoted by $\alpha'$. Also, amplitudes of the delayed waves of the transmission signals A and B, which are obtained based on those of the direct waves of the transmission signals A and B, are denoted by $\rho_A$ and $\rho_B$, respectively. For the sake of brevity, it is assumed that, the amplitude of the direct wave of the transmission signal A is the same as that of the direct wave of the transmission signal B, since no difference will be made in the following descriptions on an operation and improved effect.

Figure 18A:
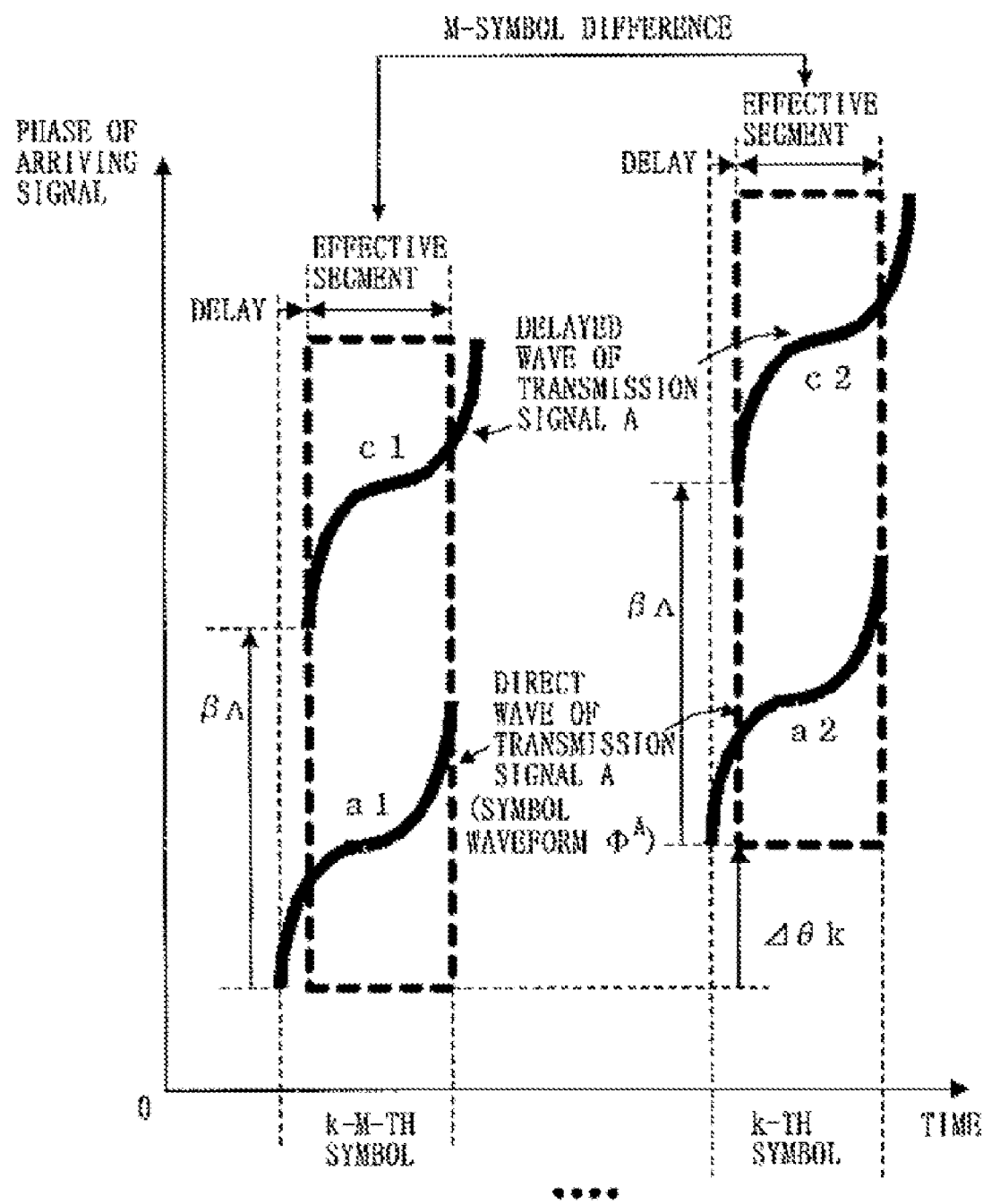
FIG. 18A is a schematic phase transition diagram illustrating a phase relationship between the direct wave and the delayed wave of the transmission signal. A and a phase relationship between different symbols.
Figure 18B:
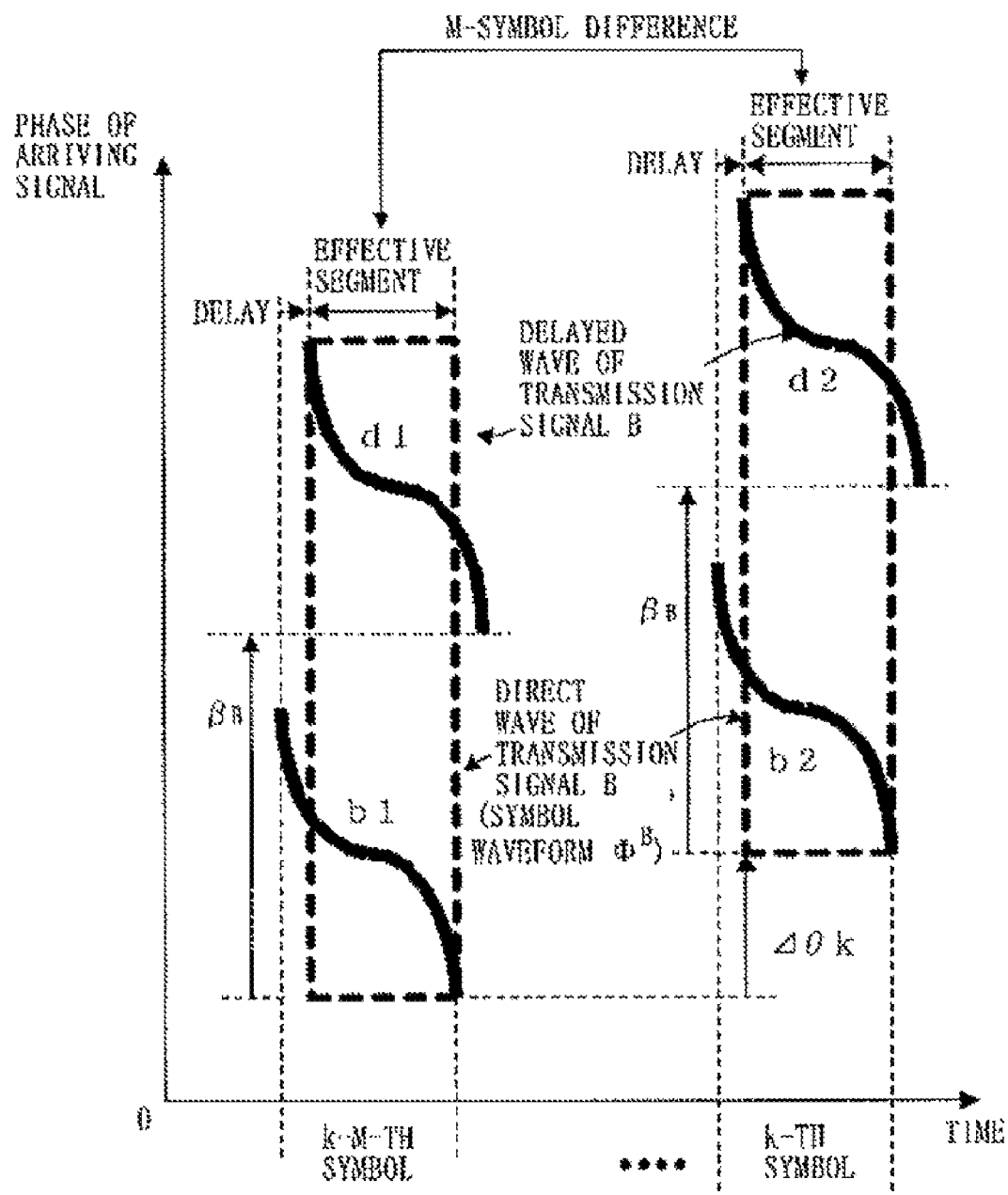
FIG. 18B is a schematic phase transition diagram illustrating a phase relationship between the direct, wave and the delayed wave of the transmission signal B and a phase relationship between different symbols.

FIG. 18A is a schematic phase transition diagram illustrating a phase relationship between the direct wave and the delayed wave of the transmission signal A and a phase relationship between different symbols. Note that in this example, $\Phi^A$ shown in (a) of FIG. 6 is used as a phase transition of the symbol waveform of the transmission signal A. In FIG. 18A, during the k–M-th symbol, the phase of the direct wave changes as shown by the phase transition a1, and the phase of the delayed wave changes as shown by a phase transition c1 from a phase point shifted from the initial point of the phase transition a1 by the phase difference $\beta_A$. During the k-th symbol, the phase of the direct wave changes as shown by the phase transition a2 from a phase point shifted from the initial point of the phase transition a1 of the k–M-th symbol by a phase $\Delta\theta_k$ caused by the differential encoding, and the phase of the delayed signal changes as shown by the phase transition c2 from the phase point shifted from the initial point of the phase transition a2 by the phase difference $\beta_A$. Therefore, by shifting the phases of the k–M-th symbol by the phase $\Delta\theta_k$ caused by the differential encoding, the phase transitions a1 and c1 of the k–M-th symbol become the phase transitions a2 and c2 of the k-th symbol. Thus, the delay (differential) detection is performed for the k-th symbol based on the k–M-th symbol, thereby obtaining the phase $\Delta\theta_k$ caused by the differential encoding. As a result, the data can be demodulated. The same relationship is also applied for a schematic phase transition diagram illustrating a phase relationship between the direct wave and the delayed wave of the transmission signal B during different symbols as shown in FIG. 18b.

Next, the phase relationship between the direct wave and delayed wave of the transmission signal A will be described with reference to a vector diagram.

FIG. 19A is a schematic diagram illustrating phase transitions, represented by vectors, of the direct wave and delayed wave of the transmission signal A. In the present embodiment, only the effective segments (ii) and (ii)' shown in FIG. 16A will be described. FIG. 19A represents the transmission data, and shows an exemplary case where a phase difference between two symbols, for which the detection is to be performed, which are separated from each other by M symbols, is n. In FIG. 19A, a signal point of the k–M-th symbol and a signal point of the k-th symbol are denoted by $S_{1A}$ and $S_{2A}$, respectively.

During the k–M-th symbol, a vector $S_{1Ad}$ representing the delayed wave is different from a vector $S_{1A}$ representing the direct wave by $\beta_A$. The phase of the direct wave changes in accordance with $\Phi^A{}_m(t)$ from the vector $S_{1A}$ as time elapses, and is represented by a vector $S_{1A}'$ at the arbitrary time t. The phase of the delayed wave changes in accordance with $\Phi^A{}_m(t-\tau)$ from the vector $S_{1Ad}$ as time elapses, and is represented by a vector $S_{1Ad}'$ at the time t. In this case, a vector representing a received wave at the time t is denoted by $V^A{}_{k-M}$.

Similarly, during the k-th symbol, a vector $S_{2A}$ representing the delayed wave is different from a vector $S_{1A}$ by $\Delta\theta_k$, and a vector $S_{2Ad}$ representing the delayed wave is different from the vector $S_{2A}$ by $\beta_A$. The phase of the direct wave changes in accordance with $\Phi^A{}_m(t)$ from the vector $S_{2A}$ as time elapses, and is represented by a vector $S_{2A}'$ at the arbitrary time t. The phase of the delayed wave changes in accordance with $\Phi^A{}_m(t-\tau)$ from the vector $S_{2Ad}$ as time elapses, and is represented by a vector $S_{2Ad}'$ at the arbitrary time b. In this case, a vector representing a received wave at the time t is denoted by $V^A{}_k$.

As described above, the phases of the direct wave and delayed wave of the transmission signal A change in a similar manner during each of the k–M-th symbol and the k-th symbol. Thus, a phase difference between two received waves represented by the vectors $V^A{}_k$ and $V^A{}_{k-M}$ is always $\Delta\theta_k$ at the arbitrary time t.

Figure 19B:
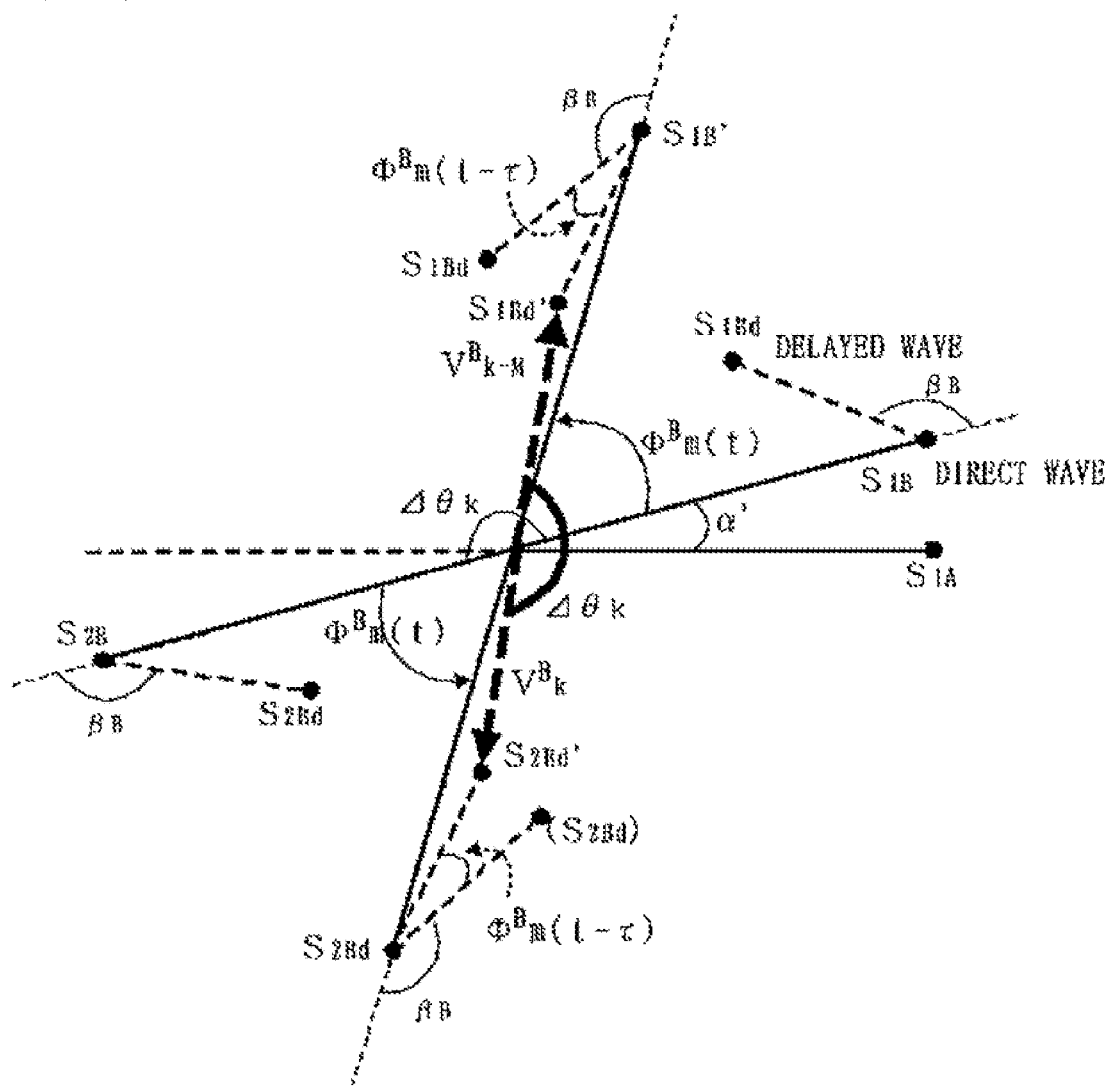
FIG. 19B is a schematic diagram illustrating the phase transition, represented by vectors, between the direct wave and delayed wave of the transmission signal B.

FIG. 19B is a schematic diagram illustrating phase transitions, represented by vectors, of the direct wave and delayed wave of the transmission signal B. Also in the present embodiment, only the effective segments (ii) and (ii)' shown in FIG. 16B will be described. FIG. 19B also represents the transmission data, and shows an exemplary case where a phase difference $\Delta\theta_k$ between two symbols, for which the detection is to be performed, which are separated from each other by M symbols, is π. In FIG. 19B, a signal point $S_{1B}$ of the transmission signal B is at a position from which the signal point $S_{1A}$ of the transmission signal A of the k–M-th symbol is rotated by the phase difference $\alpha'$, and a signal point $D_{2B}$ of the transmission signal B of the k-th symbol is at a position from which the signal point $S_{1B}$ of the transmission signal B is further rotated by $\Delta\theta_k$.

During the k–M-th symbol, a vector $S_{1Bd}$ representing the delayed wave is different from a vector $S_{1B}$ representing the direct wave by $\beta_B$. Then, the phase of the direct wave changes in accordance with $\Phi^B{}_m(t)$ from the vector $S_{1B}$ as time elapses, and is represented by a vector $S_{1B}'$ at the arbitrary time t. In this case, a vector representing the received wave at the time t is denoted by $V^B{}_{k-M}$.

Similarly, during the k-th symbol, a vector $S_{2B}$ representing the direct wave is different from the vector $S_{1B}$ by $\Delta\theta_k$, and a vector $S_{2Bd}$ representing the delayed wave is different from the vector $S_{2B}$ representing the direct wave by $\beta_B$. The phase of the direct wave changes in accordance with $\Phi^B_m(t)$ from the phase represented by the vector $S_{2B}$ as time elapses, and is represented by a vector $S_{2B'}$ at the arbitrary time t. The phase of the delayed wave changes in accordance with $\Phi^B_m(t-\tau)$ from the vector $S_{2Bd}$ as time elapses, and is represented by a vector $S_{2Bd}'$ at the arbitrary time t. In this case, a vector representing the received wave at the time t is denoted by $V^B_k$. As described above, the phases of the direct wave and delayed wave of the transmission signal B change in a similar manner during each of the k–M-th symbol and the k-th symbol. Thus, a phase difference between the two received waves represented by the vectors $V^B_k$ and $V^B_{k-M}$ is always $\Delta\theta_k$ at the arbitrary time t.

Similarly, during the k-th symbol, a vector $S_{2B}$ representing the direct wave is different from the vector $S_{1B}$ by $\Delta\theta_k$, and a vector $S_{2ABd}$ representing the delayed wave is different from the vector $S_{2B}$ representing the direct wave by $\beta_B$. The phase of the direct wave changes in accordance with $\Phi^B_m(t)$ from the phase represented by the vector $S_{2B}$ as time elapses, and is represented by a vector $S_{2B}'$ at the arbitrary time t. The phase of the delayed wave changes in accordance with $\Phi^B_m(t-\tau)$ from the vector $S_{2Bd}$ as time elapses, and is represented by a vector $S_{2Bd}'$ at the arbitrary time t. In this case, a vector representing the received wave at the time t is denoted by $V^A_k$. As described above, the phases of the direct wave and delayed wave of the transmission signal B change in a similar manner during each of the k–M-th symbol and the k-th symbol Thus, a phase difference between the two received waves represented by the vectors $V^B_k$ and $V^B_{k-M}$ is always $\Delta\theta_k$ at the arbitrary time t.

Figure 20:
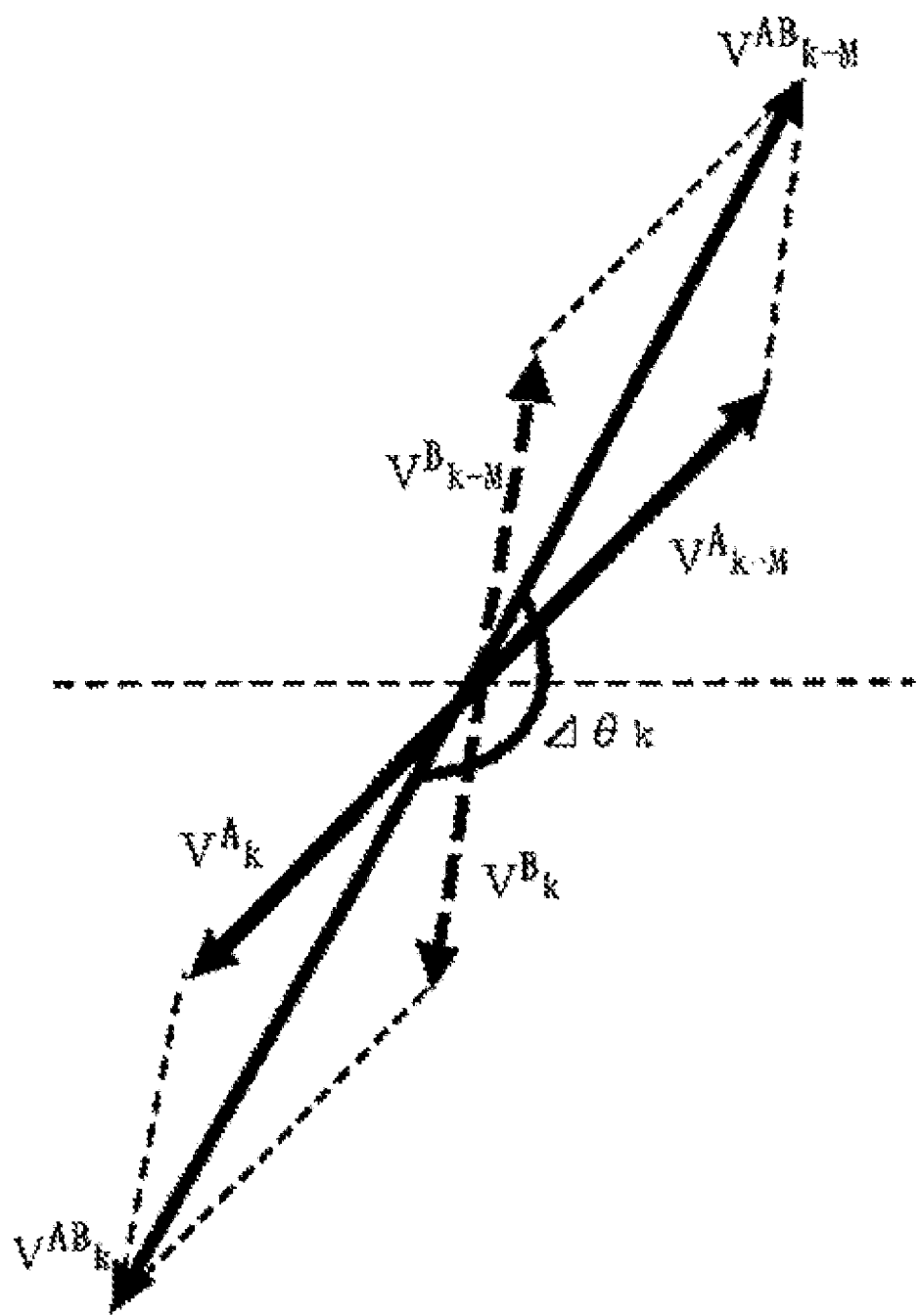
FIG. 20 is a diagram illustrating phase transitions, represented by vectors, of all arriving waves.

After all, in a case where all four arriving waves shown in FIG. 15 are transmitted, an arriving wave represented by a vector sum $V^{AB}_{k-M}$ of the vectors $V^A_{k-M}$ and $V^B_{k-M}$ is received during the k–M-th symbol, and an arriving wave represented by a vector sum $V^{AB}_k$ of the vectors $V^A_k$ and $V^B_k$ is received during the k-th symbol, as shown in FIG. 20. In the above case, a phase difference between the arriving wave represented by the vector sum $V^{AB}_{k-M}$ and the arriving wave represented by the vector sum $V^{AB}_k$ is also always $\Delta\theta_k$ at the arbitrary time within an effective segment. This indicates that as long as the vectors $V^A_k$ and $V^B_k$ (or $V^A_{k-M}$ and $V^B_{k-M}$) do not cancel each other out, or as long as the direct wave and delayed wave transmitted from each of the two antennas do not cancel each other out and the vectors $V^A_k$ and $V^B_k$ (or $V^A_{k-M}$ and $V^B_{k-M}$) do not simultaneously disappear, i.e., even when a detection output obtained by performing the delay (differential) detection on a received signal may momentarily disappear, it is possible to obtain another detection output corresponding to the transmission data and always having a correct polarity, during a time period other than when the detection output momentarily disappears. That is, as described with reference to FIG. 13 and FIG. 14, even when a detection output may momentarily become zero, another detection output can be obtained during a time period other than when the detection output momentarily becomes zero. Furthermore, by using the low-pass filters to allow a detection output to pass therethrough, even if the detection output momentarily becomes zero and disappears, if becomes possible to obtain another detection output formed by combining effective outputs which are obtained at a plurality of time points during the symbol. Thus, the path diversity effect can be exerted.

As described above, according to the wireless transmission system of the first embodiment of the present invention, the plurality of wireless transmission stations 11 perform differential encoding on the same transmission data so as to modulate differentially encoded signals by using the symbol waveforms different from each other and then transmit the signals thus obtained to the receiving station 12, and the receiving station 12 performs the delay (differential) detection on the received signals. Therefore, even over a broader range of delay (a larger delay difference between arriving timings), an error rats can be improved due to the unique path diversity effect. Accordingly, in the case where, while being affected by detailed modulation parameters such as a band limit or the like, others are under the same conditions, if the wireless stations respectively use the symbol waveforms different from each other, an allowance range of delay increases, thus resulting in an increase also in the maximum number of effective branches.

Figure 21:
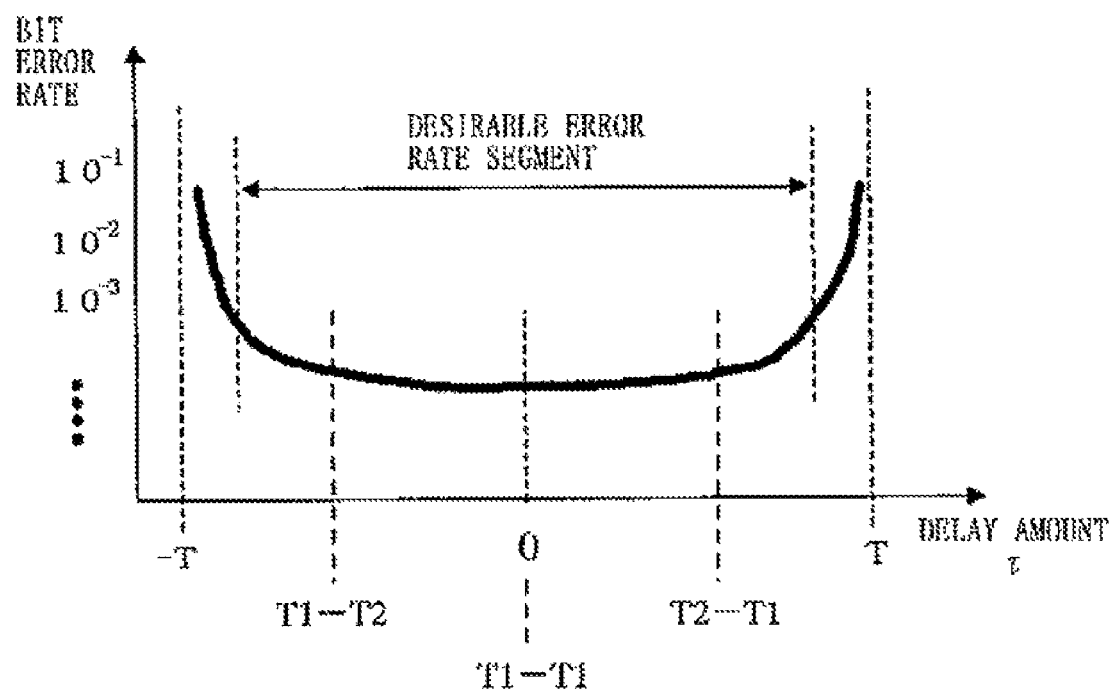
FIG. 21 is a schematic diagram illustrating a relationship between a bit error rate and a delay amount τ used in a transmission method of the present invention.
Figure 57:
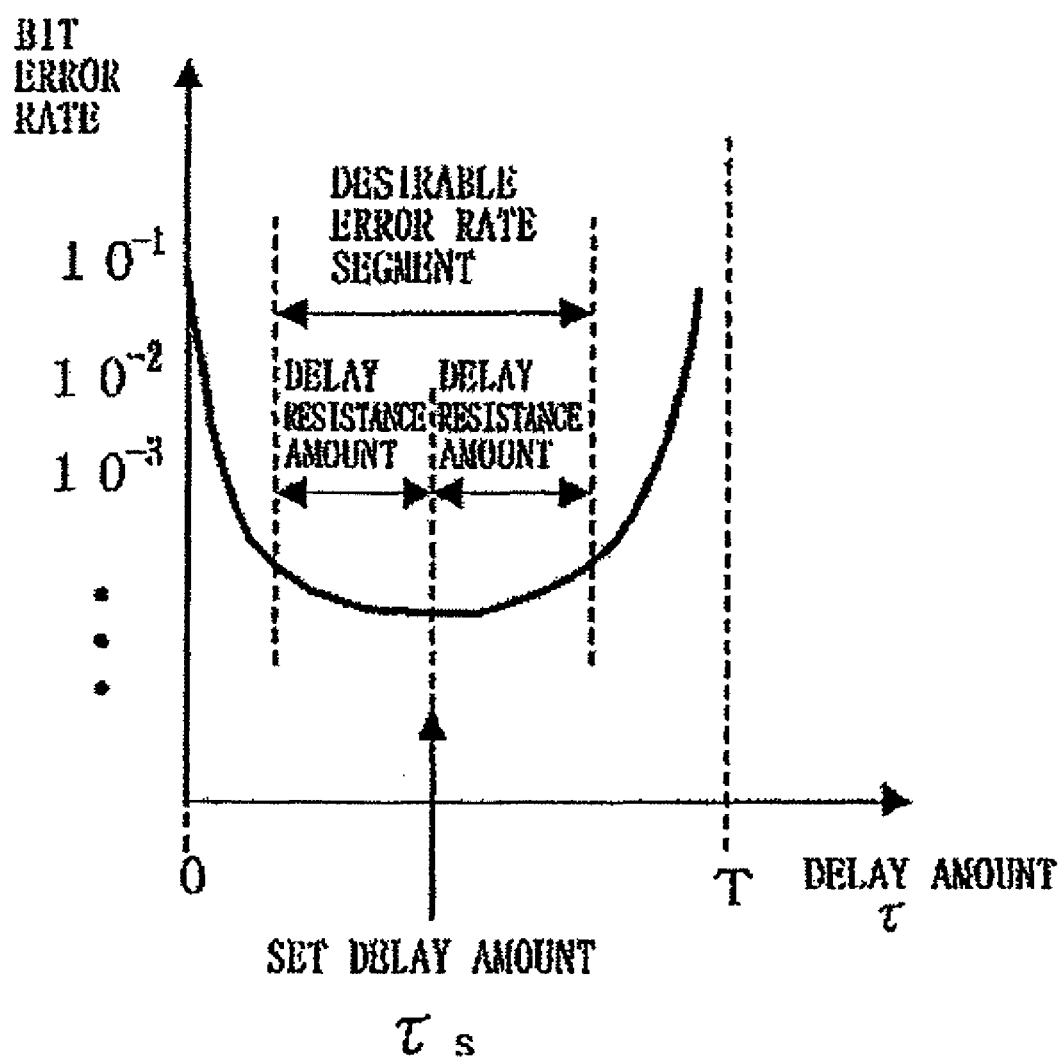
FIG. 57 is a schematic diagram illustrating a relationship between a bit error rate and the delay amount τ used in a conventional transmission method.
Figure 58:
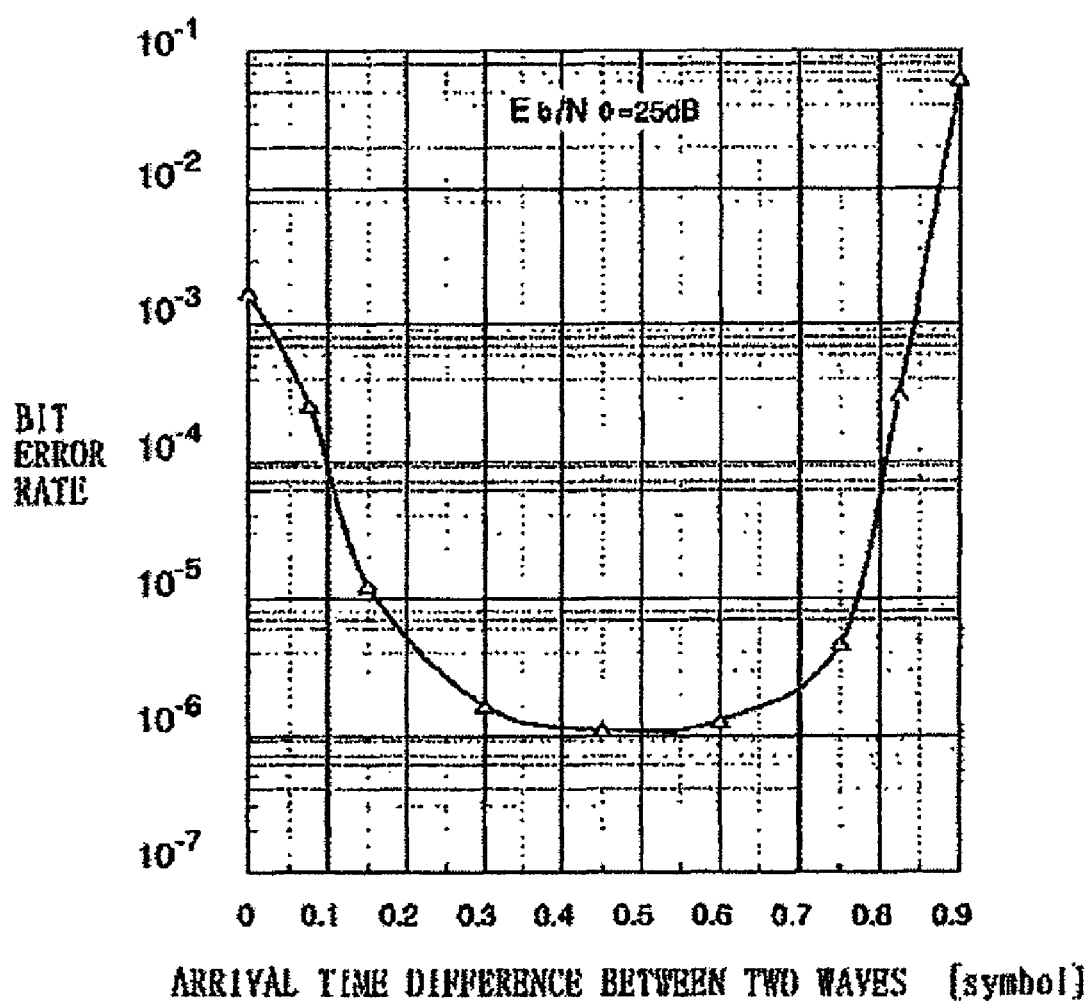
FIG. 58 is a diagram illustrating a bit error rate characteristics relative to an arrival time difference between two waves in a QPSK-VP scheme.
Figure 59:
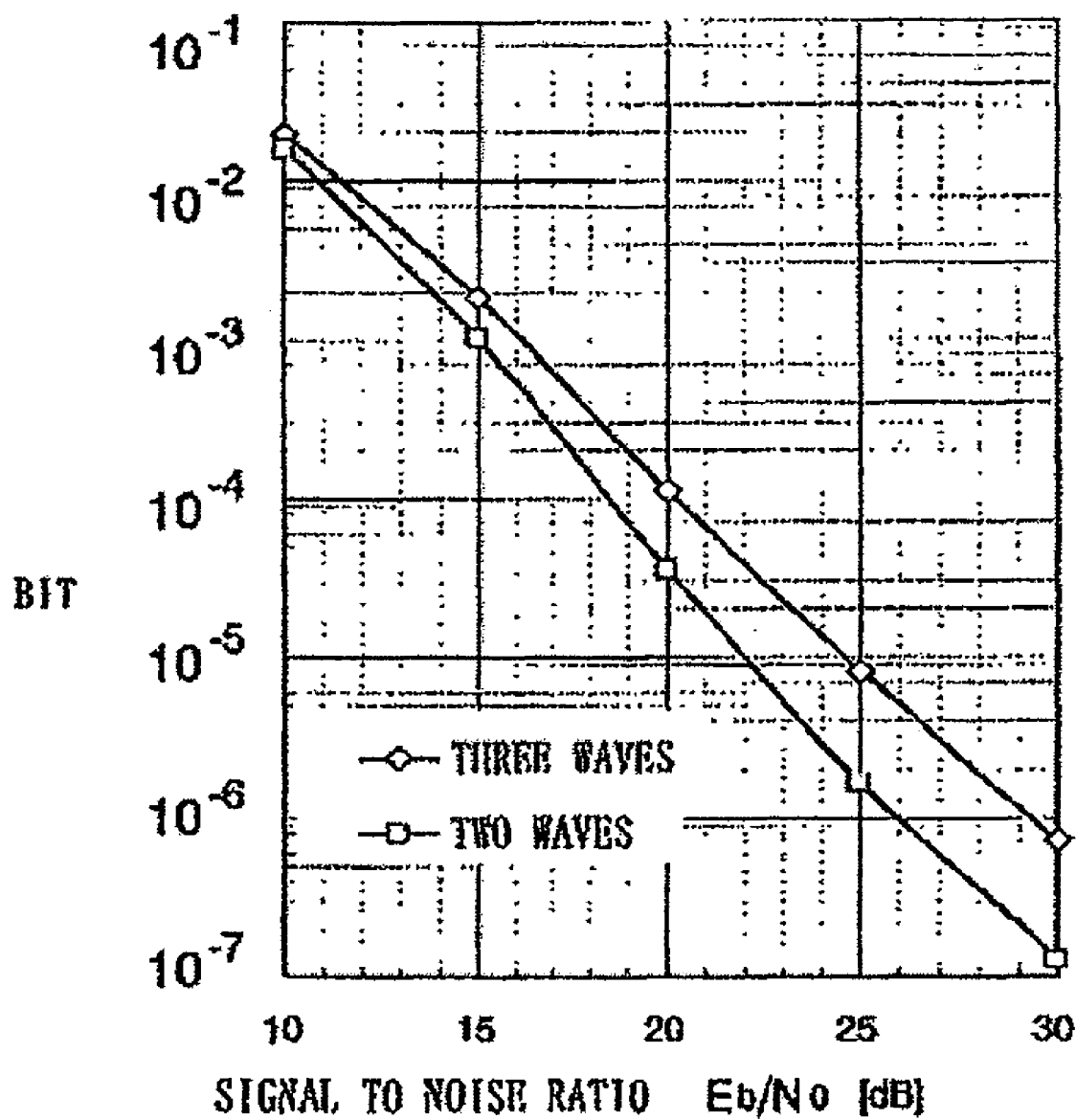
FIG. 59 is a diagram illustrating the bit error rate characteristics for two received waves and for three received waves in the QPSK-VP scheme.

Similarly to FIG. 57, FIG. 21 is a schematic diagram illustrating a relationship between the bit error rate and the delay amount $\tau$ used in the transmission method according to the present invention. FIG. 21 is similar to FIG. 57 in that the effective segment becomes shorter as the delay amount $\tau$ becomes equal to the symbol length T (or –T), and then the effective segment finally disappears and the bit error rate starts to deteriorate. However, FIG. 21 is different from FIG. 57 in that the error rate shown in FIG. 21 is improved even when the delay amount $\tau$ is in the vicinity of 0. Thus, according to the transmission method of the present invention, unlike patent document 1, it is not always necessary to deliberately interpose a predetermined delay between the transmission signals. Instead, in the transmission method of the present invention, even with the same arriving timing, the unique diversity effect can be obtained. As shown in FIG. 21 illustrating the aforementioned effect, it is apparent that a range of delay resistance is significantly improved as compared with that of delay resistance shown in FIG. 57.

As described above, by using combinations, each containing a symbol waveform and an arriving timing (delay difference), both are selected from among a plurality of symbol waveforms and a plurality of arriving timings, respectively, it becomes possible to further exert the path diversity effect (to further increase the maximum number of effective branches).

Conditions of symbol waveforms and arriving timings required for exerting the path diversity effect, in the wireless transmission system, by making the most of the maximum number of effective branches, which number is increased by using the different symbol waveforms will now be described. Hereinafter, it is assumed that two different types of symbol waveforms (or symbol waveform series) used in the wireless transmission system are denoted as W1 and W2, and the arriving timings corresponding to the maximum number of effective branches for each symbol waveform, are denoted as T1 and T2.

Relationships among an allowable delay amount (a desirable error rate segment), a timing T1 and a timing T2 are preferably set as shown in FIG. 21. Specifically, when T2>T1 is satisfied, three types of arrival time differences: T1–T2, 0 (T1–T1 or T2–T2) and T2–T1 are generated, and each of the three types of arrival time differences needs to be within the allowable delay amount. Furthermore, when the arrival time difference is T1–T2 or T2–T1, the path diversity effect can be obtained even when the same symbol waveform is used between signals (see FIG. 57). However, when the arrival time difference is 0, it is necessary to use signals having symbol waveforms different from each other.

In this case, the maximum number of effective branches, which number is increased by using the different symbol waveforms, is four, and a combination of a symbol waveform and an arriving timing needs to be selected from among the fell lowing four types: W1T1, W1T2, W2T1 and W2T2. In other words, when the number of wireless stations which perform simultaneous transmission is less than or equal to the maximum number of effective branches (four in this case), the wireless stations must perform transmission by using the respective four types of combinations different from each other. Furthermore, even when the number of wireless stations which perform simultaneous transmission exceeds the maximum number of effective branches, it is necessary that four among these wireless stations perform transmission by using the respective four types of combinations different from each other, and the remaining stations perform transmission by selecting any combination from among the four types of combinations, without generating an additional combination other than the four types of combinations.

Figure 22:
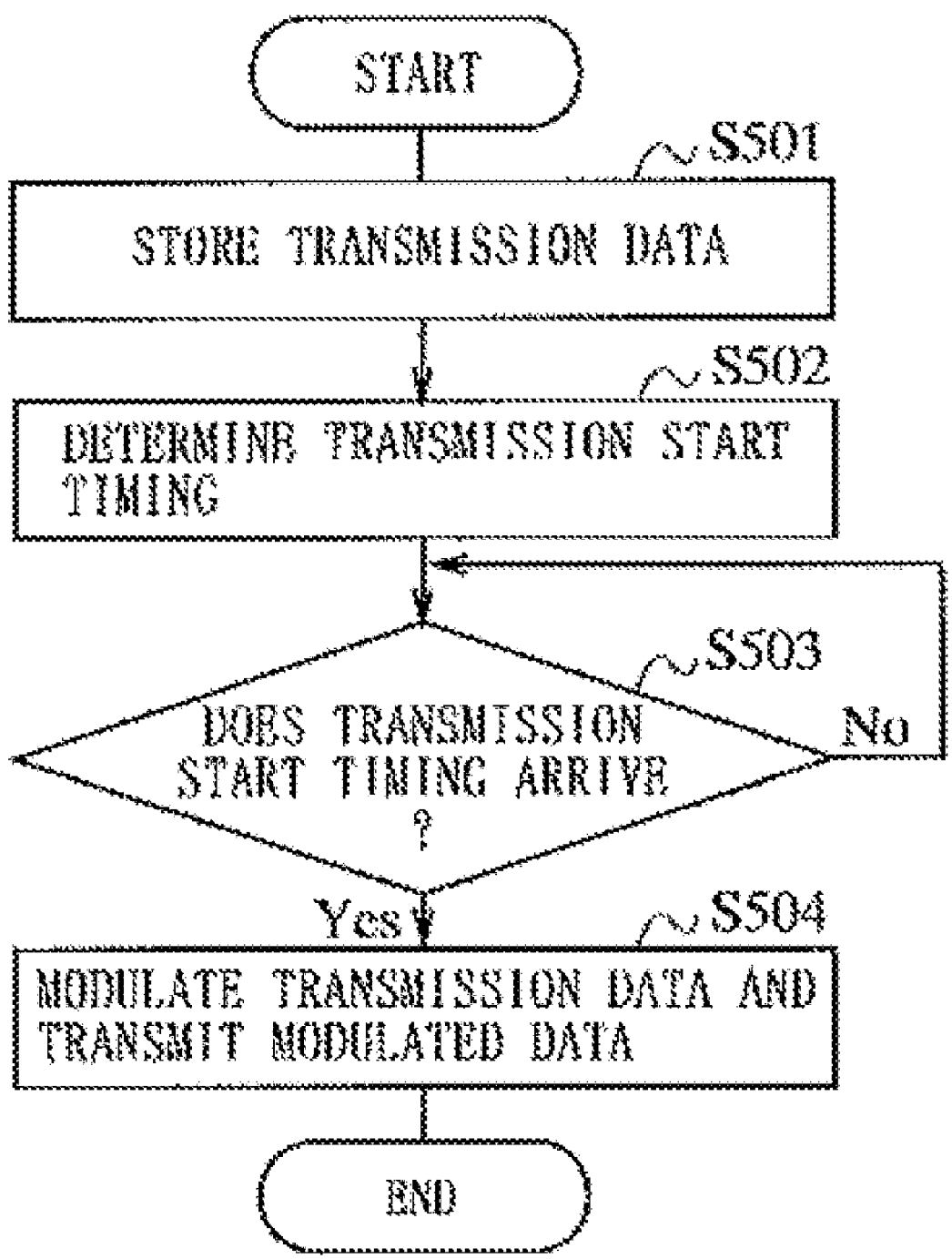
FIG. 22 is a flowchart illustrating an operation of the wireless station 11.

FIG. 22 is a flowchart illustrating an operation of the wireless station 11 included in the wireless transmission system structured by making the most of the aforementioned unique path diversity effect.

Firstly, the data retaining section 22 retains transmission data (step S501). The transmission timing controlling section 23 determines, as a transmission start timing, a timing delayed from a reference timing by a predetermined delay amount (step S502). When the transmission start timing arrives (step S503, Yes), the transmission timing controlling section 23 generates a transmission start signal so as to foe passed to the modulating section 21. In response to the transmission start signal, the modulating section 21 modulates the transmission data by using a symbol waveform indicated by a waveform selecting signal and outputs the modulated transmission data. The modulated transmission data is transmitted to the receiving station 12 via the RF section 24 and the antenna 25 (step S504).

Figure 23:
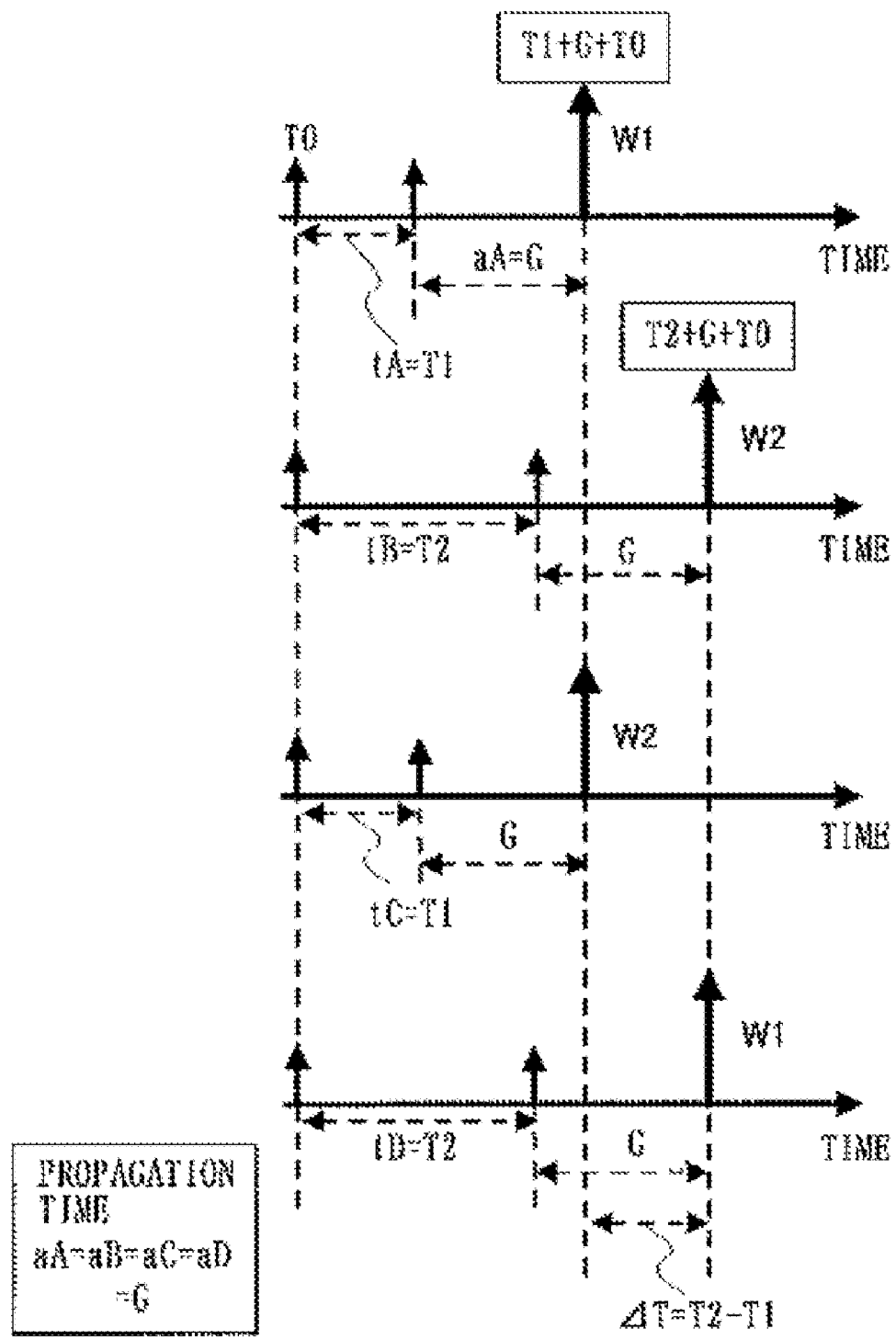
FIG. 23 is a diagram illustrating timings at which wireless stations A to D transmit signals.

FIG. 23 is a diagram illustrating timings at which the wireless stations A to D transmit signals. It is assumed that the delay amounts tA to TD retained, respectively, by the wireless stations A to D correspond to either T1 or T2. As shown in FIG. 23, each of the four wireless stations A to D transmits a signal at a timing obtained by adding the delay amount T1 or T2 to a reference timing T0, that is, at a timing (T1+T0) or (T2+T0). The delay amounts tA to tD, given to signals by the wireless stations A to D, respectively, are set to be tA=tC=T1 or tB=tD=T2, for example. In the present embodiment, the wireless stations A and D transmit signals by using the symbol waveform W1, and the wireless stations B and C transmit signals by using the symbol waveform W2. Note that propagation times aA to aD between the receiving station 12 and the wireless station A, between the receiving station 12 and the wireless station B, between the receiving station 12 and the wireless station C, and between the receiving station 12 and the wireless station D are small enough to be negligible or all the same time G.

The receiving station 12 receives the signals transmitted from the wireless stations A to D at two timings: a timing (T1+G+T0) and a timing (T2+G+T0). There is a time difference (T2−T1) between the two timings. Therefore, although the same symbol waveform is used between the wireless station A and the wireless station D, there is a moderate time difference between a timing at which a signal arrives at the receiving station 12 from the wireless station A and a timing at which a signal arrives at the receiving station 12 from the wireless station D. Similarly, although the same symbol waveform is used between the wireless station B and the wireless station C, there is a moderate time difference between a timing at which a signal arrives at the receiving station 12 from the wireless station E and a timing at which a signal arrives at the receiving station 12 from the wireless station C. Thus, the path diversity effect can be exerted, thereby making it possible to improve the transmission characteristic. Furthermore, even though a timing at which a signal arrives at the receiving station 12 from the wireless station A is the same as that at which a signal arrives at the receiving station 12 from the wireless station C, different symbol waveforms are used between the two wireless stations mentioned above. Similarly, even though a timing at which a signal arrives at the receiving station 12 from the wireless station B is the same as that at which a signal arrives at the receiving station 12 from the wireless station C, different symbol waveforms are used between the two wireless stations mentioned above. Thus, the path diversity effect can be obtained. As a result, in the entire wireless transmission system, it becomes possible to obtain the diversity effect with paths whose number is four, which is equal to the maximum number of effective branches, which maximum number is increased by using the different symbol waveforms.

Even if the number of wireless stations included in the wireless transmission system exceeds the maximum number of effective branches (the wireless transmission system further includes a wireless station E, for example), the wireless station E transmits data such that a timing at which the data arrives at the receiving station 12 therefrom is set to be either (T1+G+T0) or (T2+G+T0) (in this case, a symbol waveform used by the wireless station E may be W1 or W2 since the symbol waveform thereof will overlap W1 or W2), thereby making it possible to exert the maximum characteristic.

As described above, according to the first embodiment of the present invention, even if the number of wireless stations is greater than or equal to the maximum number of effective branches available to the receiving station, the maximum path diversity effect can be obtained under the limit of the maximum number of effective branches, which number contributes to the path diversity effect.

In the first embodiment, each of the four wireless stations A to D previously retains either the delay amount T1 or T2. Alternatively, each of the wireless stations A to D may retain both of the delay amounts T1 and T2. In this case, each of the wireless stations A to D may always select the same delay amount, or may select either of the two delay amounts on a random basis. Furthermore, the reference timing signal shared among the wireless stations A to D may indicate a timing based on a beacon signal received from a station other than the wireless stations A to D (a master station or a transmitting station, for example), or may indicate a timing obtained from temporal information included in a GPS (Global Positioning System) signal or a timing obtained from a radio clock.

Figure 24:
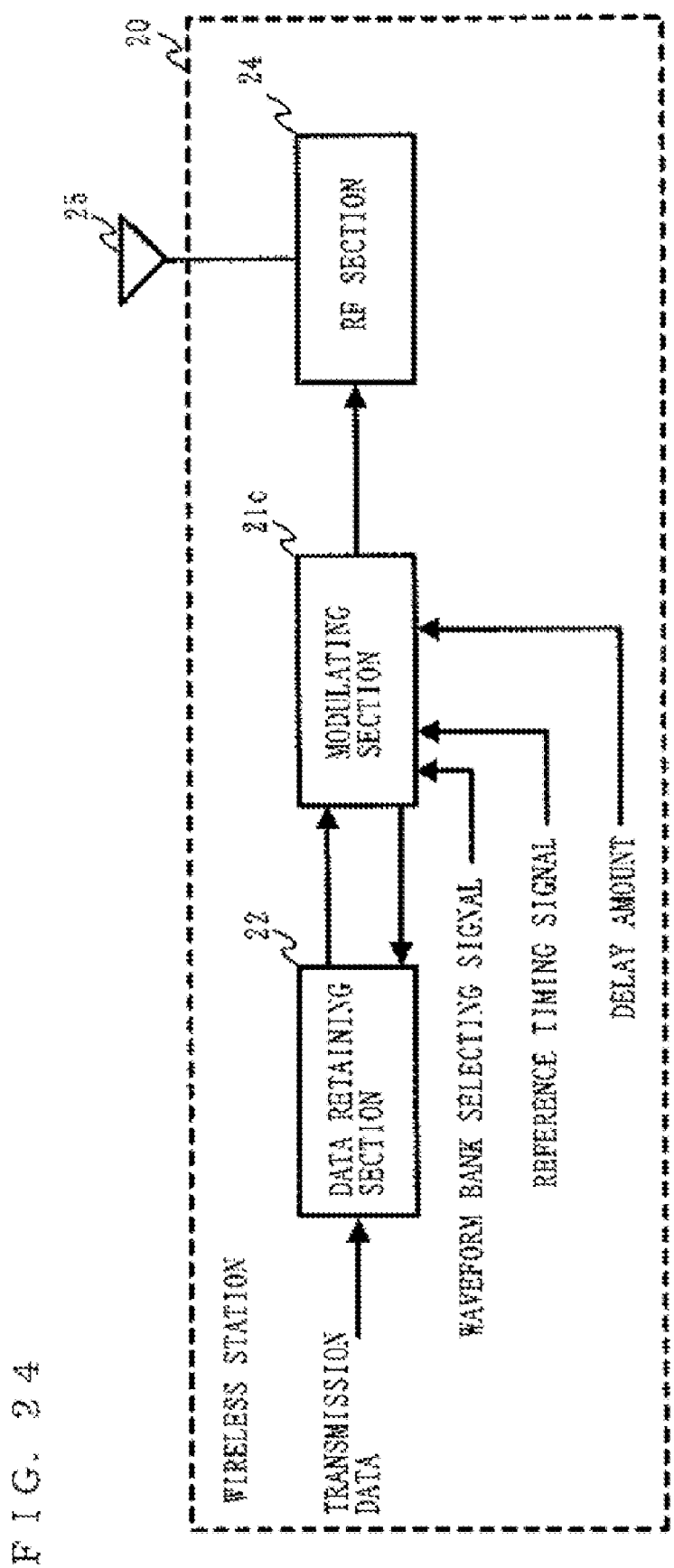
FIG. 24 is a block diagram illustrating a structure of a wireless station 20 obtained when a delay is given to a modulated baseband signal outputted from the modulating section.
Figure 25:
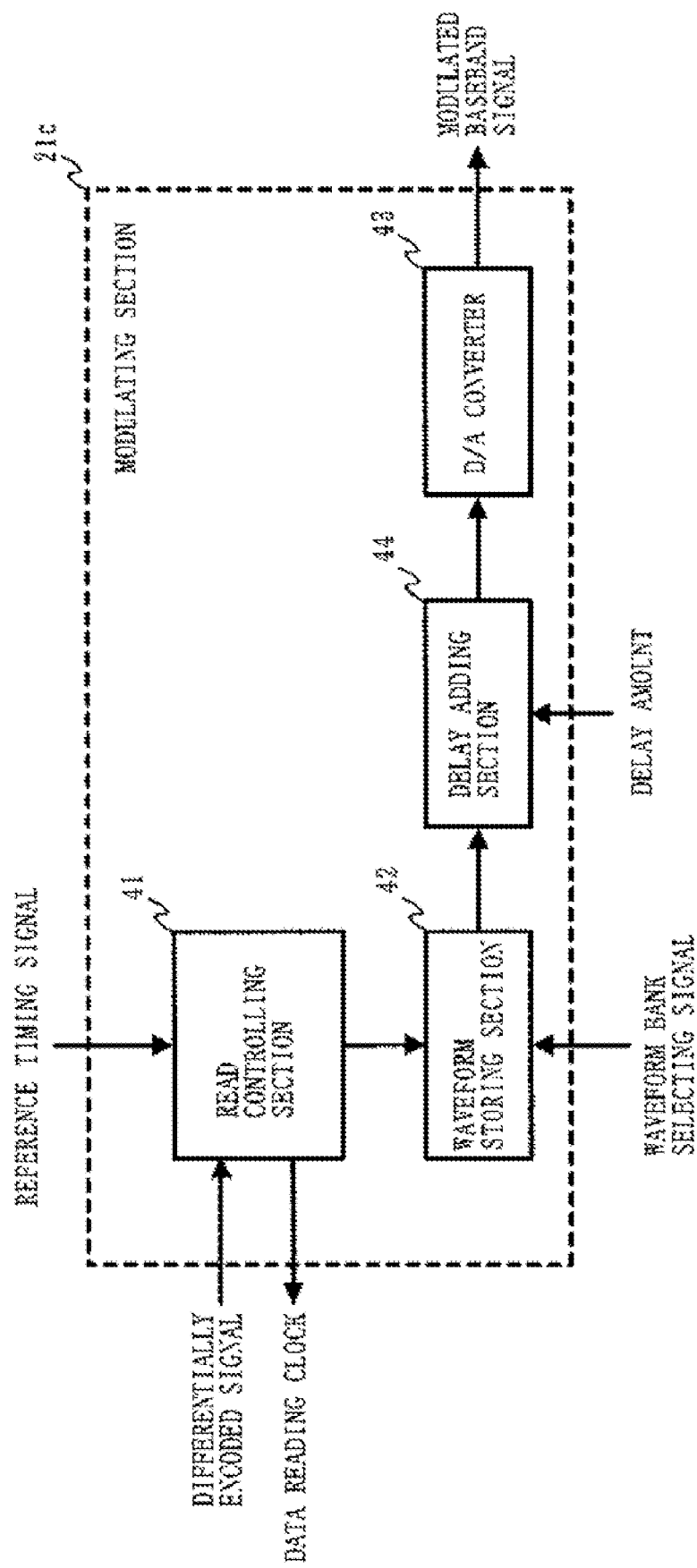
FIG. 25 is a block diagram illustrating an exemplary detailed structure of a modulating section 21c.

In the first embodiment, a desired delay is added to a transmission timing of each of the wireless stations by using a timing delayed from the reference timing by the predetermined delay amount. However, a method of adding a delay to the transmission timing is not limited thereto. For example, a delay may be added to a modulated, baseband signal outputted from the modulating section. FIG. 24 is a block diagram illustrating a structure of a wireless station 20 obtained when a delay is given to a modulated baseband signal outputted from the modulating section. The wireless station 20 has a structure in which the transmission timing controlling section 23 and the waveform selection controlling section 26 are removed from the wireless station 11 shown in FIG. 2, FIG. 25 is a block diagram illustrating a structure of a modulating section 21c shown in FIG. 24. The modulating section 21c is different from the modulating section 21 shown in FIG. 3 in that the modulation section 21c further has a delay adding section 44.

The delay adding section 44 is formed, by a shift, register, and delays an input signal by a predetermined delay amount so as to be outputted to the D/A conversion section 43. Thus, a signal obtained from the waveform storing section 42 can be delayed by the predetermined delay amount.

Note that with reference to FIG. 25, a case where a delay processing is performed on a digital signal is described. However, the delay processing may be performed on an analog signal by providing the delay adding section 44 following the D/A conversion section 43. Alternatively, an address signal may be delayed by a predetermined delay amount, by providing the delay adding section 44 between the read controlling section 41 and the waveform storing section 42 (FIG. 26).

Thus, it becomes possible to add a predetermined delay to a modulated baseband signal. However, the present invention is not limited to the aforementioned example only if using any method in which a plurality of wireless stations each transmits data at, a timing obtained by adding a predetermined delay amount to the reference timing.

Hereinafter, various transmission examples which can be realized by the wireless transmission system according to the present invention will be described.

Second Embodiment

FIG. 27 is a diagram illustrating a structure of the wireless transmission system according to a second embodiment of the present invention. The wireless transmission system shown in FIG. 27 comprises a transmitting station 13, a plurality of wireless stations 14 and the receiving station 12. The transmitting station 13 is wirelessly connected to each of the plurality of wireless stations 14, and each of the plurality of wireless stations 14 is also wirelessly connected to the receiving station 12. The wireless transmission system according to the second embodiment is different from that according to the above first embodiment in that the wireless transmission system according to the second embodiment further comprises the transmitting station 13 which transmits signals to the wireless stations 14 from which the signals are further transmitted to the receiving station 12. Hereinafter, the second embodiment will be described mainly with respect to this difference.

The transmitting station 13 has a structure in which the transmission timing controlling section 23 and the waveform selection controlling section 26 are removed from the structure of the wireless station 11 shown in FIG. 2. The structure of the receiving station 12 is the same as that shown in FIG. 1. FIG. 27 shows an example where the number of wireless stations 14 is four. Hereinafter, when it is necessary to distinguish among these four wireless stations 14, the wireless stations are referred to as wireless stations A1 to D1. On the other hand, when it is unnecessary to distinguish among the four wireless stations 14, the wireless stations are generically referred to as the wireless station (s) 14.

FIG. 28 is a diagram illustrating a configuration of a frame used in a transmission signal transmitted from the transmitting station 13 and then from the wireless station 14. In FIG. 28, a frame is formed by a preamble (hereinafter, referred to as a PR), a unique word (hereinafter, referred to as a UW) and information data. The PR is used for gain control, symbol synchronization, frequency synchronization and the like. The UW is used for determination of frame types and frame synchronization. The information data includes data to be transmitted from the transmission side.

Figure 29:
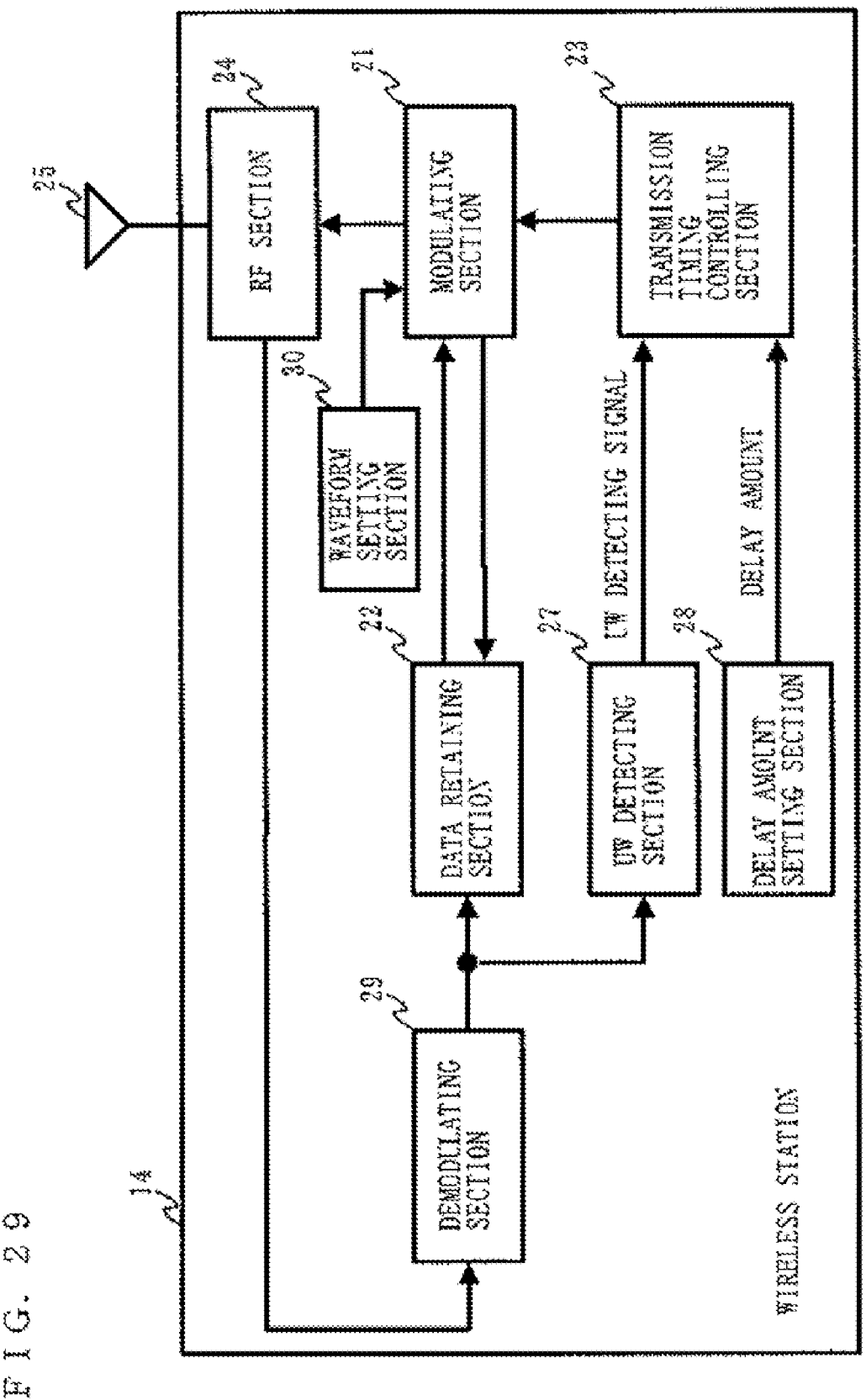
FIG. 29 is a block diagram illustrating an exemplary detailed structure of the wireless station 14.

FIG. 29 is a block diagram illustrating an exemplary detailed structure of the wireless station 14 shown in FIG. 27. The wireless station 14 shown in FIG. 29 has a structure in which a demodulating section 29, a UW detecting section 27, a delay amount setting section 28 and a waveform setting section 30 are additionally provided in the wireless station 11 according to the first, embodiment shown in FIG. 1.

A signal, transmitted from the transmitting station 13 is received by the antenna 25 of the wireless station 14. Then, a frequency conversion is performed on the received signal in the RF section 24, and the signal whose frequency has been converted is inputted to the demodulating section 29. The demodulating section 29 demodulates the inputted signal so as to acquire transmission data. Upon detecting a UW included in the transmission data outputted from the demodulating section 29, the UW detecting section 27 generates a UW detecting signal, so as to be passed to the transmission timing controlling section 23. The delay amount setting section 28 selects one delay amount from among a plurality of delay amount candidate values (T1 and T2 in this example), so as to be passed to the transmission timing controlling section 23. Note that a delay amount to be selected is previously set for each wireless station. The waveform setting section 30 selects one symbol waveform from among a plurality of symbol waveform (or symbol waveform series, each having a length of M) candidates (W1 and W2 in this example), so as to be passed to the modulating section 21. Note that a symbol waveform to be selected is previously set for each wireless station. The transmission timing controlling section 23 determines a timing of receiving the UK detecting signal as a reference timing. Note that a reference timing may be a timing at which a predetermined time period has elapsed since the transmission timing controlling section 23 receives the UW detecting signal. Based on the reference timing and the delay amount having been set by the delay amount setting section 23, the transmission timing controlling section 23 determines a transmission timing of a modulated signal in a similar manner to the first embodiment.

Figure 30:
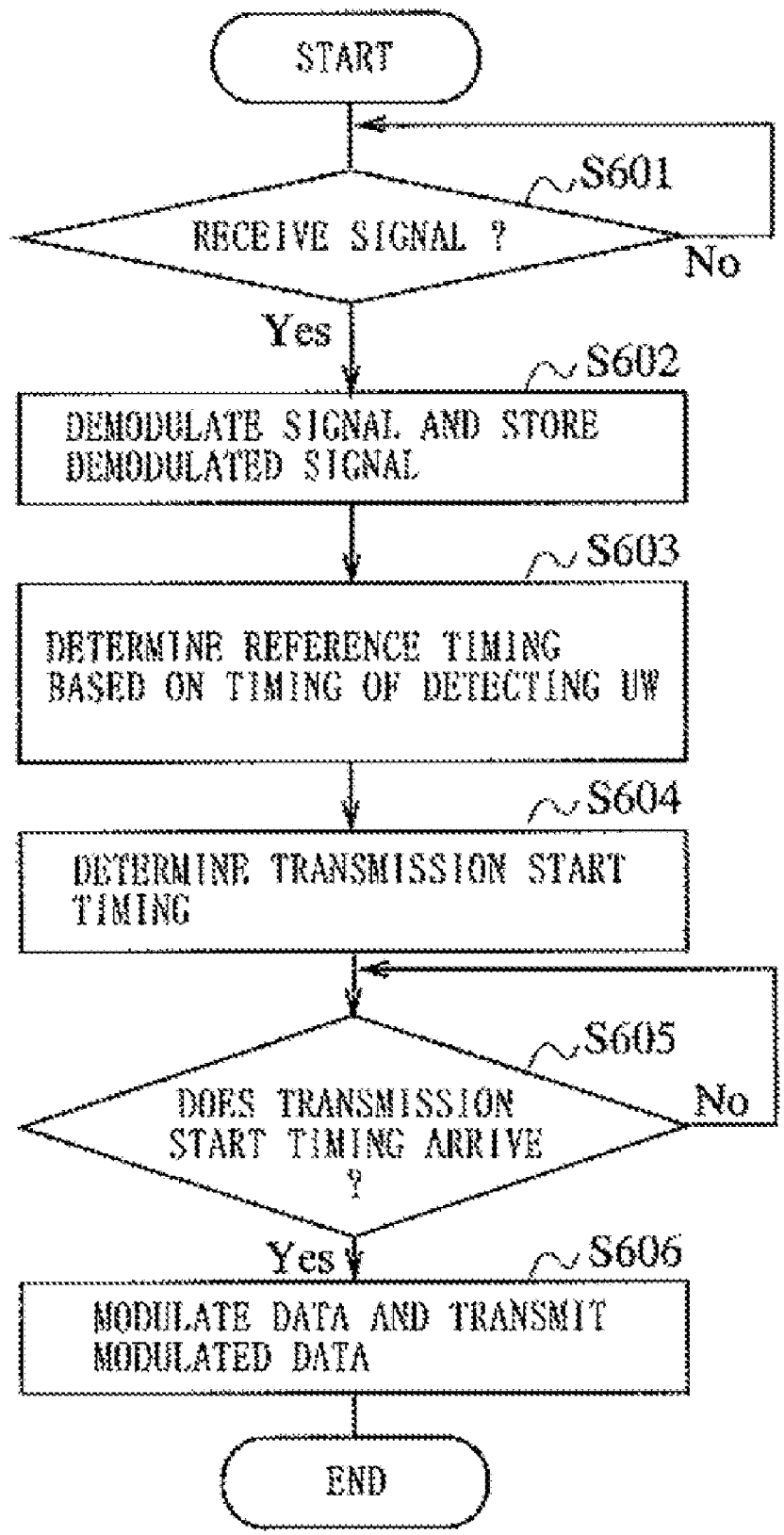
FIG. 30 is a flowchart illustrating an operation of the wireless station 14.

FIG. 30 is a flowchart illustrating an operation of the wireless station 14 having the structure mentioned above.

Firstly, upon receiving a transmission signal transmitted from the transmitting station 13 (step S601, Yes), the demodulating section 29 demodulates the signal outputted from the RF section 24 so as to generate demodulated data. The data retaining section 22 retains the demodulated data as transmission data (step S602). The UW detecting section 27 detects a UW from the demodulated data and generates a UW detecting signal, and then passes the generated signal to the transmission timing controlling section 23. The transmission timing controlling section 23 determines a timing of receiving the UW detecting signal as a reference timing (step S603), and determines a transmission start timing based on the reference timing and a delay amount (step S604). When the transmission start timing arrives (step S605, Yes), the transmission timing controlling section 23 passes the transmission start signal to the modulating section 21. In response to the transmission start signal, the modulating section 21 modulates the transmission data by using a symbol waveform indicated by a waveform bank selecting signal. The modulated transmission data is transmitted to the receiving station 12 via the RF section 24 and the antenna 25 (step S606).

Figure 31:
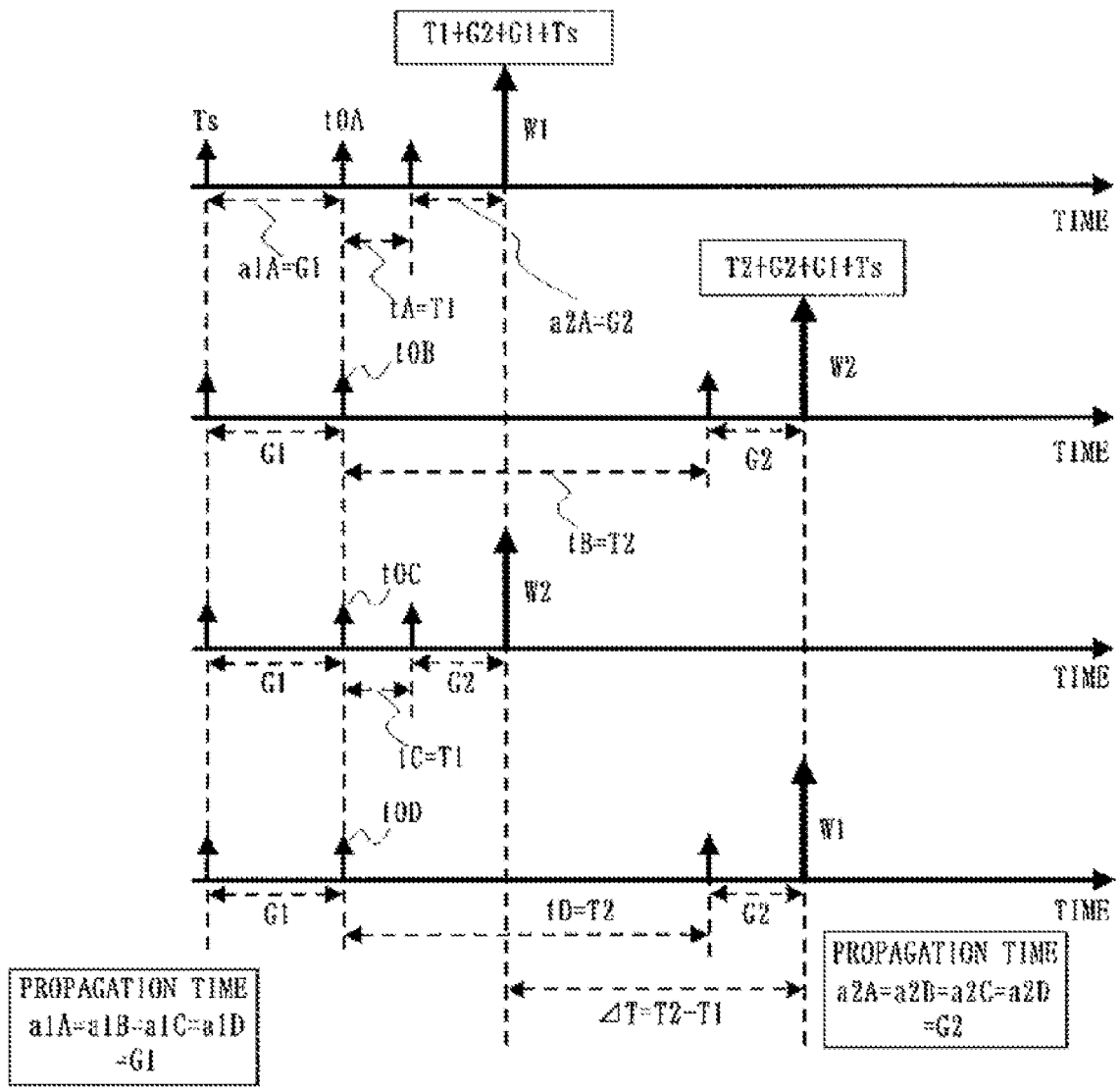
FIG. 31 is a diagram illustrating timings at which wireless stations A1 to D1 transmit signals A1 to D1, respectively.

FIG. 31 is a diagram illustrating timings at which the wireless stations A1 to D1 transmits signals A1 to D1, respectively. The transmitting station 13 transmits a signal to each of the wireless stations A1 to D1 situated in the vicinity thereof at a predetermined timing Ts. A timing at which each of the wireless stations A1 to D1 receives the signal from the transmitting station 13 is as follows:

Wireless station A1: Ts+a1A
Wireless station B1: Ts+a1B

Wireless station C1: Ts+a1C
Wireless station D1: Ts+a1D

Note that propagation times a1A to a1D between the transmitting station 13 and the wireless station A1, between the transmitting station 13 and the wireless station B1, between the transmitting station 13 and the wireless station C1, and between the transmitting station 13 and the wireless station D1 are small enough to be negligible or all the same. Furthermore, a sum time of the propagation time a1A and a time required until the wireless station A1 outputs a UW detecting signal, a sum time of the propagation time a1B and a time required until the wireless station B1 outputs a UW detecting signal, a sum time of the propagation time a1C and a time required until the wireless station C1 outputs a UW detecting signal, and a sum time of the propagation time a1D and a time required until the wireless station D outputs a UW detecting signal are all denoted as G1. Therefore, a UW detecting signal is generated at an equal timing (Ts+G1) among the wireless stations A1 to D1.

Next, each of the wireless stations A1 to D1 determines a UW detecting timing (Ts+G1) indicated by the UW detecting signal as the reference timing t0. Then, the wireless stations A1 to B1 transmit signals to which the delay amounts tA to tD are given, respectively, to the reference timing t0. For example, the wireless station A1 transmits a signal at a timing at which a time period corresponding to tA has elapsed since the reference timing t0. Similarly to the first embodiment, each of the delay amounts tA to tD is selected from among the delay amount candidate values T1 and T2, in order to distribute the transmission timings of the respective wireless stations A1 to D1 into two different timings.

The present embodiment will be described, taking as an example a case where tA=tC=T1 and tB=tD=T2. Each of the wireless stations A1 to D1 transmits a signal at either a timing (T1+G1+Ts) or a timing (T2+G1+TS). Similarly to the first embodiment, the wireless station A1 and the wireless station D1 transmit signals by using the symbol waveform and the wireless station B1 and the wireless station C1 transmit signals by using the symbol waveform W2.

The receiving station 12 receives the signals A1 to D1 transmitted, respectively, from the wireless stations A1 to D1. Note that propagation times a2A to a2D between the wireless station A1 and the receiving station 12, between the wireless station B1 and the receiving station 12, between the wireless station C1 and the receiving station 12, and between the wireless station D1 and the receiving station 12 are small enough to be negligible or all the same, and therefore the propagation times a2A to a2D are denoted as G2. Therefore, a timing at which the receiving station 12 receives each of the signals A1 to D1 is either a timing (T1αG2αG1+Ts) or a timing (T2+G2+G1+Ts). There is a time difference (T2−T1) between the two timings. Therefore, although the same symbol waveform is used between the wireless station A1 and the wireless station D1, there is a moderate time difference between a timing at which a signal arrives at the receiving station 12 from the wireless station A1 and a timing at which a signal arrives at the receiving station 12 from the wireless station D1. Similarly, although the same symbol waveform is used between the wireless station B1 and the wireless station C1, there is a moderate time difference between a timing at which a signal arrives at the receiving station 12 from the wireless station B1 and a timing at which a signal arrives at the receiving station 12 from the wireless station C1. Thus, the path diversity effect can be exerted, thereby making it possible to improve the transmission characteristic. Furthermore, even though a timing at which a signal arrives at the receiving station 12 from the wireless station A1 is the same as that at which a signal arrives at the receiving station 12 from the wireless station C1, different symbol waveforms are used between the two wireless stations mentioned above. Similarly, even though a timing at which a signal arrives at the receiving station 12 from the wireless station B1 is the same as that at which a signal arrives at the receiving station 12 from the wireless station C1, different symbol waveforms are used between the two wireless stations mentioned above. Thus, the path diversity effect can be obtained. As a result, in the entire wireless transmission system, it becomes possible to obtain the diversity effect with paths whose number is four, which is equal to the maximum number of effective branches, which maximum number is increased by using the different symbol waveforms. Note that even if the wireless transmission system includes more than four wireless stations, an additionally provided wireless station transmits a signal such that a timing at which the signal arrives at the receiving station 12 therefrom is set to be either (T1+G2+G1+Ts) or (T2+G2+G1+Ts) (in this case, a symbol, waveform used by the additionally provided wireless station may be W1 or W2 since the symbol waveform thereof will overlap W1 or W2), thereby making it possible to exert the maximum characteristic.

As described above, according to the second embodiment of the present invention, when a signal transmitted from the transmitting station is further transmitted to the receiving station via each of the plurality of wireless stations, a predetermined delay amount is given in each of the wireless stations. Thus, the number of combinations, each containing a symbol waveform and a reception timing at which the receiving station receives an arriving wave, can be equal to the maximum number of effective branches, which number is increased by using the different symbol waveforms. Further, each of the wireless stations determines a timing of detecting an UW as the reference timing. Therefore, it is unnecessary for each of the wireless stations to previously retain the reference timing signal.

Note that in the second embodiment, the UW detecting signal is used as the reference timing signal. However, it may be possible to use any signal indicating that a signal is received from the transmitting station, such as a timing signal which completes frame reception. For example, in the case where a CRC (Cyclic Redundancy Check) code for examining whether the transmission data is correctly received is added to the tail end of a frame, a determination output signal obtained from this code may be used. In this case, when a signal transmitted from the transmitting station is determined as a reception error in each of the wireless stations, the signal is not to be transmitted to the receiving station. As a result, the receiving station can receive only a signal including correct transmission data.

Third Embodiment

Figure 32:
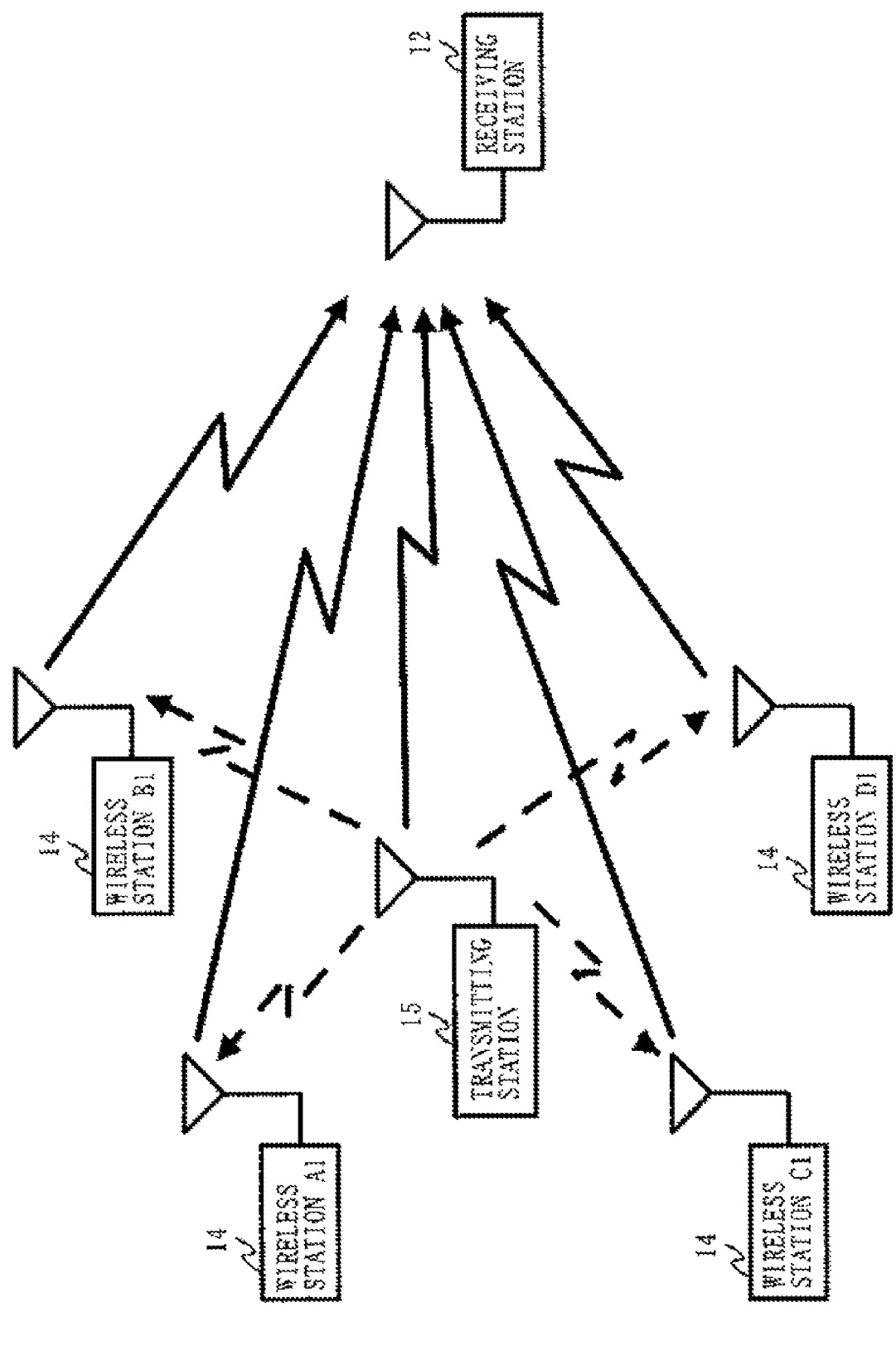
FIG. 32 is a diagram illustrating a structure of the wireless transmission system according to a third embodiment of the present, invention.

FIG. 32 is a diagram illustrating a structure of the wireless transmission system according to a third embodiment of the present invention. In the wireless transmission system according to the third embodiment, although structures of the wireless station 14 (wireless stations A1 to D1) and the receiving station 12, a frame configuration of a signal transmitted from a transmitting station 15 and then from the wireless station 14, and operations of the wireless station 14 and the receiving station 12 are the same as those of the second embodiment, the wireless transmission system according to the third embodiment is different from that of the second embodiment in that transmission data retained by the transmitting station 15 is transmitted twice. Hereinafter, the third, embodiment will be described mainly with respect to this difference.

The transmitting station 15 implements a first signal transmission to the wireless station 14 and a second signal transmission to the receiving station 12. Note that in the second signal transmission, the transmitting station 15 transmits a signal to which a predetermined delay amount is given, such that a timing at which the signal arrives at the receiving station 12 will be equal to a timing at which a transmission signal transmitted from any wireless station 14 arrives at the receiving station 12.

Figure 33:
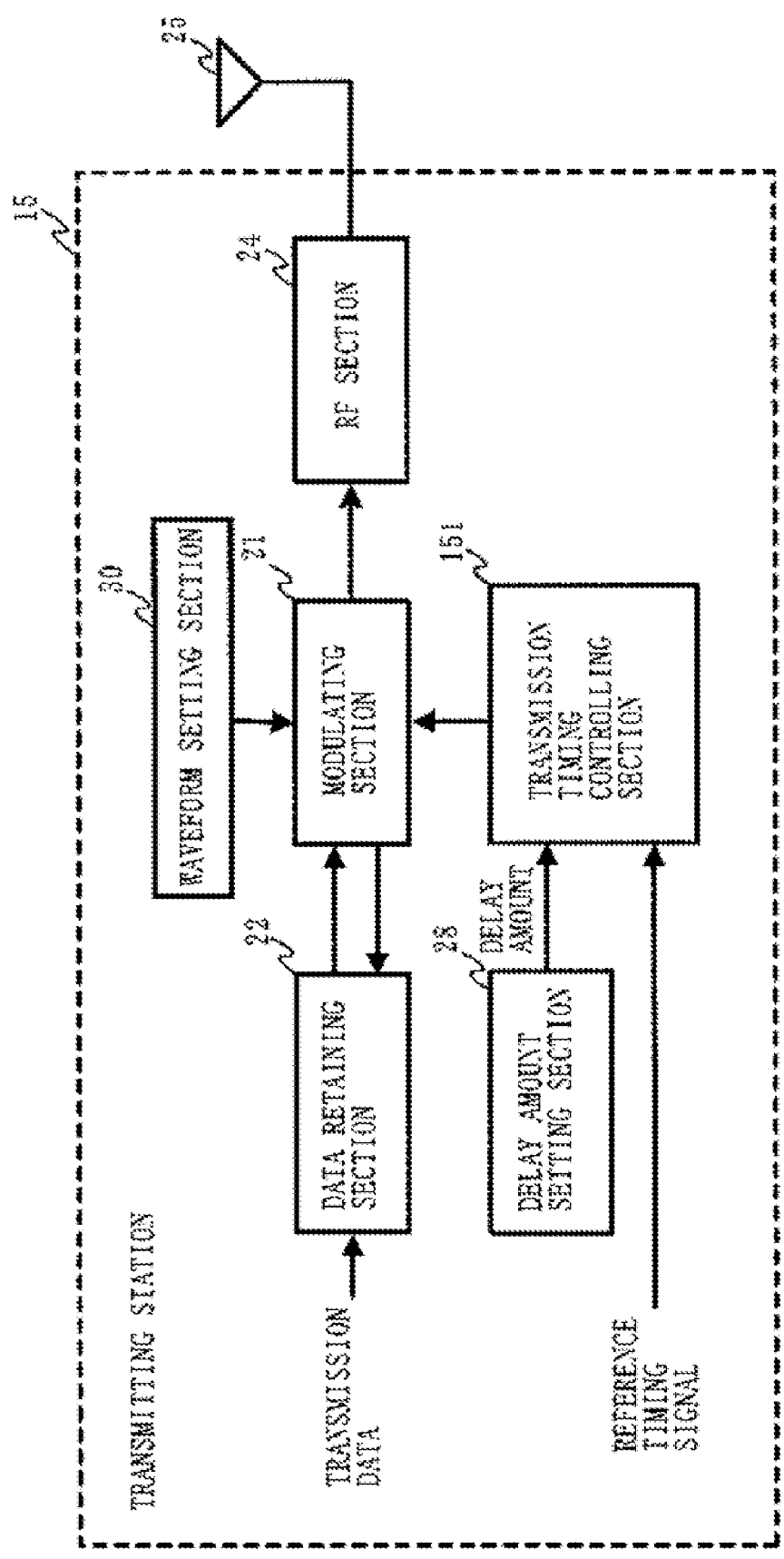
FIG. 33 is a block diagram illustrating an exemplary detailed structure of a transmitting station 15.

FIG. 33 is a block diagram illustrating an exemplary detailed structure of the transmitting station 15 shown in FIG. 32. In FIG. 33, the transmitting station 15 includes a transmission timing controlling section 151, the modulating section 21, the RF section 24, the antenna 25, the delay amount setting section 28, the data retaining section 22, and the waveform setting section 30. Except for the transmission timing controlling section 151, the structure shown in FIG. 33 is the same as those shown in FIG. 24 and FIG. 29.

After implementing the first signal transmission in a similar manner to the above second embodiment, the transmission timing controlling section 151 controls a timing of the second signal transmission (retransmission). The transmission timing controlling section 151 determines a retransmission start timing based on a reference timing indicated by the reference timing signal and a delay amount received from the delay amount setting section 28. In this case, when a propagation time between the transmitting station 15 and the wireless station 14 is small enough to be negligible, the retransmission start timing may foe determined by adding only the delay amount to the reference timing. On the other hand, when the propagation time is large, the retransmission start timing may be determined by adding not only the delay amount but also the propagation time to the reference timing. When the retransmission start timing arrives, the transmission timing controlling section 151 generates a retransmission start signal so as to be passed to the modulating section 21.

FIG. 34 is a flowchart illustrating an operation of the transmitting station 15 having the structure mentioned above.

Firstly, the transmitting station 15 modulates data so as to be transmitted to the wireless station 14 (step S701). Next, the transmission timing controlling section 151 determines a retransmission start timing based on the reference timing and the delay amount (step S702). When the retransmission start timing arrives (step S703), the transmission timing controlling section 151 generates a retransmission start signal so as to be passed to the modulating section 21. In response to the retransmission start signal, the modulating section 21 modulates the transmission data by using a symbol waveform indicated by a waveform bank selecting signal. The modulated transmission data is transmitted to the receiving station 12 via the RF section 24 and the antenna 25 (step S704).

FIG. 35 is a diagram illustrating timings at which the transmitting station 15 and the wireless stations A1 to D1 transmit signals. FIG. 35 shows a timing of a signal transmitted from the transmitting station 15, in addition to a timing of a modulated signal transmitted from each of the wireless stations A1 to D1 shown in FIG. 32.

As described above, a timing at which each of the wireless stations A1 to D1 receives a signal from the transmitting station 15 as a result of the first signal transmission is as follows:

Wireless station A1: Ts+a1A
Wireless station B1: Ts+a1B
Wireless station C1: Ts+a1C
Wireless station D1: Ts+a1D Next, the transmitting station 15 implements the second transmission, giving a delay amount t0, which is selected from among the delay amount candidate values T1 and T2, to the reference timing Ts. FIG. 35 shows an example where the transmitting station 15 selects T1 from among the delay amount candidate values and transmits, to the receiving station 12, a signal to which a delay amount t0=T1 is given. A symbol waveform used by the transmitting station 15 may be W1 or W2. Note that the conditions required for causing the wireless transmission system to exert the maximum characteristic when a great number of wireless stations are included therein is as already described above.

The receiving station 12 receives a signal transmitted from the transmitting station 15 and a signal transmitted from each of the wireless stations 14. A timing at which the receiving station 12 receives each of the five signals is either a timing (T1+G2+G1+TS) or a timing (T2+G2+G1+Ts). There is a time difference (T2−T1) between the two timings. Therefore, although the same symbol waveform is used between the wireless station A1 and the wireless station D1, there is a moderate time difference between a timing at which a signal arrives at the receiving station 12 from the wireless station A1 and a timing at which a signal arrives at the receiving station 12 from the wireless station D1. Similarly, although the same symbol waveform is used between the wireless station B1 and the wireless station C1, there is a moderate time difference between a timing at which a signal arrives at the receiving station 12 from the wireless station B1 and a timing at which a signal arrives at the receiving station 12 from the wireless station C1. Thus, the path diversity effect can be exerted, thereby making it possible to improve the transmission characteristic. Furthermore, even though a timing at which a signal arrives at the receiving station 12 from the wireless station A1 is the same as that at which a signal arrives at the receiving station 12 from the wireless station C1, different symbol waveforms are used between the two wireless stations mentioned above. Similarly, even though a timing at which a signal arrives at the receiving station 12 from the wireless station B1 is the same as that at which a signal arrives at the receiving station 12 from the wireless station D1, different symbol waveforms are used between the two wireless stations mentioned above. Thus, the path diversity effect can be obtained. As a result, in the entire wireless transmission system, it becomes possible to obtain the diversity effect with paths whose number is four, which is equal to the maximum number of effective branches, which maximum number is increased by using the different symbol waveforms.

As described above, according to the third embodiment of the present invention, after transmitting a signal to each of the wireless stations, the transmitting station transmits, to the receiving station, the same signal to which a predetermined delay amount is given. Thus, the number of signals to be received by the receiving station increases, thereby making it possible to stabilize a reception level of a signal. Furthermore, in the second signal transmission, a timing at which a signal transmitted from the transmission station arrives at the receiving station 12 is equal to a timing at which a transmission signal transmitted from any wireless station 14 arrives at the receiving station 12. Therefore, the number of combinations, each containing a reception timing and a symbol waveform, is reduced to be less than or equal to the maximum number of effective branches, thereby making it possible to exert the maximum path diversity.

In the second and third embodiments, a delay amount to be selected by the transmitting station from among the delay amount candidate values T1 and T2 is previously determined. However, a delay amount to be selected by each wireless station may be selected from among a plurality of candidate values on a random basis. Furthermore, the reference timing t0 of each wireless station may be, other than a timing at which the wireless station 14 receives a signal from the transmitting station, a timing obtained from temporal information included in the GPS signal, which can be shared among the transmission station and the wireless stations or a timing obtained from a radio clock.

Furthermore, even with a structure, as shown in FIG. 36, in which the transmitting station 15 is connected to each of the wireless stations A1 to D1 via a wired transmission path, it becomes possible to obtain the maximum path diversity effect in the receiving station, similarly to the above.

Fourth Embodiment

Figure 37:
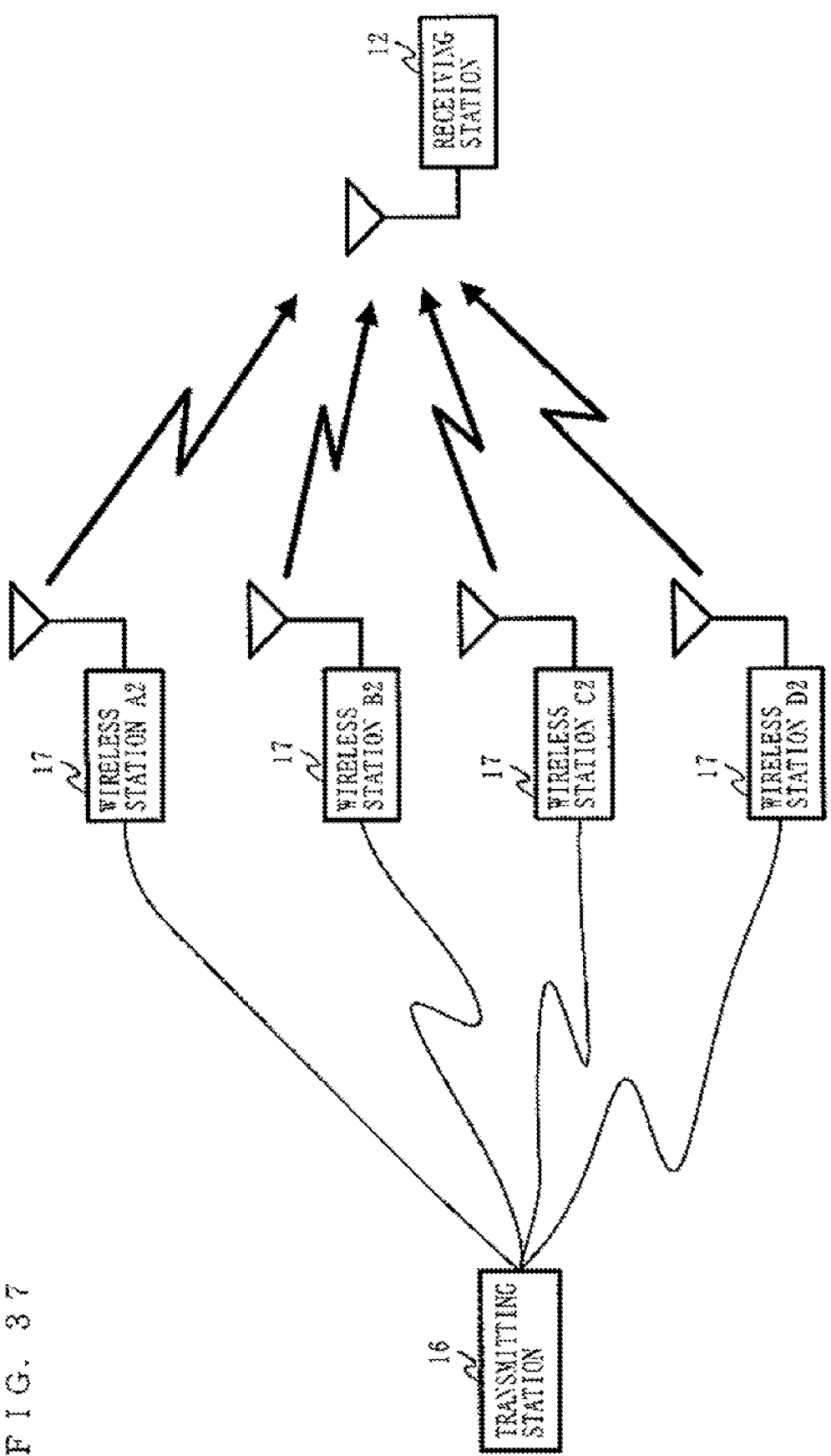
FIG. 37 is a diagram illustrating a structure of the wireless transmission system according to a fourth embodiment of the present invention.

FIG. 37 is a diagram illustrating a structure of the wireless transmission system according to a fourth embodiment of the present invention. In FIG. 37, the wireless transmission system comprises a transmitting station 16, a plurality of wireless stations 17, and the receiving station 12. The transmitting station 16 is connected to each of the wireless stations 17 via a wired transmission path, and each of the wireless stations 17 is wirelessly connected to the receiving station 12. The wireless transmission system according to the fourth embodiment is different from that of the second embodiment in that in the wireless transmission system according to the fourth embodiment, the transmitting station 16 is connected to each of the plurality of wireless stations 17 via a wired transmission path, and the transmitting station 16 controls a delay amount and symbol waveform used by each of the wireless stations 17. Hereinafter, the fourth embodiment will be described mainly with respect to this difference.

FIG. 37 shows an example where the wireless transmission system includes four wireless stations 17. Hereinafter, when it is necessary to distinguish among these four wireless stations 17, the wireless stations are referred to as wireless stations A2 to D2. On the other hand, when it is unnecessary to distinguish among the four wireless stations 17, the wireless stations are generically referred to as the wireless station (s) 17. The receiving station 12 has the same structure as that of the receiving station according to the first embodiment. Therefore, any detailed description thereof will be omitted.

Figure 38:
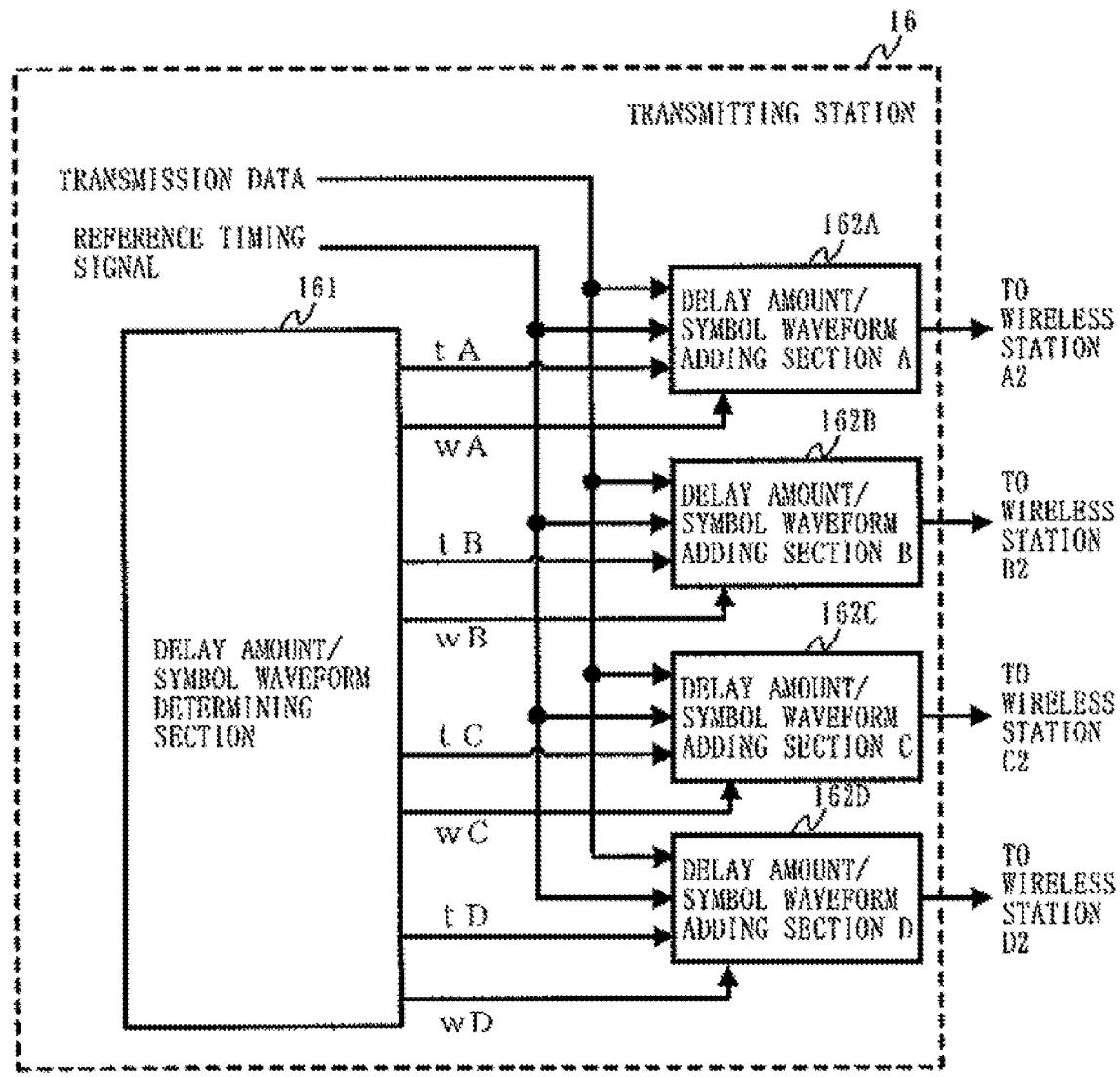
FIG. 38 is a block diagram illustrating an exemplary detailed structure of a transmitting station 16.

The transmitting station 16 designates a delay amount and a symbol waveform (or a symbol waveform series having a length of M) used by the wireless station 17, FIG. 38 is a block diagram illustrating an exemplary detailed structure of the transmitting station 16. In FIG. 38, the transmitting station 16 includes a symbol waveform determining section 161, and four symbol waveform adding sections 162A to 162D. Note that FIG. 38 does not show the modulating section, the RF section and an antenna section since these components have already been described above.

The delay amount/symbol waveform determining section 161 selects one delay amount from among a plurality of candidate values (T1 or T2, for example) so as to determine the delay amounts tA to tD to be designated for the respective wireless stations A2 to D2, and also selects one symbol waveform from among a plurality of symbol waveform candidates (W1 or W2, for example) so as to determine the symbol waveforms to be designated for the respective wireless stations A2 to D2. The number of combinations, each containing a delay amount and a symbol waveform, both are selected from among the plurality of candidate values and the plurality of symbol waveform candidates, respectively, is equal to the maximum number of effective branches, which number is increased by using the different symbol waveforms permitted by the wireless transmission system (the present embodiment assumes that the maximum number of effective branches is four, similarly to the above embodiments). The delay amount/symbol wave form de terraining section 161 passes the determined delay amounts tA to tD and symbol waveforms wA to wD to the symbol waveform adding sections 162A to 162D, respectively. Note that a delay amount and symbol waveform to be selected by the delay amount/symbol waveform determining section 161 may be previously determined or may be determined on a random basis. Furthermore, it is preferable that different types of combinations, each containing a delay amount and a symbol waveform, are evenly distributed among the wireless stations to which the combinations are respectively assigned.

The delay amount/symbol waveform adding sections 162A to 162D add delay amount information indicating the determined delay amounts tA to tD and symbol waveform information indicating the determined symbol waveforms wA to wD, respectively, to an end portion of each framed transmission data shown in FIG. 28. As described above, by adding the delay amount information and the symbol waveform information to a signal, the transmitting station 16 notifies the wireless station 17 of a delay amount, of the transmission signal and a symbol waveform used for modulation.

Figure 39:
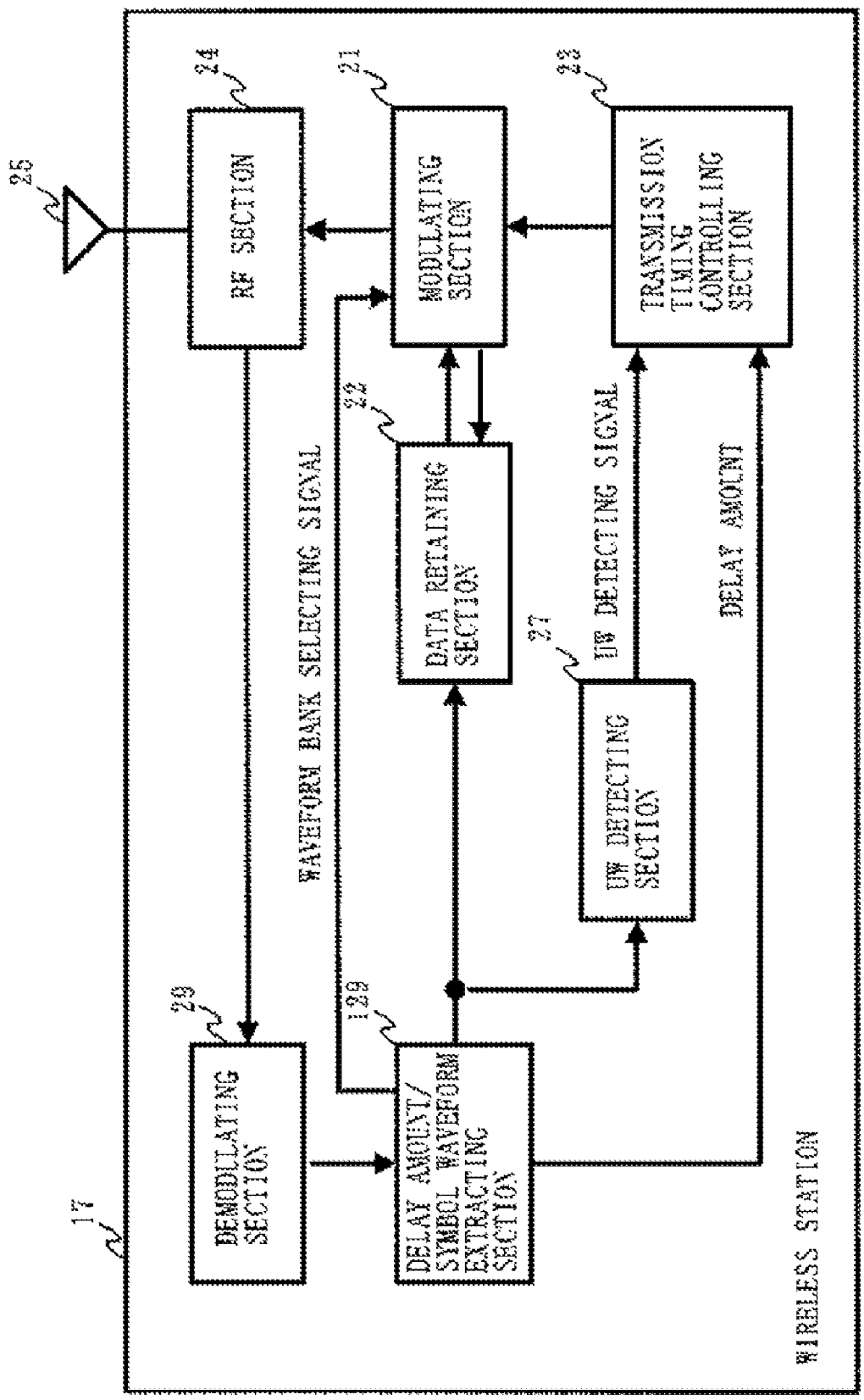
FIG. 39 is a block diagram illustrating an exemplary detailed structure of a wireless station 17.

FIG. 39 is a block diagram illustrating an exemplary detailed structure of the wireless station 17. The wireless station 17 shown in FIG. 39 has the same structure as that of the wireless station 14 shown in FIG. 29 except for a delay amount/symbol waveform extracting section 129. The delay amount/symbol waveform extracting section 129 extracts the delay amount information from the demodulated data so as to be passed to the transmission timing controlling section 23, and also extracts the symbol waveform information from the demodulated data so as to be passed to the modulating section 21. In addition, the delay amount/symbol waveform extracting section 129 passes, to the data retaining section 22, the transmission data from which the delay amount information and the symbol waveform information are removed. Similarly to the second embodiment, the transmission timing controlling section 23 determines a transmission timing by adding the delay amount to the reference timing.

Figure 40:
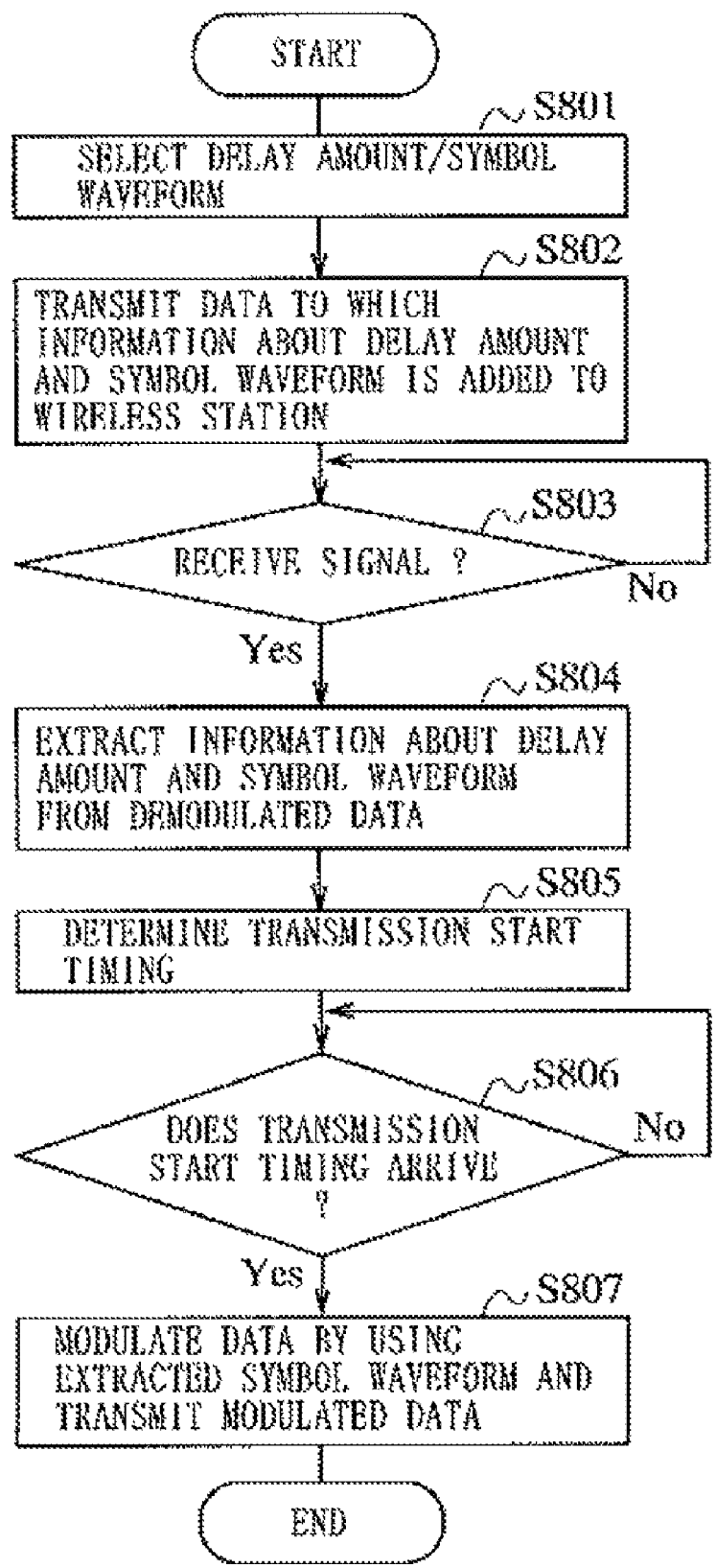
FIG. 40 is a flowchart illustrating operations of the transmitting station 16 and the wireless station 17.

FIG. 40 is a flowchart illustrating operations of the transmitting station 16 and the wireless station 17 having the structures mentioned above.

In the transmitting station 16, the delay amount/symbol waveform determining section 161 selects one delay amount from among a plurality of candidate values so as to determine the delay amounts tA to tD to be designated for the respective wireless stations A2 to D2, and also selects one symbol waveform from among a plurality of symbol waveform candidates so as to determine the symbol waveforms wA to wD to be designated for the respective wireless stations A2 to D2 (step S801). The delay amount/symbol, waveform adding sections 162A to 162D add, to an end portion of each framed transmission data, values indicating the determined delay amounts tA to tD and values indicating the determined symbol waveforms wA to wD, so as to be transmitted to the wireless station A2 to D2, respectively, via the modulating section, the RF section and the antenna (step S802).

When it is determined that the wireless station 17 correctly receives a signal from the transmitting station 16 (step S803, Yes), the demodulating section 29 demodulates the signal outputted from the RF section 24 so as to generate demodulated data. The delay amount/symbol waveform extracting section 129 extracts the delay amount information and the symbol, waveform information from the demodulated data (step S804). Next, the transmission timing controlling section 23 determines a transmission timing by adding the delay amount to the reference timing (step S805). When a transmission start timing arrives (step S806, Yes), the transmission timing controlling section 23 passes a transmission start signal to the modulating section 21. The modulating section 21 modulates the transmission data by using a symbol waveform indicated by the extracted waveform bank selecting signal. The modulated transmission data is transmitted to the receiving station 12 via the RF section 24 and the antenna 25 (step S807).

As described above, according to the fourth embodiment of the present invention, the transmitting station can directly control a timing of a signal transmitted from each wireless station and a symbol waveform used for modulation.

Figure 41:
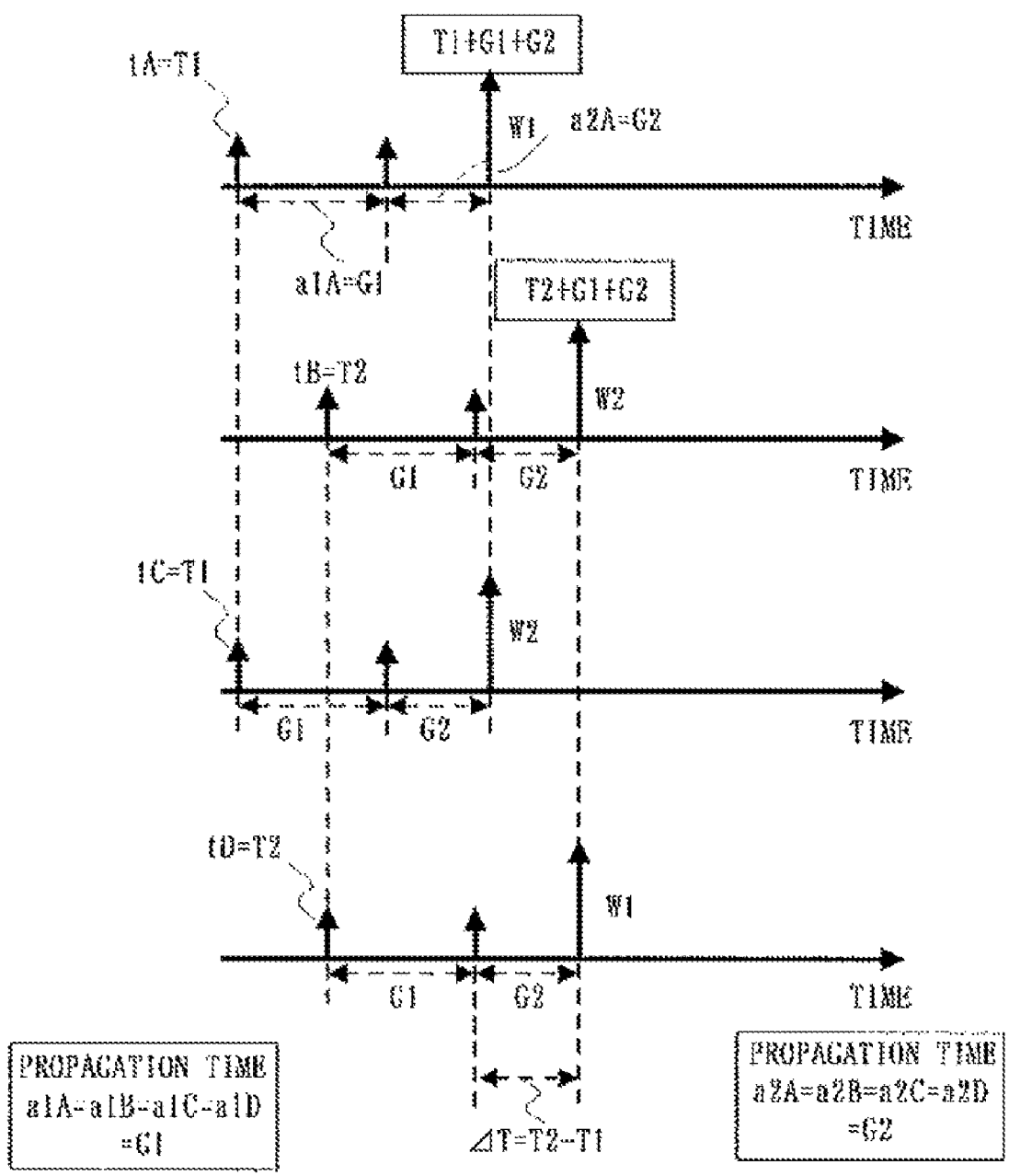
FIG. 41 is a diagram illustrating timings of signals transmitted from the wireless stations 17.

The fourth embodiment illustrates an example where the transmitting station notifies each wireless station of a delay amount and a symbol waveform without using the transmission signal. However, the transmitting station may transmit, to each wireless station, a signal to which a predetermined delay amount is given. FIG. 41 is a diagram illustrating timings of signals transmitted from the wireless stations in the aforementioned case.

The delay amounts to and tC given by the transmitting station 16 to the transmission signals to be transmitted to the wireless stations A2 and C2, respectively, are T1. Similarly, the delay amounts tB and tD given by the transmission station 16 to the transmission signals to be transmitted to the wireless stations B2 and D2, respectively, are T2. The transmitting station 16 transmits, to each of the wireless stations, a signal to which the delay amounts T1 or T2 is given to a predetermined timing. When the propagation times between the transmitting station 16 and each of the respective wireless stations A2, B2, C2 and D2 are G1, a timing at which each of the wireless stations A2 and C2 receives a signal from the transmitting station 16 is (T1+G1). Also, a timing at which each of the wireless stations B2 and D2 receives a signal from the transmitting station 16 is (T2+G1). Furthermore, when the propagation times between the receiving station 12 and each of the respective wireless stations A2, B2, C2 and D2 are G2, the receiving station 12 receives signals A2 to D2 at either a timing (T1+G1+G2) or a timing (T2+G1+G2). Therefore, the path diversity effect is exerted, thereby making it possible to improve the transmission characteristic.

Note that in the fourth embodiment, a delay amount used by each wireless station is determined by selecting a delay amount from among the candidate values. However, the delay amount may be determined by adjusting a length of a wired transmission path connecting the transmitting station to each of the wireless stations.

Fifth Embodiment

The first to fourth embodiments describe a case where a distance between the receiving station and each of the plurality of wireless stations is small enough to be negligible or the same. The following embodiments will describe a case where a distance between the receiving station and each of the plurality of wireless stations is too large to be negligible.

Figure 42:
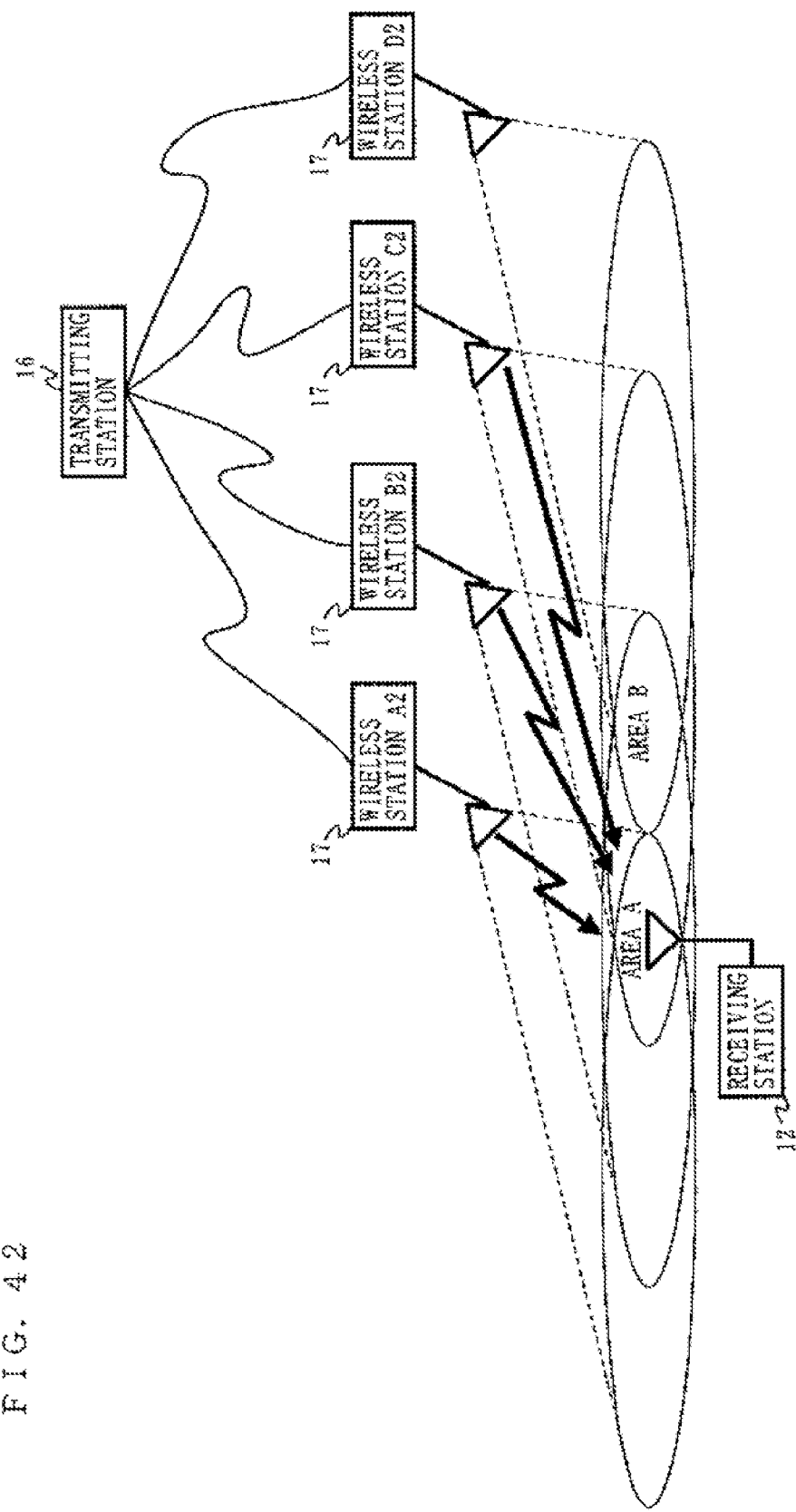
FIG. 42 is a diagram illustrating a structure of the wireless transmission system according to a fifth embodiment of the present, invention.

FIG. 42 is a diagram illustrating a structure of the wireless transmission system according to a fifth embodiment of the present invention. In the fifth embodiment, the structures of the transmitting station 16, the wireless station 17 and the receiving station 12 are the same as those of the fourth embodiment. Therefore, any detailed descriptions thereof will be omitted.

The transmitting station 16 transmits, to the wireless stations A2 to D2, the signals A2 to D2 to which the delay amounts tA to tD are given, respectively. Note that it is assumed that a length of a wired transmission path connecting the transmitting station 16 to each of the wireless stations A2 to D2 is substantially equal. Accordingly, the propagation times a1A to a1D required for the signals A2 to D2 to be transmitted from the transmitting station 16 to the wireless stations A2 to D2, respectively, are G1.

Each of the wireless stations forms one communication area, and the plurality of wireless stations A2 to D2 are disposed such that a plurality of communication areas thereof are continuously arranged. For example, the plurality of wireless stations A2 to D2 are linearly disposed. Furthermore, an area in which the plurality of communication areas overlap each other is referred to as a complex area. In particular, an area in which the communication areas of the wireless stations A2, B2 and C2 overlap each other is referred to as a complex area A, and an area in which the communication areas of the wireless stations B2, C2 and D2 overlap each other is referred to as a complex area B. Note that the number of overlapped communication areas forming a complex area is not limited, to three. The aforementioned number may be two, or may be four or even more. When it is necessary to distinguish among signals transmitted from the wireless stations A2 to D2, the signals are referred to as signals A to D.

When the receiving station 12 is situated in the complex area A, the receiving station 12 receives the signals A to C. On the other hand, when the receiving station 12 is situated in the complex area B, the receiving station 12 receives the signals B to D. As described above, in each of the complex areas A and B, the three signals respectively transmitted from, three wireless stations 17 arrive.

Figure 43:
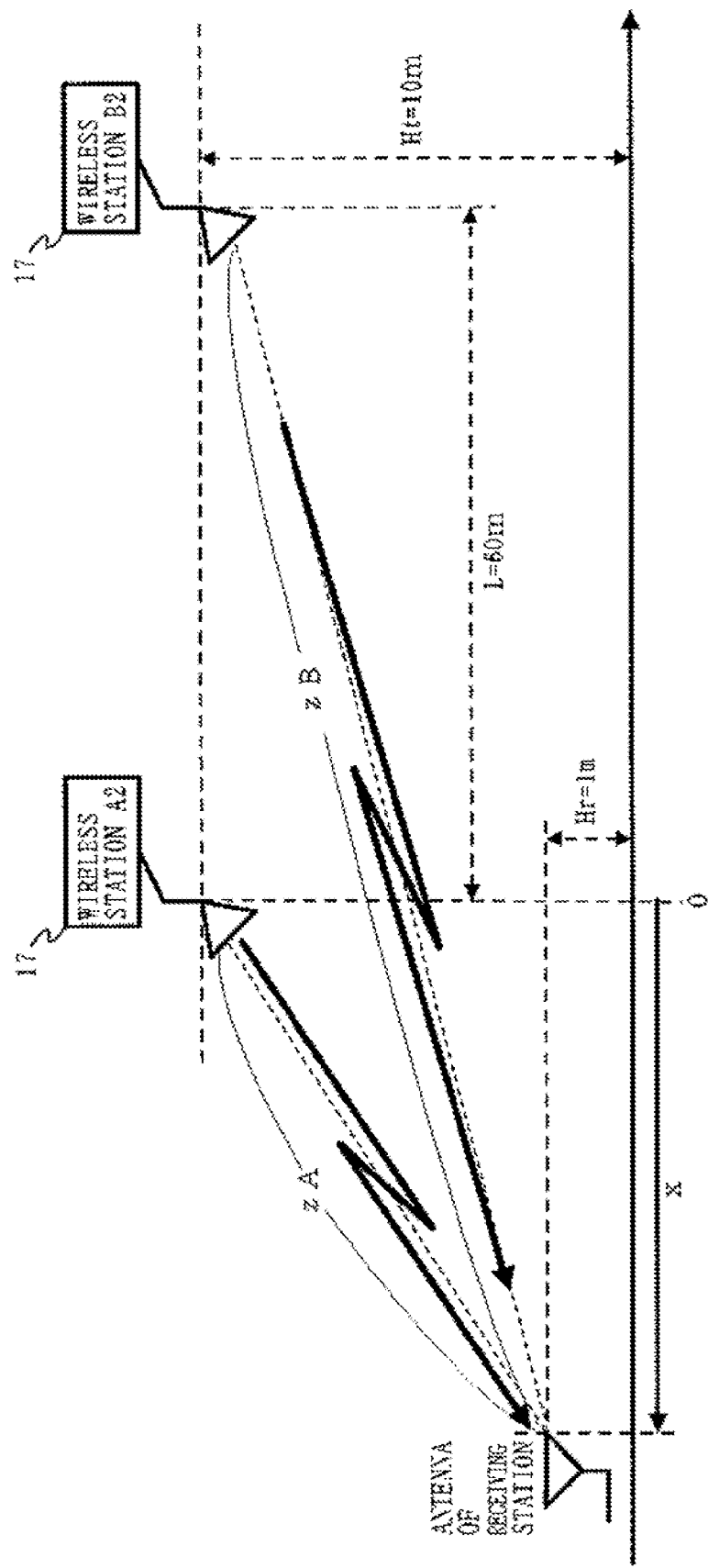
FIG. 43 is a schematic diagram illustrating positional relationships among the receiving station 12 and two wireless stations A2 and B2.

FIG. 43 is a schematic diagram illustrating positional relationships among the receiving station 12 and the two wireless stations A2 and B2. Note that when a height of an antenna included in the receiving station 12, a height of an antenna included in each of the wireless stations A2 and B2, a distance between the wireless station A2 and the wireless station B2, and a distance between the receiving station 12 and the wireless station A2 are denoted as Hr, Ht, L and x, respectively, a path length (propagation distance) zA between the wireless station K2 and the receiving station 12 and a path length zB between the wireless station B2 and the receiving station 12 are represented by the following formulas (16) and (17), respectively.

$$zA = \sqrt{x^2 + (Ht - Hr)^2} \qquad (16)$$

$$zB = \sqrt{(x + L)^2 + (Ht - Hr)^2} \qquad (17)$$

Therefore, a path length difference Δz, which indicates a difference between the path length zB and the path length zA, is represented by the following formula (18), $$\Delta z = zB - zA \qquad (18)$$
$$= \sqrt{(x + L)^2 + (Ht - Hr)^2} - \sqrt{x^2 + (Ht - Hr)^2}$$

Now, it is assumed that L=60 m, Ht=10 mm and Hr=1 m are satisfied when a vehicle traveling on a road performs wireless communication with a radio mounted at the side of the road, for example.

FIG. 44 is a diagram illustrating a relationship between the path length difference Δz and the distance x between the receiving station 12 and the wireless station. In FIG. 44, the vertical axis represents the path length difference Δz and the horizontal axis represents the distance x between the receiving station 12 and the wireless station 17.

As shown in FIG. 44, if the distance between the wireless station A2 and the receiving station 12 is several meters or more, it can be possible to cause the path length difference Δz to be close to the distance between the antennas of the wireless stations A2 and B2. Therefore, regardless of a position of the receiving station 12, the path length difference Δz is substantially equal to the distance L between the antennas, and thus the path length difference Δz is represented by the following formula (19).

$$\Delta z = zB - ZA \approx L \quad (19)$$

Therefore, when a propagation time corresponding to the distance L is denoted as P, a difference Δp between a propagation time pA from the transmitting station A2 to the receiving station 12 and a propagation time pB from the transmitting station B2 to the receiving station 12 is represented by the following formula (20).

$$\Delta p = pB - pA \approx P \quad (20)$$

Then, the transmitting station 16 transmits signals to the wireless stations A2, B2, C2 and D2 at the timings tA, tB, tC and tD, respectively. Rote that a time difference between tA and tB is represented as tAB=tB−tA. Similarly, the other delay amounts are also represented in the same manner as described above.

Next, a method of setting the delay amounts tA and tC, and reception timings obtained when the receiving station 12 is situated in the complex area A (the wireless station A2 as the nearest station to the receiving station 12) will be described.

Figure 45:
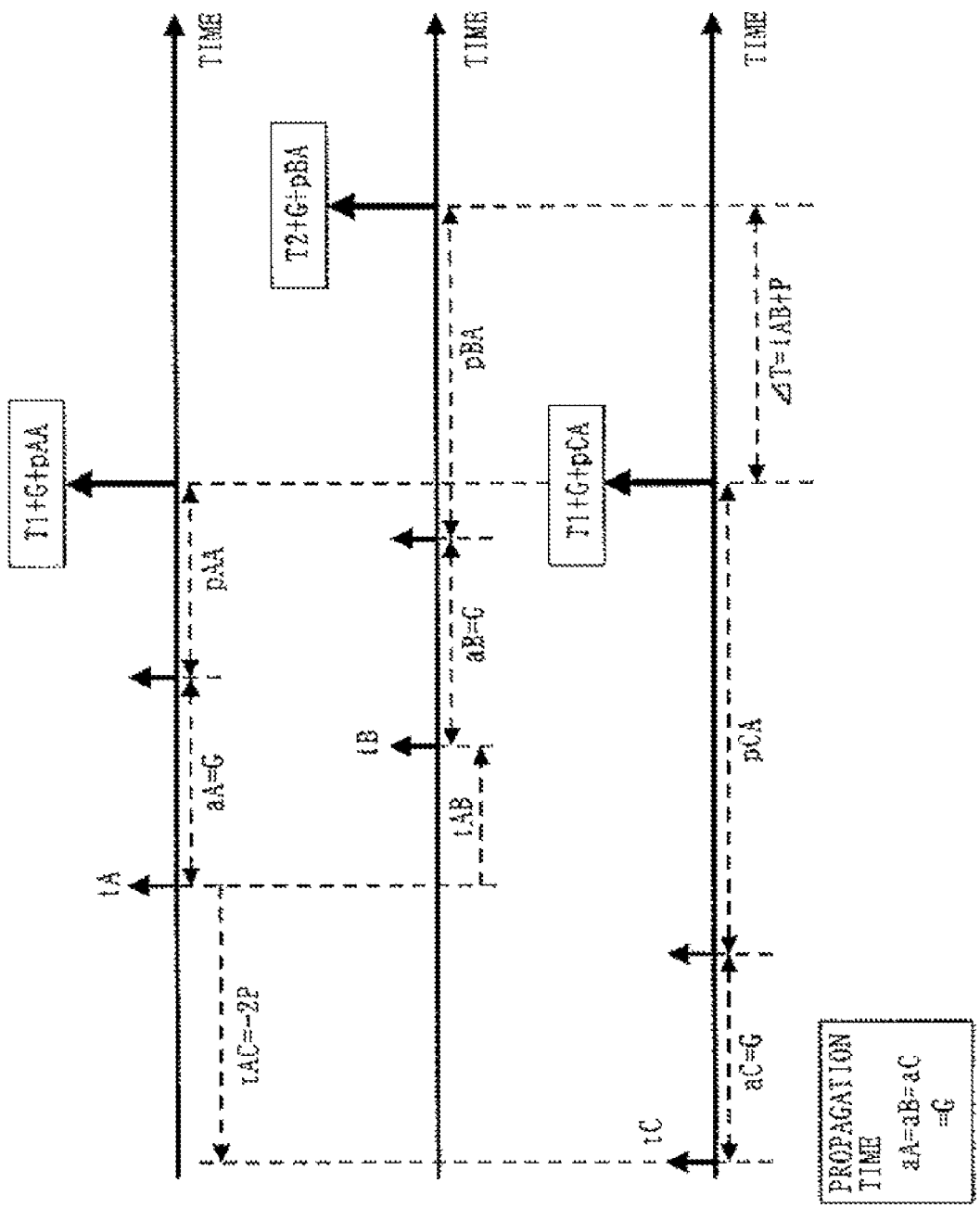
FIG. 45 is a diagram illustrating timings of signals obtained when the receiving station 12 is situated in a complex area A.

FIG. 45 is a diagram illustrating timings of the signals obtained when the receiving station 12 is situated in the complex area A. The receiving station 12 receives signals transmitted only from the stations nearest, second nearest and third nearest thereto, which, in this case, are the wireless stations A2 to C2. Note that a propagation time between the wireless station A2 and the receiving station 12, a propagation time between the wireless station B2 and the receiving station 12, and a propagation time between the wireless station C2 and the receiving station 12 are denoted as pAA, pBA and pCA, respectively. From the analogous formula (20), the pAA, pBA and pCA are represented by the following formula (21), regardless of a position of receiving station 12 in the complex area A.

$$pBA - pAA = P(>0), pCA - pAA = 2P \quad (21)$$

A timing at which the receiving station 12 receives the signal transmitted from each of the wireless stations A2 to C2 is as follows:

The signal A2 transmitted from the wireless station A2: tA+α+pAA

The signal B2 transmitted from the wireless station B2: tB+α+pBA

The signal C1 transmitted from the wireless station C2; tC+α+pCA

Furthermore, a time difference τAB between a time at which the signal A2 arrives at the receiving station 12 and a time at which the signal B2 arrives at the receiving station 12, and a time difference τAC between a time at which the signal A2 arrives at the receiving station 12 and a time at which the signal C2 arrives at the receiving station 12 are represented by the following formulas (22) and (23), respectively.

$$\tau AB = (tB-tA)+(pEA-pAA) = tAB+P \quad (22)$$

$$\tau AC(tC-tA)+(pCA-pAA) = tAC+2P \quad (23)$$

When the delay amount tC is set such that tAC=2P(=tC−tA<0) is satisfied, τAC=0 is accordingly satisfied. Therefore, the receiving station 12 receives the signals A2 and C2 at the same timing. Note that when tAC is a negative value, it is indicated that tC is an earlier timing than tA. Then, the receiving station 12 receives the signal B at a timing at which a time period corresponding to (tAB+P) has elapsed since a timing at which the receiving station 12 received the signal A or C. That is, the receiving station 12 receives three signals respectively transmitted from the three wireless stations at two different timings.

Similarly, a method of setting the delay amounts tB and tD, and reception timings obtained when the receiving station 12 is situated in the complex area B (the wireless station B2 as the nearest station to the receiving station 12) will be described.

Figure 46:
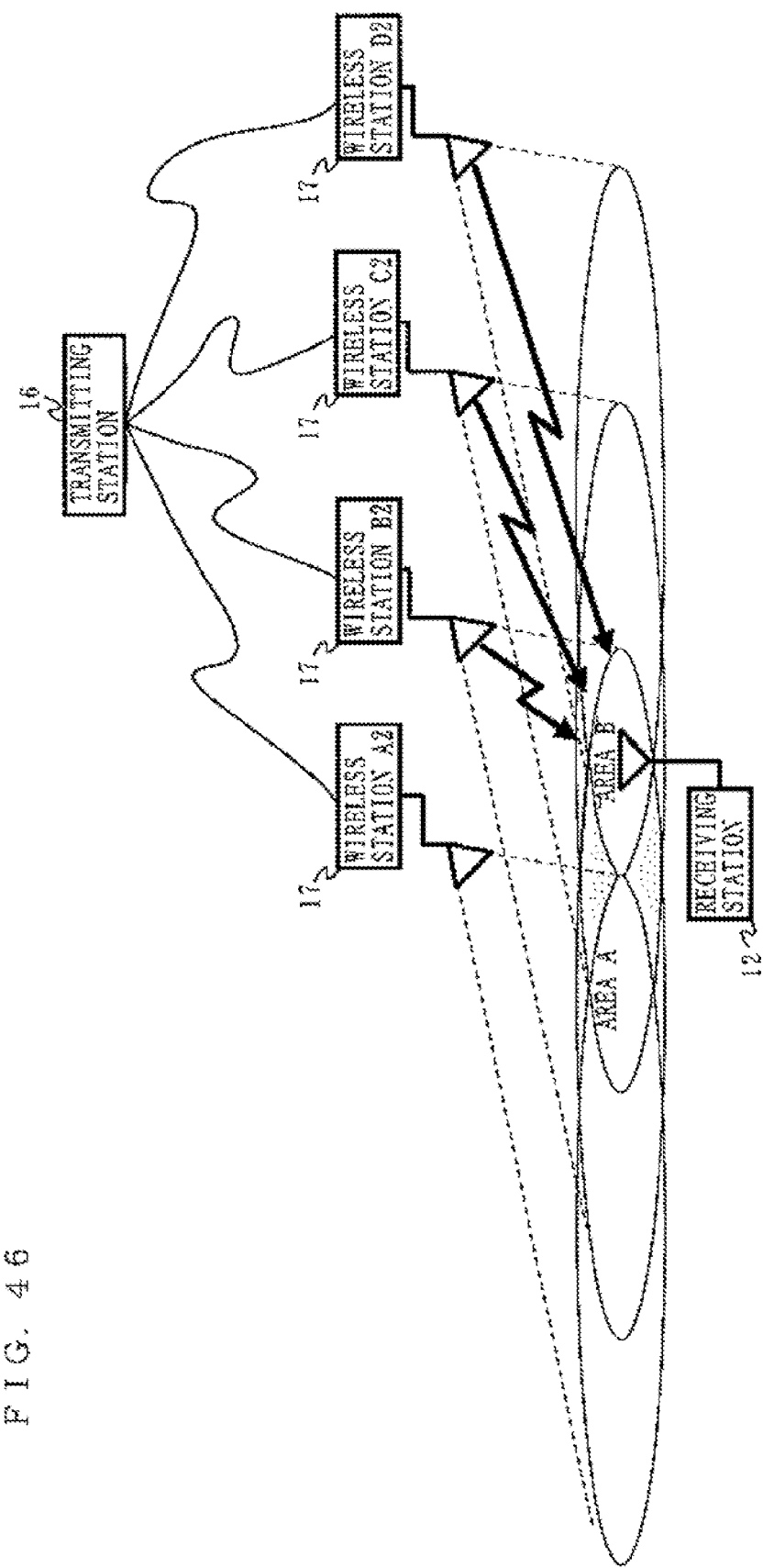
FIG. 46 is a diagram illustrating a structure of the wireless transmission system obtained when the receiving station 12 is situated in a complex area B.
Figure 47:
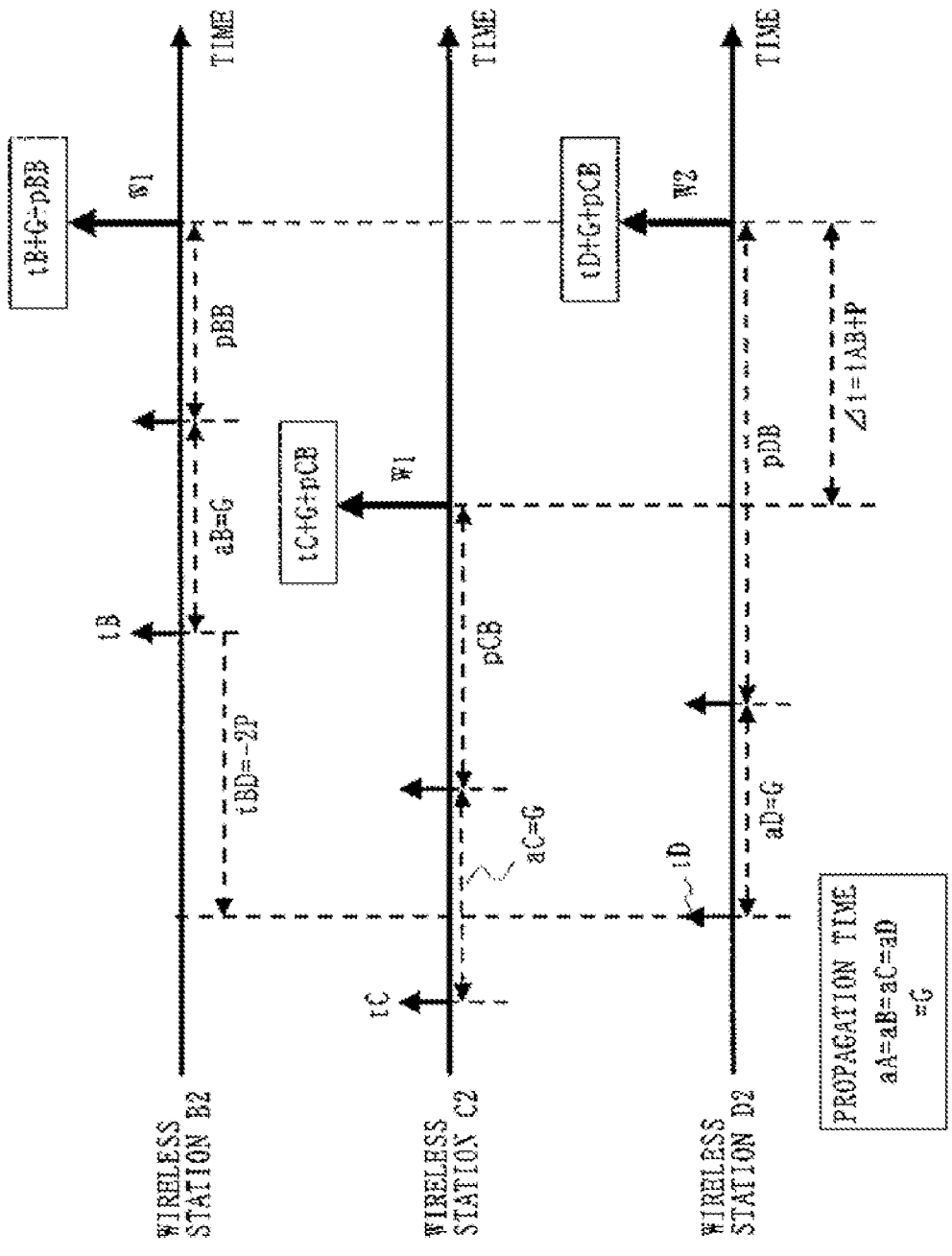
FIG. 47 is a diagram illustrating timings of signals obtained when the receiving station 12 is situated in the complex area E.

FIG. 46 is a diagram illustrating a structure of the wireless transmission system obtained when the receiving station 12 is situated in the complex area 8. FIG. 47 is a diagram illustrating timings of signals obtained when the receiving station 12 is situated in the complex area B.

The receiving station 12 is capable of receiving signals transmitted only from the stations nearest, second nearest and third nearest thereto, which, in this case, are the wireless stations B2 to D2. A propagation time between the wireless station B2 and the receiving station 12, a propagation time between the wireless station C2 and the receiving station 12, a propagation time between the wireless station D2 and the receiving station 12 are denoted as pBB, pCB and pDB, respectively. From the analogous formula (20), the pBB, pCB and pCB are represented by the following formula (24), regardless of a position of receiving station 12 in the complex area B.

$$pCB - pBB = P(>0), pDB - pBB = 2P \quad (24)$$

A timing at which the signal transmitted from each of the wireless stations B2 to D2 is received at the receiving station 12 is as follows:

The signal B2 transmitted from the wireless station B2: tB+α+pBB

The signal C2 transmitted from the wireless station C2: tC+α+pCB

The signal B2 transmitted from the wireless station D2; tD+α+pDB

Furthermore, a time difference τBC between a time at which the signal B2 arrives at the receiving station 12 and a time at which the signal C2 arrives at the receiving station 12, and a time difference τBD between a time at which the signal B2 arrives at the receiving station 12 and a time at which the signal D2 arrives at the receiving station 12 are represented by the following formulas (25) and (26), respectively.

$$\begin{aligned}\tau BC &= (tC - tB) + (pCB - pBB) \\ &= (tAC + tA) - (tAB + tA) + P \\ &= -2P - tAB + P \\ &= -(tAB + P) \quad (<0)\end{aligned} \quad (25)$$

$$\tau BD = (tD - tB) + (pDB - pBB) = tBD + 2P \quad (26)$$

When the delay amounts tB and tD are set such that tSD=−2P(=tD−tB<0) is satisfied, for example, τBD=0 is accordingly satisfied. Therefore, the receiving station 12 receives the signals B and D at the same timing. Thus, the receiving station 12 firstly receives the signal C, and then receives the signals B and D at the same timing at which a time period corresponding to (tAB+P) has elapsed since a timing at which the receiving station 12 received the signal c. That is, the receiving station 12 receives three signals respectively transmitted from the three wireless stations at the two different timings.

As described above, at a receiving end of each of the complex areas A and B, signals transmitted from the wireless stations 17 nearest, second nearest and third nearest to the receiving station 12 are received at the two different timings. Each of the two timings is shared by wireless stations next but one to each other, that is, the wireless stations A2 and C2 or the wireless stations B2 and D2 in the present embodiment. As described above, even when the receiving station 12 is situated in any complex area, it becomes possible to receive signals respectively transmitted from the wireless stations adjacent to each other at different timings.

As described above, according to the fifth embodiment of the present invention, even if the propagation time between the receiving station and each of the plurality of wireless stations is too large to be negligible, the delay amount given by the transmitting station to a signal to foe transmitted to each of the wireless stations is adjusted such that the number of timings at which the receiving station receives signals will be equal to the number (two in the present embodiment) that contributes to the path diversity effect. Furthermore, if different symbol waveforms (or symbol waveform series, each having a length of M) are used between the wireless stations which share the same timing at which signals of the respective wireless stations arrive at the receiving station, that is, the wireless station B2 and the wireless station D2 in the present embodiment, the path diversity effect can be obtained even between such two wireless stations. FIG. 47 shows an example where the wireless station D2 transmits a signal by using the symbol waveform W2 and the wireless stations B2 and C2 transmit signals by using the symbol waveform W1. Thus, the maximum path diversity effect can be obtained in the receiving station.

Furthermore, taking the complex area A, for example, a timing at which a signal transmitted from the wireless station A2 arrives at the receiving station 12 is set to be the same as a timing at which a signal transmitted from the wireless station B2 arrives at the receiving station 12, thereby making it possible to obtain the path diversity effect with the maximum number of effective branches being four, which is equal to the number of different types of combinations, each containing a timing and a symbol waveform, both are selected from among two types of timings and two types of symbol waveforms, respectively.

The fifth embodiment illustrates an example where the wireless transmission system includes four wireless stations. Alternatively, the number of wireless stations to be mounted in the wireless transmission system may be increased, so as to expand an area. FIG. 50 shows an example, in the above case, of assigning an arriving timing (T1 or T2 in this example) and a symbol waveform (W1 or W2 in this example) to each wireless station. Generally, as compared with a level of an arriving wave from an adjacent wireless station, a level of an arriving wave from a wireless station far away from the adjacent wireless station is lower. Therefore, arriving waves from two wireless stations adjacent to each other have a greater influence on the transmission characteristic. Thus, among the four different types of combinations: T1 and W1, T1 and W2, T2 and W1, and T2 and W2, each combination containing an arriving timing and a symbol waveform, different types of combinations are preferably used for the two wireless stations adjacent to each other. FIG. 50 shows typical sixteen types of arrangement patterns satisfying the aforementioned condition, and concepts for each arrangement pattern is described in the rightmost column.

Sixth Embodiment

The wireless transmission system according to a sixth embodiment has a characteristic which arranges linearly continuous areas according to the fifth embodiment in a row direction to form a planar area, and receives signals at two different timings in each complex area.

Figure 48:
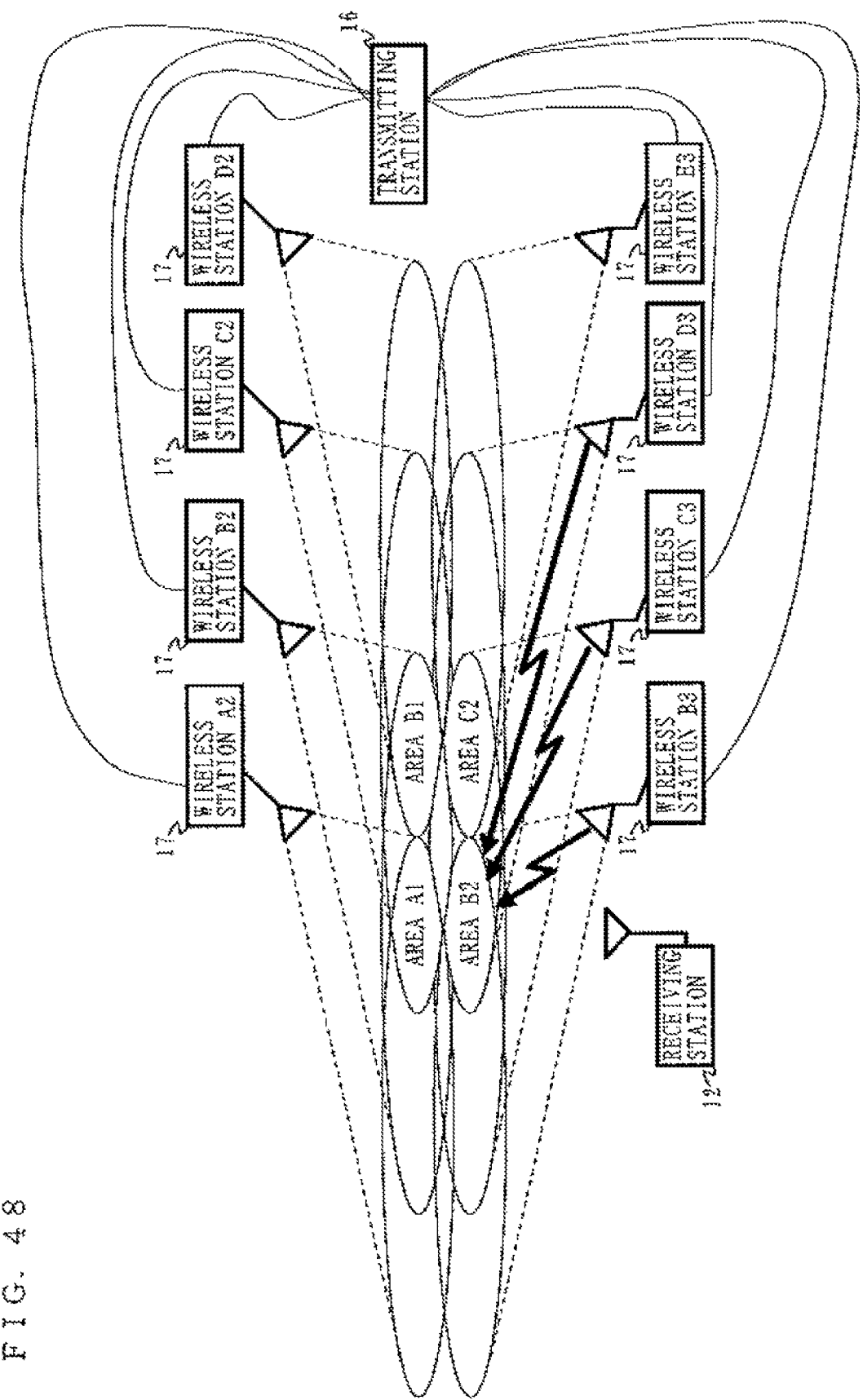
FIG. 48 is a diagram illustrating a structure of the wireless transmission system according to a sixth embodiment, of the present invention.

FIG. 48 is a diagram illustrating a structure of the wireless transmission system according to a sixth embodiment of the present invention. In the sixth embodiment, the structures of the transmitting station 16, the wireless station 17, end the receiving station 12 are the same as those of the fifth embodiment. Therefore, any detailed descriptions thereof wild, be omitted.

The wireless transmission system according to the sixth embodiment comprises eight wireless stations 17. The four wireless stations 17 arranged in a linear manner form one set of wireless stations, and two sets of wireless stations are arranged to form a planar communication area. When it is necessary to distinguish the eight wireless stations 17, the wireless stations 17 included in one set are successively referred to as the wireless stations A2 to D2, and the wireless stations 17 included in the other set are successively referred to as wireless stations B3 to E3.

Furthermore, a complex area formed by the wireless stations A2 to C2 and a complex area formed by the wireless stations B2 to D2 are referred to as a complex area A1 and a complex area B1, respectively. Similarly, a complex area formed by the wireless stations B3 to D3 and a complex area formed by the wireless stations C3 to E3 are referred to as a complex area B2 and a complex area C2, respectively. Basically, two types of arrangement patterns are used among the arrangement patterns shown in FIG. 50. Similarly to the fifth embodiment, in two types of combinations respectively used for the two wireless stations adjacent to each other, either timings or symbol waveforms included in the combinations are preferably different from each other, in order to exert the maximum path diversity effect. For example, if an arrangement pattern 1 and an arrangement pattern 2 shown in FIG. 50 are arranged in a row direction, among any four wireless stations adjacent to each other (enclosed in a dotted box, for example), types of combinations used for the four respective wireless stations are different from each other, and all types of comminations are arranged so as to be adjacent to each other, thereby making it possible to expect the maximum path diversity effect. In an actual arrangement diagram shown in FIG. 48, it becomes possible to obtain a more excellent transmission characteristic by the maximum path diversity effect having been exerted in not only the complex areas A1, B1, B2 and G2 but also a central portion encompassed by these four complex areas.

As described above, according to the sixth embodiment of the present invention, sets of wireless stations, each set containing the wireless stations linearly arranged, are arranged in at planar manner, thereby making it possible to cover a broader communication area while exerting the path diversity effect. Furthermore, no interference occurs even when the receiving station receives a signal transmitted from a wireless station far away from the receiving station, thus contributing to the path diversity effect.

Furthermore, the present embodiment is described with respect to the eight wireless stations forming four complex areas. Alternatively, more wireless stations may be continuously arranged in row and column directions in order to further increase the number of areas.

Figure 49:
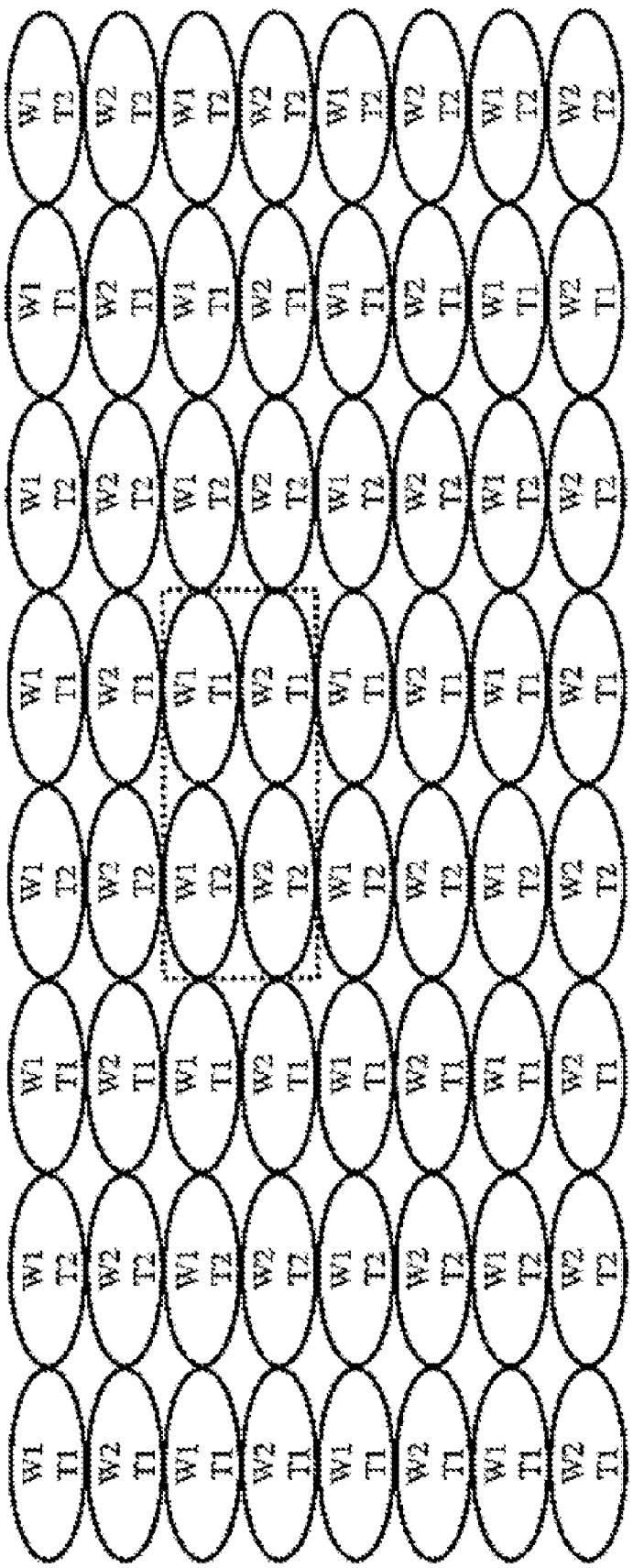
FIG. 49 is a diagram illustrating exemplary arrangements of complex areas formed by a plurality of wireless stations.
Figure 51:
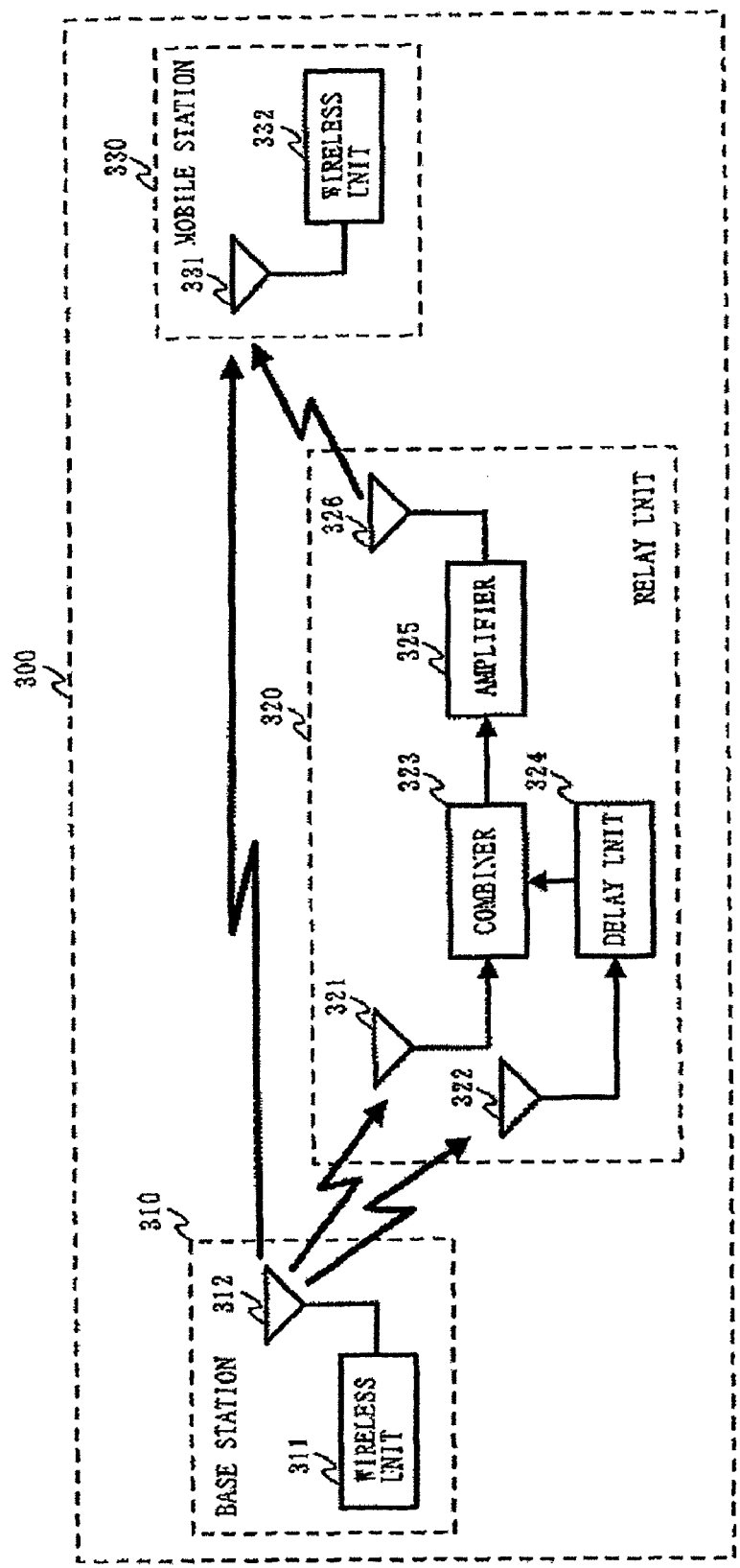
FIG. 51 is a block diagram, illustrating a conventional wireless transmission system.
Figure 52:
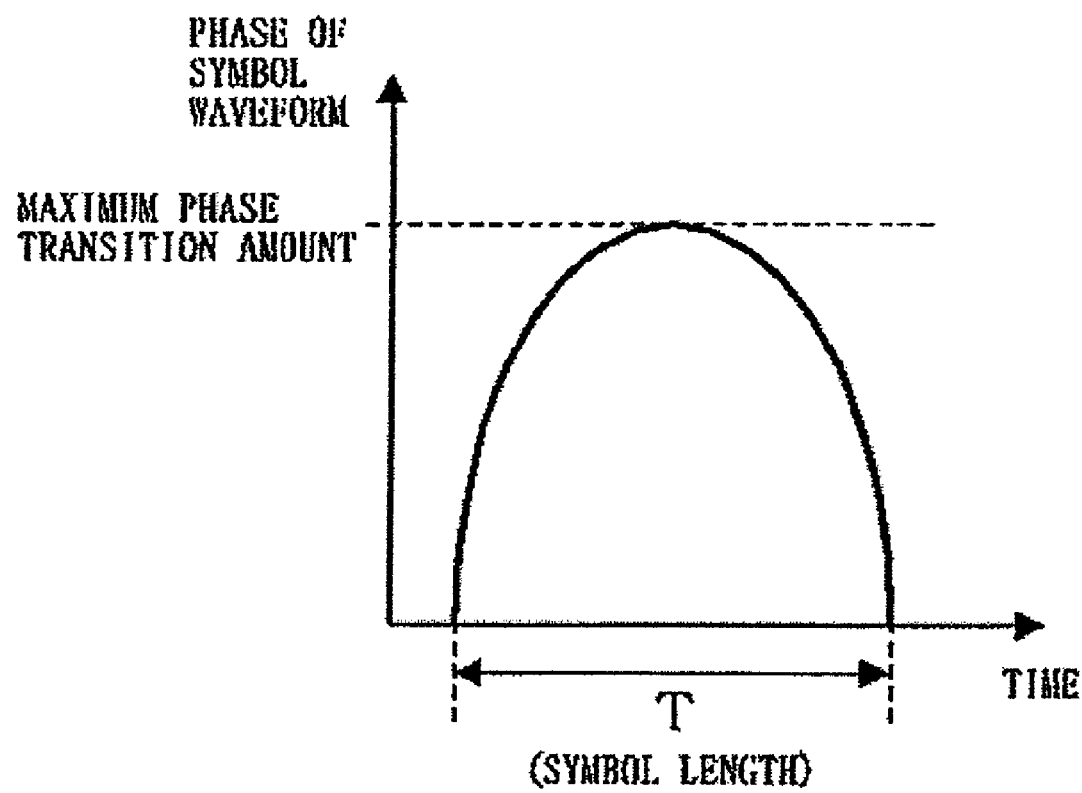
FIG. 52 is a schematic diagram illustrating a phase transition of a conventional symbol waveform.
Figure 53:
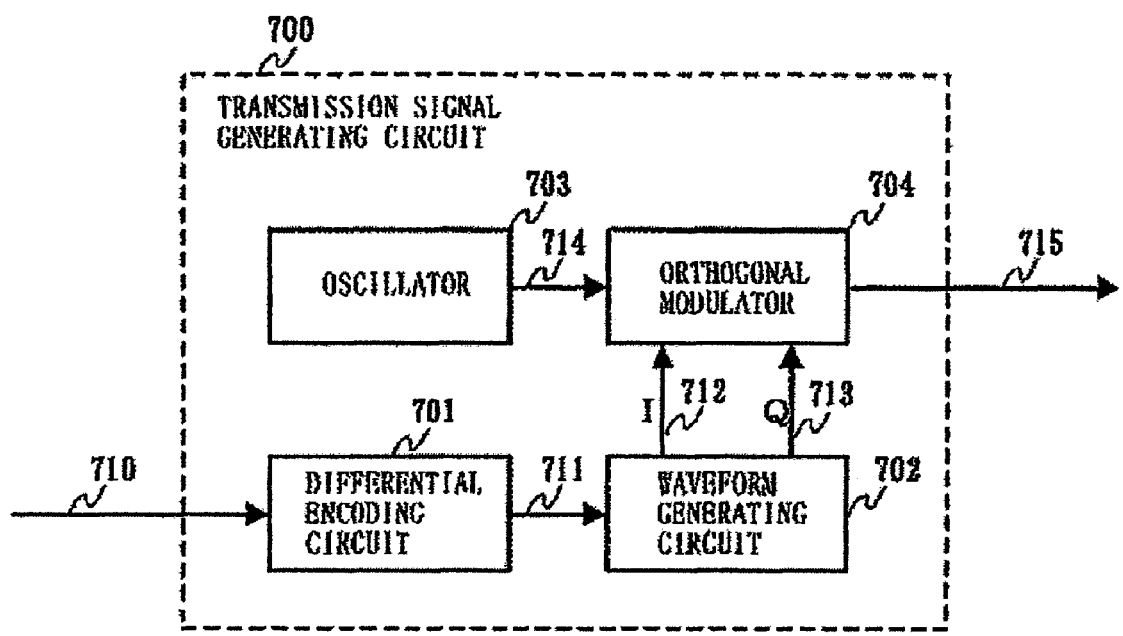
FIG. 53 is a diagram illustrating a structure of a transmission signal generating circuit 300.
Figure 54:
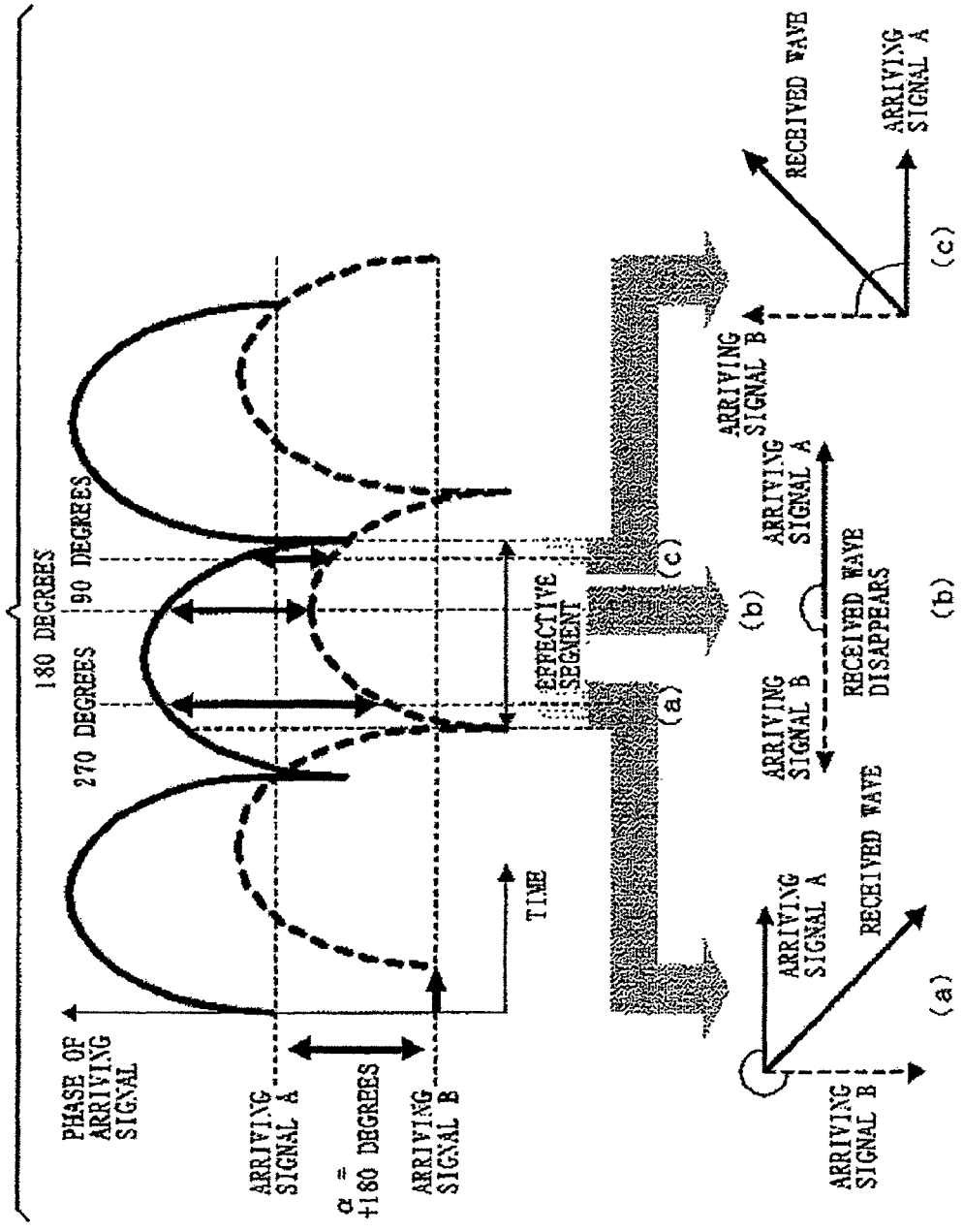
FIG. 54 is a schematic diagram illustrating a phase relationship between the arriving signals A and B having a delay therebetween.
Figure 55:
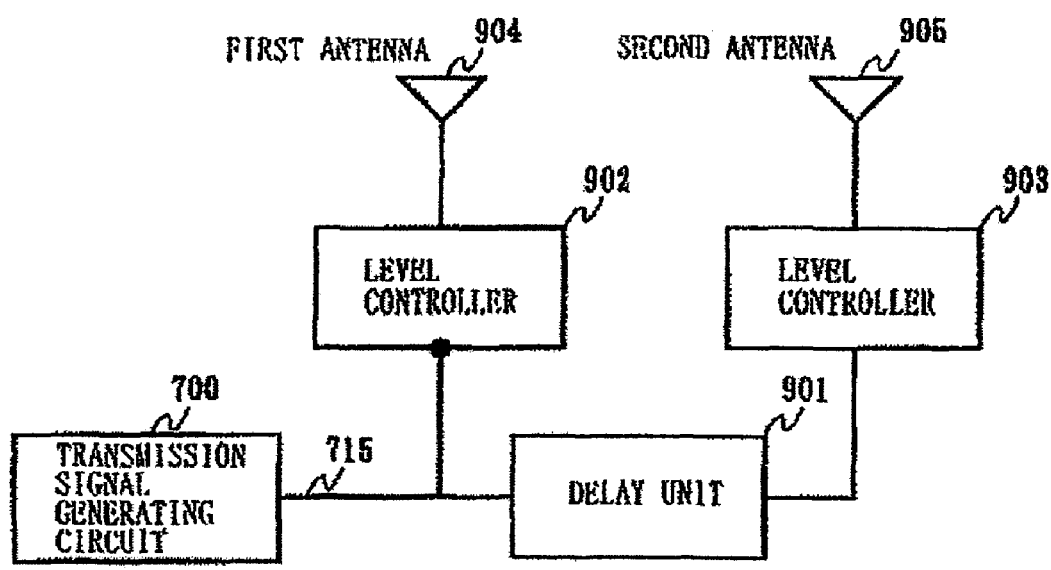
FIG. 55 is a schematic diagram illustrating a structure of the conventional wireless transmission system.

FIG. 49 is a diagram illustrating exemplary arrangements of complex areas formed by a plurality of wireless stations. In the example shown in FIG. 49, the arrangement pattern 1 and the arrangement pattern 2 shown in FIG. 50 are repeatedly arranged in a row direction. Among any four wireless stations adjacent to each other (enclosed in a dotted box, for example), types of combinations used for the four respective wireless stations are different from each other, and all types of combinations are arranged so as to be adjacent to each other, thereby making it possible to expect the maximum path diversity effect.

Note that the above fifth and sixth embodiments describe a case where the wireless stations are arranged so as to be equally spaced from, each other, and each propagation time difference between any of the two wireless stations adjacent to each other is denoted as P. However, even when there is a propagation time difference, the transmitting station adjusts transmission timings of signals, thereby making it possible to receive the signals at two different timings, regardless of the position where the receiving station 12 is situated.

Furthermore, in the fifth and sixth embodiments, the receiving station receives signals transmitted from three wireless stations. However, if the delay amount is set such that, timings of receiving the signals are converged to only two timings, there is no limit for the signals transmitted from the wireless stations and then received by the receiving station.

Still furthermore, instead of giving each of the delay amounts tA, tB, tC and tD to a signal, a delay amount to be given to each wireless station may be determined by adjusting a length of a wired transmission path connecting the transmitting station to each wireless station.

The functional blocks included in the wireless station such as the delay amount/symbol waveform determining section and the transmission timing controlling section described in the respective embodiments are typically implemented as LSIs, integrated circuits. These functional blocks may be individually integrated on a single chip or stay also be integrated on a single chip so as to include a part or the whole thereof.

INDUSTRIAL APPLICABILITY

A wireless transmission system of the present invention is applicable to a multiple-station simultaneous transmission system in which a plurality of wireless stations perform simultaneous transmission while being relayed, and is more particularly applicable to a system to which electric appliances are connected, the electric appliances being used in a home environment where each propagation distance is assumedly too short to obtain a path diversity effect because the plurality of wireless stations are in close proximity to each other, or a DSRC (Dedicated Short Range Communication) system/a road-to-vehicle communication system in which a communication area is limited to a local area and therefore each propagation time between transmission and reception can be deliberately adjusted during the design phase.

The invention claimed is:

1. A wireless transmission system providing path diversity and comprising a plurality of wireless stations, a receiving station and multipath transmission paths formed between the receiving station and each respective wireless station of the plurality of stations, and causing each wireless station of the plurality of wireless stations to transmit transmission data to the receiving station,
wherein each wireless station of the plurality of wireless stations includes:
a waveform selection controlling section for selecting one symbol waveform from among a plurality of symbol waveform candidates, each symbol waveform of the plurality of symbol waveform candidates being different from one another;
a modulating section for generating a transmission signal based on the transmission data by using the symbol waveform selected by the waveform selection controlling section;
a transmission timing controlling section for determining, as a transmission start timing of starting a transmission of the transmission signal, a timing delayed from a reference timing, which is a reference used for transmitting the transmission signal, by a predetermined delay amount; and
a transmitting section for transmitting the transmission signal at the transmission start timing determined by the transmission timing controlling section,
wherein the receiving station includes a receiving section for receiving the transmission signal transmitted from the transmitting section,
wherein the predetermined delay amount is set such that a number of reception timings, each reception timing of the number of reception timings indicating a timing at which the receiving section receives the transmission signal, is set for each symbol waveform of the plurality of symbol waveform candidates that is different from one another, so as to be a plural number and to be less than or equal to a predetermined number, such that each time difference between the reception timings is greater than or equal to a predetermined delay resolution, and such that a difference between a maximum value and a minimum value of each of the reception timings is less than or equal to a predetermined maximum delay,
wherein the wireless transmission system further includes a transmitting station for transmitting the transmission signal, to be transmitted to the receiving station, to each wireless station of the plurality of wireless stations,
wherein the transmitting station includes:
a delay amount/symbol waveform determining section for selecting one delay amount to be applied to the transmission signal transmitted from each wireless station of the plurality of wireless stations from among a plurality of candidate values and for selecting one symbol waveform to be used by each wireless station of the plurality of wireless stations for generating the transmission signal from among the plurality of symbol waveform candidates;
delay amount/symbol waveform adding sections, each delay amount/symbol waveform addition section of the plurality of delay amount/symbol waveform adding sections for adding the delay amount and the symbol waveform selected by the delay amount/symbol waveform determining section to the transmission signal; and
a transmitting section for transmitting, to each wireless station of the plurality of wireless stations, the transmission signal to which the delay amount and the symbol waveform are added by each delay amount/symbol waveform adding section of the plurality of delay amount/symbol waveform adding sections,
wherein each wireless station of the plurality of wireless stations includes a delay amount/symbol waveform extracting section for receiving the transmission signal transmitted from the transmitting station and extracting the delay amount and the symbol waveform added to the signal,
wherein the transmission timing controlling section determines, as the transmission start timing, a timing delayed from the reference timing by the delay amount extracted by the delay amount/symbol waveform extracting section, and wherein the modulating section generates the transmission signal based on the transmission data by using the symbol waveform extracted by the delay amount/symbol waveform extracting section.

2. The wireless transmission system according to claim 1, wherein each of the predetermined delay resolution and the predetermined maximum delay is set to be a value with which a plurality of delayed waves are received by using the path diversity.

3. The wireless transmission system according to claim 1, wherein the reference timing retained by each wireless station of the plurality of wireless stations is a same timing which is previously determined.

4. The wireless transmission system according to claim 1, wherein the wireless stations of the plurality of wireless stations are arranged such that communication areas of the respective wireless stations adjacent to and spaced less than a predetermined distance from one another, partially overlap one another, and wherein the delay amount/symbol waveform determining section adjusts the delay amount such that the receiving station receives signals transmitted from the adjacent wireless stations at different timings, and the receiving station receives, at a same timing, signals transmitted from wireless stations, of the plurality of wireless stations, for which a same delay amount is set.

5. The wireless transmission system according to claim 4, wherein the wireless stations of the plurality of wireless stations are arranged in a linear manner.

6. The wireless transmission system according to claim 5, wherein sets of wireless stations of the plurality of wireless stations are provided, each set of wireless stations of the sets of wireless stations including at least two wireless stations arranged in a linear manner, and wherein the sets of wireless stations are arranged in parallel with one another.

7. The wireless transmission system according to claim 1, wherein each wireless station of the plurality of wireless stations further includes a delay amount setting section for selecting the predetermined delay amount from among a plurality of candidate values.

8. The wireless transmission system according to claim 1, wherein each wireless station of the plurality of wireless stations further includes a delay amount setting section for selecting the delay amount from among a plurality of candidate values on a random basis.

9. The wireless transmission system according to claim 1, wherein the waveform selection controlling section selects, for each wireless station of the plurality of wireless stations, the one symbol waveform from among the plurality of symbol waveform candidates on a random basis.

10. The wireless transmission system according to claim 1, wherein each wireless station of the plurality of wireless stations generates the transmission signal, in which symbol waveforms of any two symbols separated from one another by a predetermined number of symbols are identical to one another regardless of the transmission data and in which a phase difference between the any two symbols is determined based on the transmission data.

11. The wireless transmission system according to claim 10, wherein each wireless station of the plurality of wireless stations generates the transmission signal when the predetermined number of symbols is set to be 1.

12. The wireless transmission system according to claim 10, wherein each wireless station of the plurality of wireless stations uses, as the phase difference, any angle obtained by equally dividing $2\pi$ by a number corresponding to a power of 2.

13. The wireless transmission system according to claim 1, wherein the receiving station obtains a detection signal by performing a delay detection.

14. The wireless transmission system according to claim 1, wherein each wireless station of the plurality of wireless stations includes, in symbol waveforms, of the plurality of symbol waveform candidates having a predetermined number of types of waveforms, at least a first symbol waveform having a phase transition in which the phase transition increases in a chronological direction and in which a second-order differential coefficient calculated from a chronological change of the phase is not always zero during one symbol period, and a second symbol waveform having a phase transition in which the phase transition decreases in the chronological direction and in which the second-order differential coefficient calculated from the chronological change of the phase is not always zero during the one symbol period.

15. The wireless transmission system according to claim 1, wherein each wireless station of the plurality of wireless stations includes, in symbol waveforms, of the plurality of symbol waveform candidates having a predetermined number of types of waveforms, at least a first symbol waveform and a second symbol waveform, each of the first symbol waveform and the second symbol waveform having a phase transition in which an amount of a chronological change of a phase decreases before a predetermined point during one symbol period and increases after the predetermined point during the one symbol period.

16. The wireless transmission system according to claim 1, wherein each wireless station of the plurality of wireless stations includes, in symbol waveforms, of the plurality of symbol waveform candidates having a predetermined number of types of waveforms, at least a first symbol waveform and a second symbol waveform, each of the first symbol waveform and the second symbol waveform having a phase transition in which an amount of a chronological change of a phase increases before a predetermined point during one symbol period and decreases after the predetermined point during the one symbol period.

17. The wireless transmission system according to claim 1, wherein each wireless station of the plurality of wireless stations includes, in symbol waveforms, of the plurality of symbol waveform candidates having a predetermined number of types of waveforms, at least a first symbol waveform and a second symbol waveform, each of the first symbol waveform and the second symbol waveform having a phase transition in which an amount of a chronological change of a phase decreases during an entirety of one symbol period.

18. The wireless transmission system according to claim 1, wherein each wireless station of the plurality of wireless stations includes, in symbol waveforms, of the plurality of symbol waveform candidates having a predetermined number of types of waveforms, at least a first symbol waveform having a phase transition in which a phase increases and then decreases in a chronological direction and in which a second-order differential coefficient calculated from a chronological change of the phase is not always zero during one symbol period, and a second symbol waveform having a phase transition in which a phase decreases and then increases in the chronological direction and in which the second-order differential coefficient calculated from the chronological change of the phase is not always zero during the one symbol period.

19. The wireless transmission system according to claim 1, wherein each wireless station of the plurality of wireless stations includes, in symbol waveforms, of the plurality of symbol waveform candidates having a predetermined number of types of waveforms, at least a first symbol waveform and a second symbol waveform, each of the first symbol waveform and the second symbol waveform having a phase transition in which an amount of a chronological change of a phase decreases before a predetermined point during one symbol period and increases after the predetermined point during the one symbol period.

20. The wireless transmission system according to claim 1, wherein, when a predetermined point is set at a center of one symbol period, each wireless station of the plurality of wireless stations includes, in symbol waveforms, of the plurality of symbol waveform candidates having a predetermined number of types of waveforms, at least a first symbol waveform and a second symbol waveform, having phase transitions in which phases before the center of the one symbol period and the phases after the center of the one symbol period are changed in a symmetrical manner.

21. A plurality of wireless stations of a wireless transmission system providing path diversity and comprising the plurality of wireless stations, a receiving station and multipath transmission paths formed between the receiving station and each respective wireless station of the plurality of wireless stations, and causing each wireless station of the plurality of wireless stations to transmit transmission data to the receiving station, each wireless station of the plurality of wireless stations comprising:
   a waveform selection controlling section for selecting one symbol waveform from among a plurality of symbol waveform candidates, each symbol waveform of the plurality of symbol waveform candidates being different from one another;
   a modulating section for generating a transmission signal based on the transmission data by using the symbol waveform selected by the waveform selection controlling section;
   a transmission timing controlling section for determining, as a transmission start timing of starting a transmission of the transmission signal, a timing delayed from a reference timing, which is a reference used for transmitting the transmission signal, by a predetermined delay amount; and
   a transmitting section for transmitting the transmission signal at the transmission start timing determined by the transmission timing controlling section,
   wherein the predetermined delay amount is set such that a number of reception timings, each reception timing of the number of reception timings indicating a timing at which the receiving station receives the transmission signal, is set for each symbol waveform of the plurality of symbol waveform candidates that is different from one another, so as to be a plural number and to be less than or equal to a predetermined number, such that each time difference between the reception timings is greater than or equal to a predetermined delay resolution, and such that a difference between a maximum value and a minimum value of each of the reception timings is less than or equal to a predetermined maximum delay,
   wherein the wireless transmission system further includes a transmitting station for transmitting the transmission signal, to be transmitted to the receiving station, to each wireless station of the plurality of wireless stations,
   wherein the transmitting station includes:
      a delay amount/symbol waveform determining section for selecting one delay amount to be applied to the transmission signal transmitted from each wireless station of the plurality of wireless stations from among a plurality of candidate values and for selecting one symbol waveform to be used by each wireless station of the plurality of wireless stations for generating the transmission signal from among the plurality of symbol waveform candidates;
      delay amount/symbol waveform adding sections, each delay amount/symbol waveform addition section of the plurality of delay amount/symbol waveform adding sections for adding the delay amount and the symbol waveform selected by the delay amount/symbol waveform determining section to the transmission signal; and
      a transmitting section for transmitting, to each wireless station of the plurality of wireless stations, the transmission signal to which the delay amount and the symbol waveform are added by each delay amount/symbol waveform adding section of the plurality of delay amount/symbol waveform adding sections,
   wherein each wireless station of the plurality of wireless stations includes a delay amount/symbol waveform extracting section for receiving the transmission signal transmitted from the transmitting station and extracting the delay amount and the symbol waveform added to the signal,
   wherein the transmission timing controlling section determines, as the transmission start timing, a timing delayed from the reference timing by the delay amount extracted by the delay amount/symbol waveform extracting section, and
   wherein the modulating section generates the transmission signal based on the transmission data by using the symbol waveform extracted by the delay amount/symbol waveform extracting section.

22. A transmitting station of a wireless transmission system providing path diversity and comprising the transmitting station, a plurality of wireless stations, a receiving station and multipath transmission paths formed between the receiving station and each respective wireless station of the plurality of wireless stations, and causing the transmitting station to transmit transmission data to the receiving station via each wireless station of the plurality of wireless stations, the transmitting station comprising:
   a waveform selection controlling section for selecting, for each wireless station of the plurality of wireless stations, one symbol waveform from among a plurality of symbol waveform candidates, each symbol waveform of the plurality of symbol waveform candidates being different from one another;
   a modulating section for generating a transmission signal to be transmitted to each wireless station of the plurality of wireless stations, based on the transmission data by using the symbol waveform selected by the waveform selection controlling section;
   a transmission timing controlling section for determining, for each wireless station of the plurality of wireless stations, a timing delayed from a reference timing, which is a reference used for transmitting the transmission signal, by a predetermined delay amount, as a transmission start timing of starting a transmission of the transmission signal; and
   a transmitting section for transmitting the transmission signal to be transmitted to each wireless station of the plurality of wireless stations at the transmission start timing determined by the transmission timing controlling section, wherein the predetermined delay amount is set such that a number of reception timings, each reception timing of the number of reception timings indicating a timing at which the receiving station receives the transmission signal, is set for each symbol waveform of the plurality of symbol waveform candidates that is different from one another, so as to be a plural number and to be less than or equal to a predetermined number, such that each time difference between the reception timings is greater than or equal to a predetermined delay resolution, and such that a difference between a maximum value and a minimum value of each of the reception timings is less than or equal to a predetermined maximum delay, wherein the transmitting station transmits the transmission signal, to be transmitted to the receiving station, to each wireless station of the plurality of wireless stations, wherein the transmitting station further includes:
- a delay amount/symbol waveform determining section for selecting one delay amount to be applied to the transmission signal transmitted from each wireless station of the plurality of wireless stations from among a plurality of candidate values and for selecting one symbol waveform to be used by each wireless station of the plurality of wireless stations for generating the transmission signal from among the plurality of symbol waveform candidates;
- delay amount/symbol waveform adding sections, each delay amount/symbol waveform addition section of the plurality of delay amount/symbol waveform adding sections for adding the delay amount and the symbol waveform selected by the delay amount/symbol waveform determining section to the transmission signal; and
- a transmitting section for transmitting, to each wireless station of the plurality of wireless stations, the transmission signal to which the delay amount and the symbol waveform are added by each delay amount/symbol waveform adding section of the plurality of delay amount/symbol waveform adding sections, wherein each wireless station of the plurality of wireless stations includes a delay amount/symbol waveform extracting section for receiving the transmission signal transmitted from the transmitting station and extracting the delay amount and the symbol waveform added to the signal, wherein the transmission timing controlling section determines, as the transmission start timing, a timing delayed from the reference timing by the delay amount extracted by the delay amount/symbol waveform extracting section, and wherein the modulating section generates the transmission signal based on the transmission data by using the symbol waveform extracted by the delay amount/symbol waveform extracting section.

23. A method of causing a plurality of wireless stations to transmit transmission data to a receiving station in a wireless transmission system providing path diversity and comprising the plurality of wireless stations, the receiving station and multipath transmission paths formed between the receiving station and each respective wireless station of the plurality of wireless stations, the method comprising:

selecting one symbol waveform from among a plurality of symbol waveform candidates, each symbol waveform of the plurality of symbol waveform candidates being different from one another;

generating a transmission signal based on the transmission data by using the symbol waveform selected by a waveform selection controlling section;

setting a predetermined delay amount such that a number of reception timings, each reception timing of the number of reception timings indicating a timing at which the receiving station receives the transmission signal, is set for each symbol waveform of the plurality of symbol waveform candidates that is different from one another, so as to be a plural number and to be less than or equal to a predetermined number, such that each time difference between the reception timings is greater than or equal to a predetermined delay resolution, and such that a difference between a maximum value and a minimum value of each of the reception timings is less than or equal to a predetermined maximum delay;

determining, as a transmission start timing of starting a transmission of the transmission signal, a timing delayed from a reference timing, which is a reference used for transmitting the transmission signal, by the predetermined delay amount; and transmitting the transmission signal at the transmission start timing determined by a transmission timing controlling section, wherein the wireless transmission system further includes a transmitting station for transmitting the transmission signal, to be transmitted to the receiving station, to each wireless station of the plurality of wireless stations, wherein the transmitting station includes:
- a delay amount/symbol waveform determining section for selecting one delay amount to be applied to the transmission signal transmitted from each wireless station of the plurality of wireless stations from among a plurality of candidate values and for selecting one symbol waveform to be used by each wireless station of the plurality of wireless stations for generating the transmission signal from among the plurality of symbol waveform candidates;
- delay amount/symbol waveform adding sections, each delay amount/symbol waveform addition section of the plurality of delay amount/symbol waveform adding sections for adding the delay amount and the symbol waveform selected by the delay amount/symbol waveform determining section to the transmission signal; and
- a transmitting section for transmitting, to each wireless station of the plurality of wireless stations, the transmission signal to which the delay amount and the symbol waveform are added by each delay amount/symbol waveform adding section of the plurality of delay amount/symbol waveform adding sections, and wherein the method further comprises:
- receiving, via each wireless station of the plurality of wireless stations, the transmission signal transmitted from the transmitting station;
- extracting, via a delay amount/symbol waveform extracting section of each wireless station of the plurality of wireless stations, the delay amount and the symbol waveform added to the signal;
- determining, as the transmission start timing, a timing delayed from the reference timing by the delay amount extracted by the delay amount/symbol waveform extracting section, the determining being performed by the transmission timing controlling section; and generating the transmission signal based on the transmission data by using the symbol waveform extracted by the delay amount/symbol waveform extracting section.

24. A method of causing a transmitting station to transmit transmission data to a receiving station via a plurality of wireless stations of a wireless transmission system providing path diversity and comprising the transmitting station, the plurality of wireless stations, the receiving station and multipath transmission paths formed between the receiving station and each respective wireless station of the plurality of wireless stations, the method comprising:

selecting, for each wireless station of the plurality of wireless stations, one symbol waveform from among a plurality of symbol waveform candidates, each symbol waveform of the plurality of symbol waveform candidates being different from one another;

generating a transmission signal to be transmitted to each wireless station of the plurality of wireless stations, based on the transmission data by using the symbol waveform selected by a waveform selection controlling section;

setting a predetermined delay amount such that a number of reception timings, each reception timing of the number of reception timings indicating a timing at which the receiving station receives the transmission signal, is set for each symbol waveform of the plurality of symbol waveform candidates that is different from one another, so as to be a plural number and to be less than or equal to a predetermined number, such that each time difference between the reception timings is greater than or equal to a predetermined delay resolution, and such that a difference between a maximum value and a minimum value of each of the reception timings is less than or equal to a predetermined maximum delay;

determining, for each wireless station of the plurality of wireless stations, a timing delayed from a reference timing, which is a reference used for transmitting the transmission signal, by the predetermined delay amount, as a transmission start timing of starting a transmission of the transmission signal;

transmitting the transmission signal to each wireless station of the plurality of wireless stations at the transmission start timing determined by a transmission timing controlling section;

transmitting the transmission signal, to be transmitted to the receiving station, to each wireless station of the plurality of wireless stations;

selecting, via a delay amount/symbol waveform determining section, one delay amount to be applied to the transmission signal transmitted from each wireless station of the plurality of wireless stations from among a plurality of candidate values;

selecting, via the delay amount/symbol waveform determining section, one symbol waveform to be used by each wireless station of the plurality of wireless stations for generating the transmission signal from among the plurality of symbol waveform candidates;

adding, via each delay amount/symbol waveform addition section of a plurality of delay amount/symbol waveform adding sections, the delay amount and the symbol waveform selected by the delay amount/symbol waveform determining section to the transmission signal; and transmitting, via a transmitting section, to each wireless station of the plurality of wireless stations, the transmission signal to which the delay amount and the symbol waveform are added by each delay amount/symbol waveform adding section of the plurality of delay amount/symbol waveform adding sections, wherein each wireless station of the plurality of wireless stations includes a delay amount/symbol waveform extracting section for receiving the transmission signal transmitted from the transmitting station and extracting the delay amount and the symbol waveform added to the signal, and wherein method further comprises:

determining, via the transmission timing controlling section, as the transmission start timing, a timing delayed from the reference timing by the delay amount extracted by the delay amount/symbol waveform extracting section; and generating the transmission signal based on the transmission data by using the symbol waveform extracted by the delay amount/symbol waveform extracting section.

* * * * *